(12) United States Patent
MacMullan et al.

(10) Patent No.: US 7,499,462 B2
(45) Date of Patent: Mar. 3, 2009

(54) SYSTEM, METHOD AND APPARATUS FOR WIRELESS DELIVERY OF CONTENT FROM A GENERALIZED CONTENT SOURCE TO A GENERALIZED CONTENT SINK

(75) Inventors: Samuel J. MacMullan, Carlisle, MA (US); Steven S. Fastert, Chelmsford, MA (US); Tandhoni S. Rao, Ashland, MA (US)

(73) Assignee: Radiospire Networks, Inc., Concord, MA (US)

( * ) Notice: Subject to any disclaimer, the term of this patent is extended or adjusted under 35 U.S.C. 154(b) by 503 days.

(21) Appl. No.: 11/117,467

(22) Filed: Apr. 29, 2005

(65) Prior Publication Data
US 2006/0209745 A1 Sep. 21, 2006

Related U.S. Application Data

(60) Provisional application No. 60/661,481, filed on Mar. 15, 2005.

(51) Int. Cl.
*H04L 12/28* (2006.01)
*H04L 12/56* (2006.01)

(52) U.S. Cl. .................. 370/401; 370/463; 370/468; 370/477; 370/480; 455/419; 455/426.1; 725/81; 725/100; 725/120; 725/131; 348/734; 348/E7.026; 348/E5.103

(58) Field of Classification Search .............. 370/401, 370/463, 468, 480, 477, 310; 725/100, 81, 725/120, 111, 131; 348/E7.026, 734, E5.103; 455/419, 426.1
See application file for complete search history.

(56) References Cited

U.S. PATENT DOCUMENTS

| | | | |
|---|---|---|---|
| 4,980,767 A | 12/1990 | Chao et al. | |
| 5,903,322 A | 5/1999 | Chen | |
| 6,008,777 A | 12/1999 | Yiu | |
| 6,130,898 A | 10/2000 | Kostreski et al. | |

(Continued)

FOREIGN PATENT DOCUMENTS

EP 1 244 303 A2 9/2002

(Continued)

OTHER PUBLICATIONS

Batra, Anuj et al., *Project: IEEE P802.15 Working Group for Wireless Personal Area Networks: Multi-band OFDM Physical Layer Proposal*, PowerPoint slides, Texas Instruments, Inc., 76 pages (Jul. 14, 2003).

(Continued)

*Primary Examiner*—Dwayne D Bost
*Assistant Examiner*—Inder P Mehra
(74) *Attorney, Agent, or Firm*—Fiala & Weaver, P.L.L.C.

(57) ABSTRACT

A system, method and apparatus for implementing a wireless point-to-point interface that securely and robustly delivers digital content from a generalized content source to a generalized content sink. The system, method and apparatus performs in a manner that is sufficiently secure and robust to serve as a replacement for the delivery of HDMI content over cable. The system, method and apparatus is also applicable to the delivery of other types of content traditionally delivered over cable, including but not limited to Digital Video Interface (DVI) content, composite video (CVSB) content, S-video content, RGB video content, YUV video content, and/or various types of audio content.

34 Claims, 34 Drawing Sheets

U.S. PATENT DOCUMENTS

| | | | |
|---|---|---|---|
| 6,151,295 | A | 11/2000 | Ma et al. |
| 6,243,772 | B1 | 6/2001 | Ghori et al. |
| 6,253,360 | B1 | 6/2001 | Yoshiba |
| 6,262,779 | B1 | 7/2001 | Sugiyama et al. |
| 6,335,768 | B1 | 1/2002 | Reinold et al. |
| 6,343,071 | B1 | 1/2002 | Lansford |
| 6,469,634 | B1 | 10/2002 | Williams et al. |
| 6,636,222 | B1 | 10/2003 | Valmiki et al. |
| 6,684,060 | B1 | 1/2004 | Curtin |
| 6,724,351 | B1* | 4/2004 | Boger ............... 345/3.2 |
| 6,744,782 | B1 | 6/2004 | Itakura et al. |
| 6,760,300 | B1 | 7/2004 | Eberle et al. |
| 6,804,300 | B1 | 10/2004 | Hoshino et al. |
| 7,006,560 | B2 | 2/2006 | Kindler et al. |
| 7,161,988 | B2 | 1/2007 | Lee et al. |
| 7,203,466 | B2 | 4/2007 | Muschallik et al. |
| 7,228,154 | B2 | 6/2007 | Champion et al. |
| 7,331,012 | B2 | 2/2008 | Vasic et al. |
| 7,349,691 | B2 | 3/2008 | Karr et al. |
| 7,383,344 | B2 | 6/2008 | Hunter |
| 2001/0022789 | A1 | 9/2001 | Huang et al. |
| 2001/0038387 | A1 | 11/2001 | Tomooka et al. |
| 2002/0035729 | A1 | 3/2002 | Diep |
| 2002/0053078 | A1* | 5/2002 | Holtz et al. ............ 725/14 |
| 2002/0059637 | A1* | 5/2002 | Rakib ............... 725/119 |
| 2002/0114312 | A1 | 8/2002 | Hayashi |
| 2002/0163598 | A1 | 11/2002 | Pasqualino |
| 2003/0038807 | A1 | 2/2003 | Demos et al. |
| 2003/0067535 | A1 | 4/2003 | Creed et al. |
| 2003/0112828 | A1* | 6/2003 | Nio et al. ............ 370/521 |
| 2003/0147480 | A1 | 8/2003 | Richards et al. |
| 2003/0179889 | A1 | 9/2003 | Pivinski |
| 2003/0212946 | A1 | 11/2003 | Kroeger |
| 2004/0008265 | A1 | 1/2004 | Pedigo et al. |
| 2004/0068535 | A1 | 4/2004 | Subbiah et al. |
| 2004/0071118 | A1* | 4/2004 | Dabak et al. ............ 370/335 |
| 2004/0080671 | A1 | 4/2004 | Siemens et al. |
| 2004/0122649 | A1 | 6/2004 | Bartek et al. |
| 2004/0136457 | A1* | 7/2004 | Funnell et al. ......... 375/240.01 |
| 2004/0141720 | A1 | 7/2004 | Yim |
| 2004/0143847 | A1* | 7/2004 | Suzuki et al. ............ 725/61 |
| 2004/0143850 | A1 | 7/2004 | Costa |
| 2004/0157548 | A1 | 8/2004 | Eyer |
| 2004/0158649 | A1 | 8/2004 | Ophir et al. |
| 2004/0196920 | A1 | 10/2004 | Loheit et al. |
| 2004/0217948 | A1 | 11/2004 | Kawasaki et al. |
| 2004/0218598 | A1 | 11/2004 | Kobayashi |
| 2004/0218599 | A1 | 11/2004 | Kobayashi |
| 2004/0221315 | A1 | 11/2004 | Kobayashi |
| 2004/0240481 | A1* | 12/2004 | Matsumoto ............ 370/516 |
| 2004/0252235 | A1* | 12/2004 | Ejima ............... 348/515 |
| 2004/0252562 | A1 | 12/2004 | Kim |
| 2004/0252966 | A1* | 12/2004 | Holloway et al. ......... 386/46 |
| 2005/0031127 | A1* | 2/2005 | Gosior et al. ............ 381/2 |
| 2005/0058151 | A1* | 3/2005 | Yeh ............... 370/445 |
| 2005/0071872 | A1* | 3/2005 | Case ............... 725/50 |
| 2005/0091701 | A1 | 4/2005 | Hogyoku |
| 2005/0105498 | A1 | 5/2005 | Hardacker et al. |
| 2005/0135611 | A1 | 6/2005 | Hardacker |
| 2005/0136990 | A1 | 6/2005 | Hardacker et al. |
| 2005/0235325 | A1* | 10/2005 | O'Donnell ............ 725/72 |
| 2006/0080722 | A1 | 4/2006 | Santhoff |
| 2006/0209880 | A1 | 9/2006 | Chang et al. |
| 2007/0248328 | A1* | 10/2007 | Khan et al. ............ 386/96 |
| 2008/0008317 | A1* | 1/2008 | Graunke ............ 380/200 |

FOREIGN PATENT DOCUMENTS

| | | |
|---|---|---|
| EP | 1523107 | 4/2005 |
| WO | 9200646 A1 | 1/1992 |
| WO | WO 99/10999 A2 | 3/1999 |
| WO | 03096695 A1 | 11/2003 |
| WO | WO 2004/100438 A2 | 11/2004 |
| WO | WO 2004/107678 A2 | 12/2004 |
| WO | 2006101801 A3 | 9/2006 |
| WO | 2006118964 A3 | 11/2006 |

OTHER PUBLICATIONS

Batra, Anuj et al., *IEEE P802.15 Wireless Personal Area Networks: TI Physical Layer Proposal for IEEE 802.15 Task Group 3a*, Texas Instruments, Inc., 76 pages (May 2003).

*Digital Visual Interface DVI Revision 1.0*, Digital Display Working Group, 76 pages (Apr. 2, 1999).

*Encyclopedia: HDMI*, at http://www.nationmaster.com/encyclopedia/HDMI, 3 pages (printed Mar. 28, 2005).

*HDMI Tutorial*, at http://www.pacificcable.com/HDMI_Tutorial.htm, 4 pages, (Copyright 2001).

*High-bandwidth Digital Content Protection System Revision 1.1*, Digital Content Protection LLC, 85 pages (Jun. 9, 2003).

Mei, J.P. and Cheng, S., "Analysis For Error Code Performance Of MPEG-2 Transport System," *Proceedings of the 1997 IEEE International Symposium on Consumer Electronics*, IEEE, pp. 111-113 (Dec. 1997).

Moose, Paul H., "A Technique for Orthogonal Frequency Division Multiplexing Frequency Offset Correction," *IEEE Transactions on Communications*, vol. 42, No. 10, IEEE, pp. 2908-2914 (Oct. 1994).

U.S. Appl. No. 10/937,162, filed Sep. 9, 2004, Champion et al.

U.S. Appl. No. 11/119,726, filed May 3, 2005, MacMullan et al.

U.S. Appl. No. 11/190,878, filed Jul. 28, 2005, MacMullan et al.

U.S. Appl. No. 11/211,082, filed Aug. 25, 2005, MacMullan et al.

U.S. Appl. No. 11/216,173, filed Sep. 1, 2005, MacMullan et al.

*MultiBand OFDM Physical Layer Proposal for IEEE 802.15 Task Group 3a*, MultiBand OFDM Alliance SIG, 125 pages (Sep. 14, 2004).

Schmidl, Timothy M. and Cos, Donald C., "Robust Frequency and Timing Synchronization for OFDM," *IEEE Transactions on Communications*, IEEE, vol. 45, No. 12, pp. 1613-1621 (Dec. 1997).

van de Beek, Jan-Jaap et al., "ML Estimation of Time and Frequency Offset in OFDM Systems," *IEEE Transactions on Signal Processing*, IEEE, vol. 45, No. 7, pp. 1800-1805 (Jul. 1997).

\* cited by examiner

SYSTEM, METHOD AND APPARATUS FOR WIRELESS DELIVERY OF CONTENT FROM A GENERALIZED CONTENT SOURCE TO A GENERALIZED CONTENT SINK

CROSS-REFERENCE TO RELATED APPLICATIONS

This patent application claims the benefit of provisional U.S. Patent Application No. 60/661,481, filed Mar. 15, 2005, entitled "System, Method and Apparatus for Secure and Robust Delivery of Digital Content from a Generalized Content Source to a Generalized Content Sink" to MacMullan et al., the entirety of which is incorporated by reference herein.

BACKGROUND OF THE INVENTION

1. Field of the Invention

The present invention is generally directed to wireless communication systems. In particular, the present invention is related to a system, method and apparatus for the wireless communication of analog and/or digital information from a generalized content source to a generalized content sink.

2. Background

Wireless interfaces offer a compelling value proposition for the transfer of photos, music, video, data and other forms of media content amongst networked consumer electronics, personal computers (PCs), and mobile devices throughout the home. The promise of simple and inexpensive installation coupled with the potential elimination of bulky and unsightly cables has created a buzz throughout the industry. Seeing this opportunity, technology vendors have rushed to develop and position Bluetooth™, 802.11 WiFi®, and 802.15.3a Ultra Wide Band (UWB) for emerging in-home content transfer applications as these wireless techniques offer adequate coverage area, throughput, and quality levels for generic content transfer.

Media content transfer is not the only in-home wireless application, however, and it may not even be the most appealing one for the consumer. Many industry analysts are projecting that high-performance digital cable replacement may, in fact, be the more lucrative in-home opportunity for wireless technology.

For example, most high-definition plasma/LCD displays, digital projectors, and DVD players being introduced in the market today include a high-definition media interface (HDMI) connector to facilitate the high-fidelity transfer of digital content from source devices (e.g. digital set top boxes, DVD players, etc.) to display devices via digital cable. The HDMI interface standard supports all common high-definition formats including 720p and 1080i high-definition television (HDTV) which require data rates of 1.5 Gbps at a bit error rate (BER) of $10^{-9}$. HDMI also incorporates the Motion Picture Association of America (MPAA)-approved High-bandwidth Digital Content Protection (HDCP) which ensures the security of the digital content as it is transferred between source and display. The comprehensively designed HDMI standard has garnered widespread industry support and sales of HDMI equipped units is projected to grow from 50 million in 2005 to over 200 million in 2008.

Technology vendors are attempting to position 802.11 and UWB as candidate solutions for digital cable replacement. Unfortunately, the coverage area, throughput, and quality levels for 802.11 and UWB are woefully inadequate to serve as a replacement for the demanding high-performance digital cable market, particularly that related to 720p and 1080i HDTV. For example, the wireless replacement of the HDMI cables requires 7-10× greater throughput and 1000× better quality than what 802.11 and UWB were designed to provide.

By way of illustration, generic content transfer techniques share the following characteristics: shared multiple access communication, a 1% BER, latency acceptance, transfer of compressed data, use of retransmissions, and support for data rates up to 200 Mbps. In contrast, data transfer over high-performance digital cable is characterized by: dedicated point-to-point communication, $10^{-9}$ BER, low latency, transfer of uncompressed data, best effort communication (i.e., no retransmissions), and support for data rates in excess of 1 Gbps. Thus, existing wireless technologies such as 802.11 and Bluetooth along with proposed UWB solutions fail to provide the throughput and quality needed for in-home high-performance digital cable replacement.

Currently, 802.15.3a UWB is being touted as a solution to both generic content transfer and wireless HDMI cable replacement. Unfortunately, because of the emphasis on generic content transfer applications, 802.15.3a UWB performance falls dramatically short of what is required for wireless HDMI cable replacement. For instance, the maximum 802.15.3a data rate will be restricted to roughly 200 Mbps with potentially large data transfer latencies. 802.15.3a contains a general purpose media access control (MAC) that cannot exploit the inherent data rate asymmetries associated with HDMI where the display to source backchannel data rate requirement is negligible relative to the source to display forward channel—as a result overall throughput suffers. Even more troubling is the 802.15.3a acceptance of a 1% BER (8% packet error rate (PER)) which has potentially disastrous quality implications that could impact consumer acceptance of wireless cable replacement products.

So while 802.15.3a certainly addresses the needs of generic content transfer applications, it falls far short of the data rates and error performance required for wireless HDMI cable replacement. Many have focused on compressing digital content using MPEG-2 to overcome the data rate limitations of 802.15.3a, but the cost associated with adding MPEG-2 encoders to source devices makes this impractical. Even if cost constraints could be overcome, transmission of MPEG-2 encoded video is one of the most demanding applications in terms of quality of service (QoS). MPEG-2 can not tolerate large variations on delays such as those introduced by the 802.15.3a MAC layer and MPEG-2 quality is severely degraded when BER approaches $10^{-5}$, far below the 1% BER target of 802.15.3a.

What is needed then, is a system, method and apparatus for the wireless delivery of content from a generalized content source to a general content sink. The proposed solution should perform in a manner that is sufficiently secure and robust to serve as a replacement for the delivery of HDMI content over cable. The solution should also be applicable to the delivery of other types of content traditionally delivered over cable, including but not limited to Digital Video Interface (DVI) content, composite video (CVSB) content, S-video content, RGB video content, YUV video content, and/or various types of audio content.

BRIEF SUMMARY OF THE INVENTION

The present invention is directed to a system, method and apparatus for implementing a wireless point-to-point interface that securely and robustly delivers content from a generalized content source to a generalized content sink. A wireless interface in accordance with an embodiment of the present invention performs in a manner that is sufficiently secure and robust to serve as a replacement for the delivery of HDMI content over cable. The solution is also applicable to the delivery of other types of content traditionally delivered over cable, including but not limited to DVI, CVSB, S-video, RGB video, YUV video, and/or various types of audio content such as RCA audio, XLR audio, and 5.1, 6.1, 7.1 and 10.1 surround sound audio.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

Figure 1:
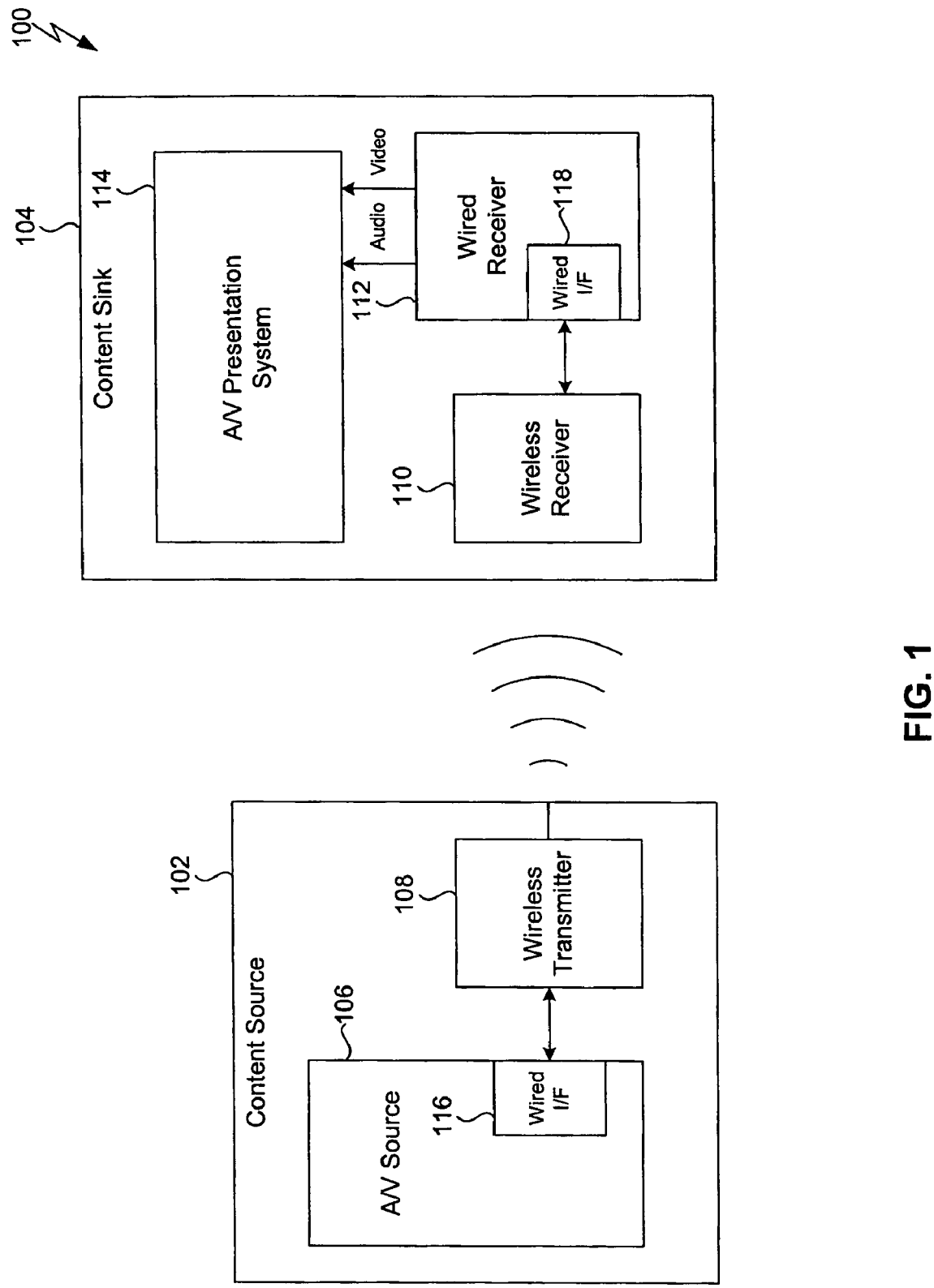
FIG. 1 depicts a generalized system for the wireless delivery of content from a content source to a content sink in accordance with an embodiment of the present invention.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

Rather than utilizing a general purpose solution based on 802.15.3a that fails to meet the needs of the high-quality and bandwidth-intensive applications, an embodiment of the present invention represents an effort to tailor the wireless solution to the application. As will be described in more detail herein, an example point-to-point interface designed in accordance with an embodiment of the present invention tailors the wireless physical (PHY) layer and media access control (MAC) layer to the throughput and quality requirements for HDMI cable replacement. In particular, an embodiment of the present invention facilitates the replacement of HDMI cables that are specified with a BER of $10^{-9}$. Such an interface requires up to a 1.5 Gbps link to the display but a backchannel of only a few kbps.

As will be discussed herein, a wireless interface in accordance with an embodiment of the present invention can also be used as a replacement for the delivery of other types of content over cable, including but not limited to DVI, CVSB, S-video, RGB video, YUV video, and/or various types of audio content such as RCA audio, XLR audio, and 5.1, 6.1, 7.1 and 10.1 surround sound audio.

A. Overview of System for Wireless Transmission of Content in Accordance with an Embodiment of the Present Invention The present invention is directed to a system, method and apparatus for implementing a wireless interface that securely and robustly delivers digital and/or analog content from a generalized content source to a generalized content sink. As will be described in more detail herein, an embodiment of the present invention accepts signals encoded for transmission over one or more wired connections at a content source and converts the signals into wireless signals modulated for transmission over the air. At a content sink, the resulting wireless signals are received and converted into signals encoded with a format expected given transmission over a wired connection.

A generalized system 100 in accordance with an embodiment of the present invention is illustrated in FIG. 1. As shown in FIG. 1, system 100 includes a content source 102 and a content sink 104. Content source 102 may comprise any device or system that generates audio and/or visual content for delivery to a content sink. For example, content source 102 may comprise a set top box, a digital versatile disc (DVD) player, a data VHS (DVS) player, or an audio/video (A/V) receiver, although these examples are not intended to be limiting. Content sink 104 may comprise any device or system that receives audio and/or visual content from a content source and operates to present it to a user. For example, content sink 104 may comprise a digital television (DTV), a plasma display device, a liquid-crystal display television (LCD TV), or a projector, although these examples are not intended to be limiting.

As further illustrated in FIG. 1, content source 102 includes an A/V source 106 and a wireless transmitter 108, while content sink 104 includes a wireless receiver 110, a wired receiver 112, and an A/V presentation system 114. Within content source 102, A/V source 106 generates A/V signals and outputs them in a format encoded for transmission over one or more wired connections via a wired interface 116. Wireless transmitter 108 receives the signals output via wired interface 116 and converts them into wireless signals modulated for transmission over the air. Within content sink 104, wireless receiver 110 receives the wireless signals and converts them into signals encoded with a format expected given transmission over a wired connection. The converted signals are received by wired receiver 112 via a wired interface 118. Wired receiver 112 processes the received signals and outputs them in a suitable format to A/V presentation system 114 for presentation to a user.

As noted above, signals output by wired interface 116 and input by wired interface 118 are encoded in a format for transmission over a wired medium. In example embodiments of the present invention, these interfaces may conform to one or more of the following standards for wired data transmission: High-Definition Media Interface (HDMI), Digital Video Interface (DVI), composite video (CVSB) interface, S-video interface, RGB video interface, YUV video interface, and/or a variety of audio formats including but not limited to RCA audio, XLR audio, and 5.1, 6.1, 7.1 and 10.1 surround sound audio formats. In an embodiment, the wired formats used by wired interface 116 and wired interface 118 are the same or similar, although the invention is not so limited.

By providing a wireless link between wired interfaces 116 and 118, an embodiment of the present invention permits a user to connect content source 102 and content sink 104 in a manner that eliminates the use of bulky and expensive wiring. By facilitating cable replacement, an embodiment of the present invention also significantly simplifies the process of setting up a system including one or more content sources and sinks. Furthermore, because wireless transmitter 108 is configured to receive signals from a standard wired interface and wireless receiver 110 is configured to output signals to a standard wired interface, these components are easily integrated with existing systems designed for operation with wired connections.

As will be readily appreciated by a person skilled in the art, although wireless transmitter 108 is shown as an internal component of content source 102 it can also be implemented as an external add-on component with respect to content source 102. In the former case, wired interface 116 comprises an internal interface of content source 102, while in the latter case, wired interface 116 provides an external interface to content source 102 to which wireless transmitter 108 is attached. Likewise, wireless receiver 110 can either be implemented as an internal component of content sink 104 or, alternatively, as an external add-on component with respect to content sink 104. In the former case, wired interface 118 comprises an internal interface of content sink 104, while in the latter case, wired interface 118 provides an external interface to content sink 104 to which wireless receiver 110 is attached.

Figure 2:
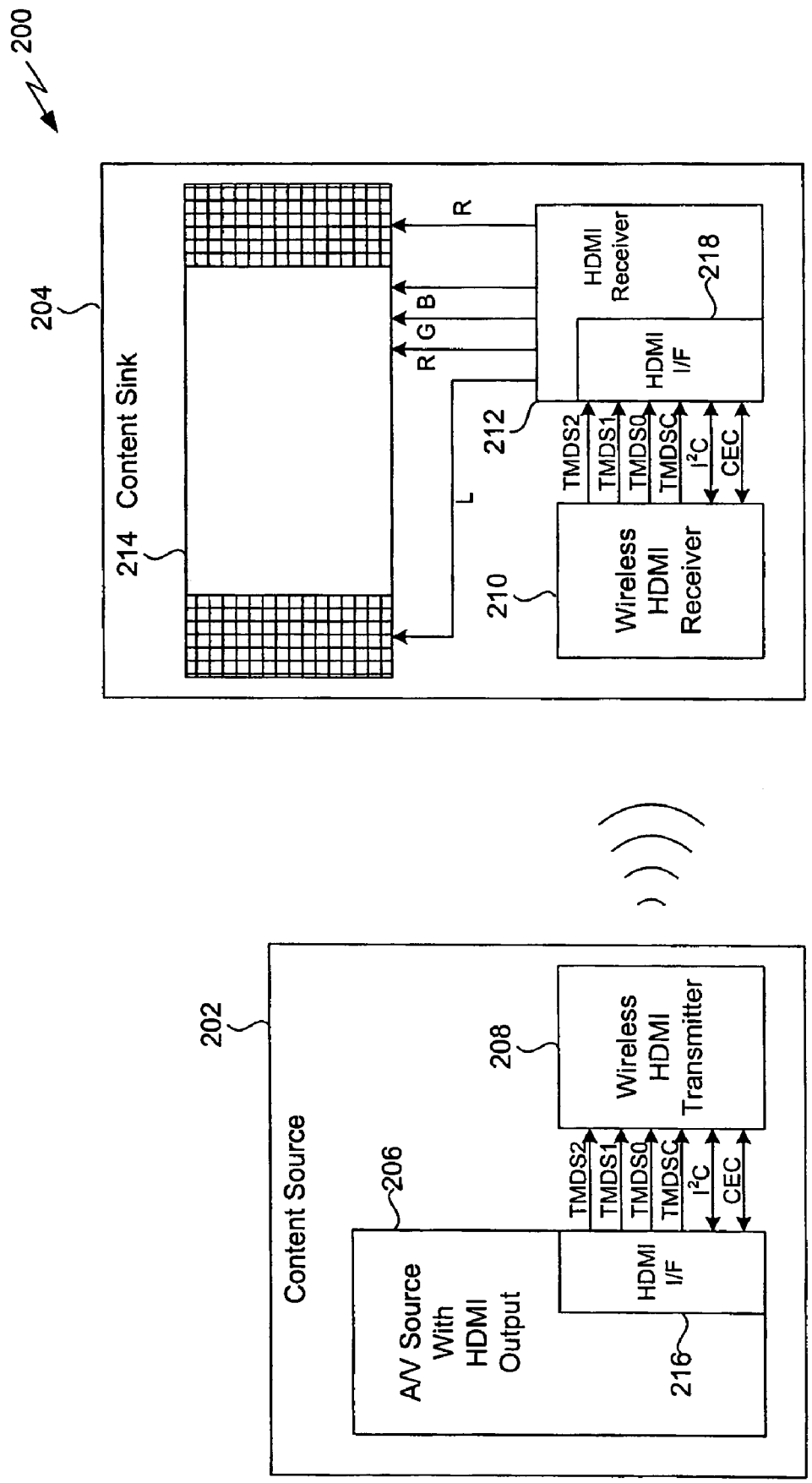
FIG. 2 depicts a system in which a wireless interface is used to replace HDMI cables between a content source and a content sink in accordance with an embodiment of the present invention.

As noted above, an example embodiment of the present invention can be used to replace HDMI cables between a content source and sink. This is illustrated by system 200 of FIG. 2. As shown in FIG. 2, system 200 includes a content source 202 and a content sink 204. Content source 202 includes an A/V source with HDMI output 206 and a wireless HDMI transmitter 208, while content sink 204 includes a wireless HDMI receiver 210, an HDMI receiver 212, and an A/V presentation system 214.

Within content source 202, A/V source 206 generates A/V signals and outputs them in an HDMI format via HDMI interface 216. Wireless HDMI transmitter 208 receives the signals output from A/V source 206 and converts them into wireless signals modulated for transmission over the air. Within content sink 204, wireless HDMI receiver 210 receives the wireless signals and converts them into standard HDMI signals. The converted signals are received by HDMI receiver 212 via an HDMI interface 218. HDMI receiver 212 processes the received signals and outputs them in a suitable format to A/V presentation system 214 for presentation to a user. For example, as shown in FIG. 2, HDMI receiver 212 outputs video signals (R, G, B) and audio signals (L, R) to A/V presentation system 214.

Figure 3:
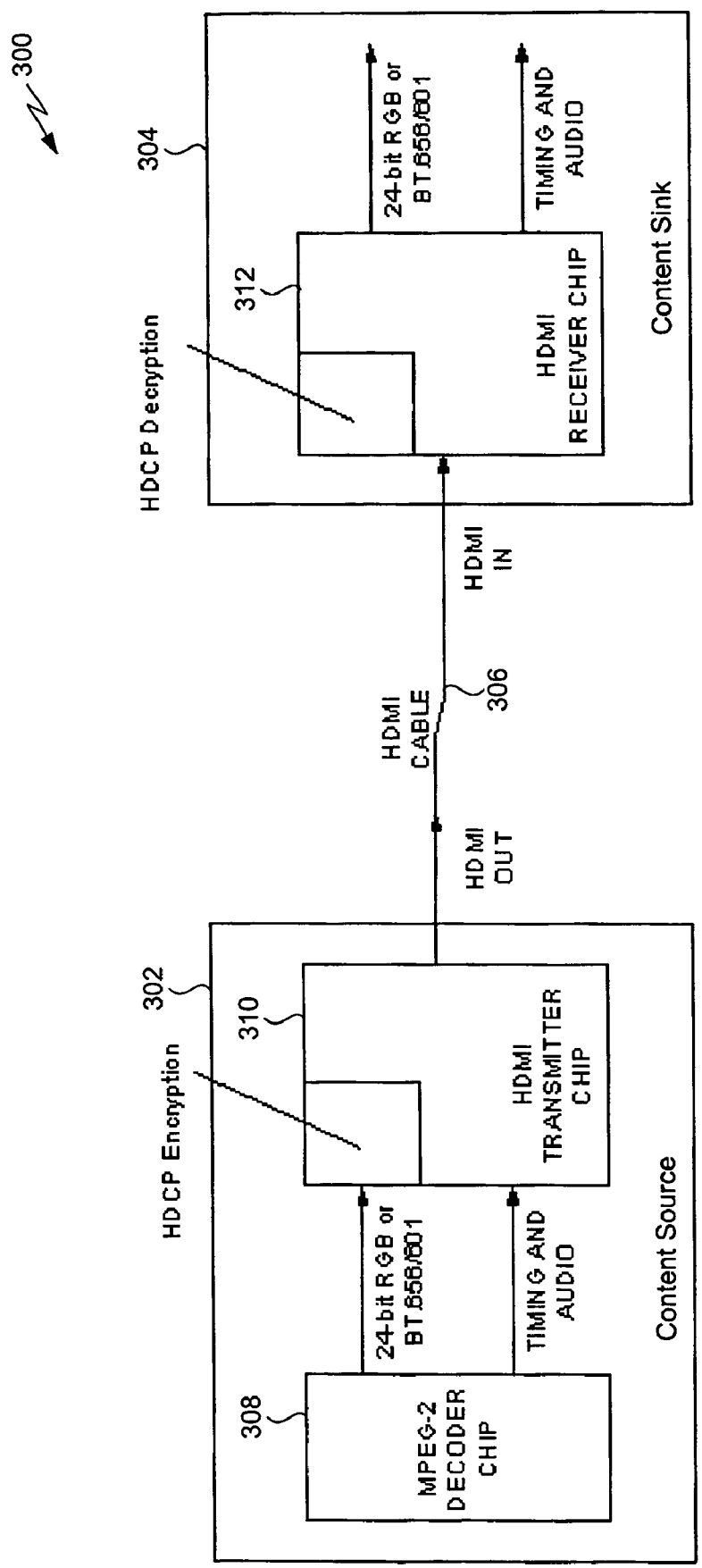
FIG. 3 depicts a prior art system in which HDMI signals are conveyed between a content source and a content sink using expensive and bulky HDMI cable.

By way of further illustration, FIG. 3 depicts a prior art system 300 in which HDMI signals are conveyed between a content source 302 and a content sink 304 using expensive and bulky HDMI cable 306. Content source 302 includes an MPEG-2 decoder chip 308 and an HDMI transmitter chip 310. MPEG-2 decoder chip 308 produces a 24-bit RGB or BT.656/601 encoded video signal and a timing and audio signal. HDMI transmitter chip 310 processes the signals from decoder chip 308, including performing HDCP encryption on the encoded video signal, and generates an HDMI OUT signal for transmission via HDMI cable 306. Content sink 304 includes an HDMI receiver chip 312 that receives the transmitted signal (now denoted HDMI IN) via HDMI cable 306 and processes it to recover the 24-bit RGB or BT.656/601 encoded video signal and the timing and audio signal.

Figure 4:
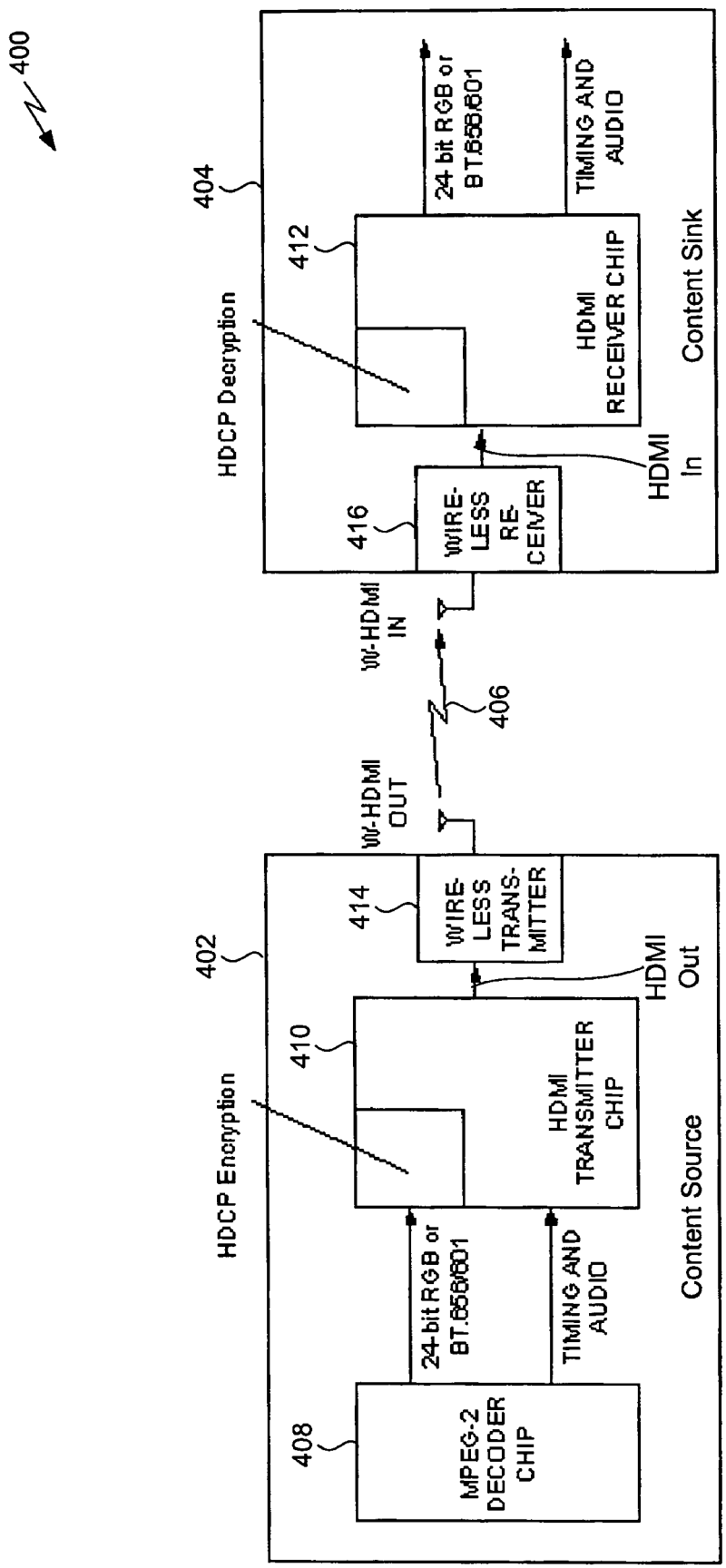
FIG. 4 illustrates a system in accordance with an embodiment of the present invention that provides for the wireless transmission of HDMI signals between a content source and a content sink.

In contrast, FIG. 4 illustrates a system 400 in accordance with an embodiment of the present invention that provides for the wireless transmission of HDMI signals. As shown in FIG. 4, system 400 includes a content source 402 and a content sink 404. Like content source 302 of FIG. 3, content source 402 includes an MPEG-2 decoder chip 408 and an HDMI transmitter chip 410 that operate to produce an HDMI OUT signal. This signal, however, is received by a wireless transmitter 414 which converts it into a signal 406 for wireless transmission (denoted W-HDMI OUT) and wirelessly transmits it over the air. A wireless receiver 416 within content sink 404 receives the wireless HDMI signal (now denoted W-HDMI IN) and converts the received signal into a format expected by HDMI receiver chip 412 given wired transmission, denoted HDMI IN. HDMI receiver chip 412 processes HDMI IN to recover the 24-bit RGB or BT.656/601 encoded video signal and the timing and audio signal in essentially the same manner as HDMI receiver chip 312 of FIG. 3.

The present invention is equally applicable to the wireless transmission of signals formatted in accordance with wired formats other than HDMI. For example, the present invention can be applied to wirelessly transmit DVI and analog audio signals between a content source and content sink. By way of illustration, FIG. 5 depicts a prior art system 500 in which DVI signals and analog audio signals are conveyed between a content source 502 and a content sink 504 using a DVI cable 506 and 2-6 audio cables 508, respectively.

Figure 5:
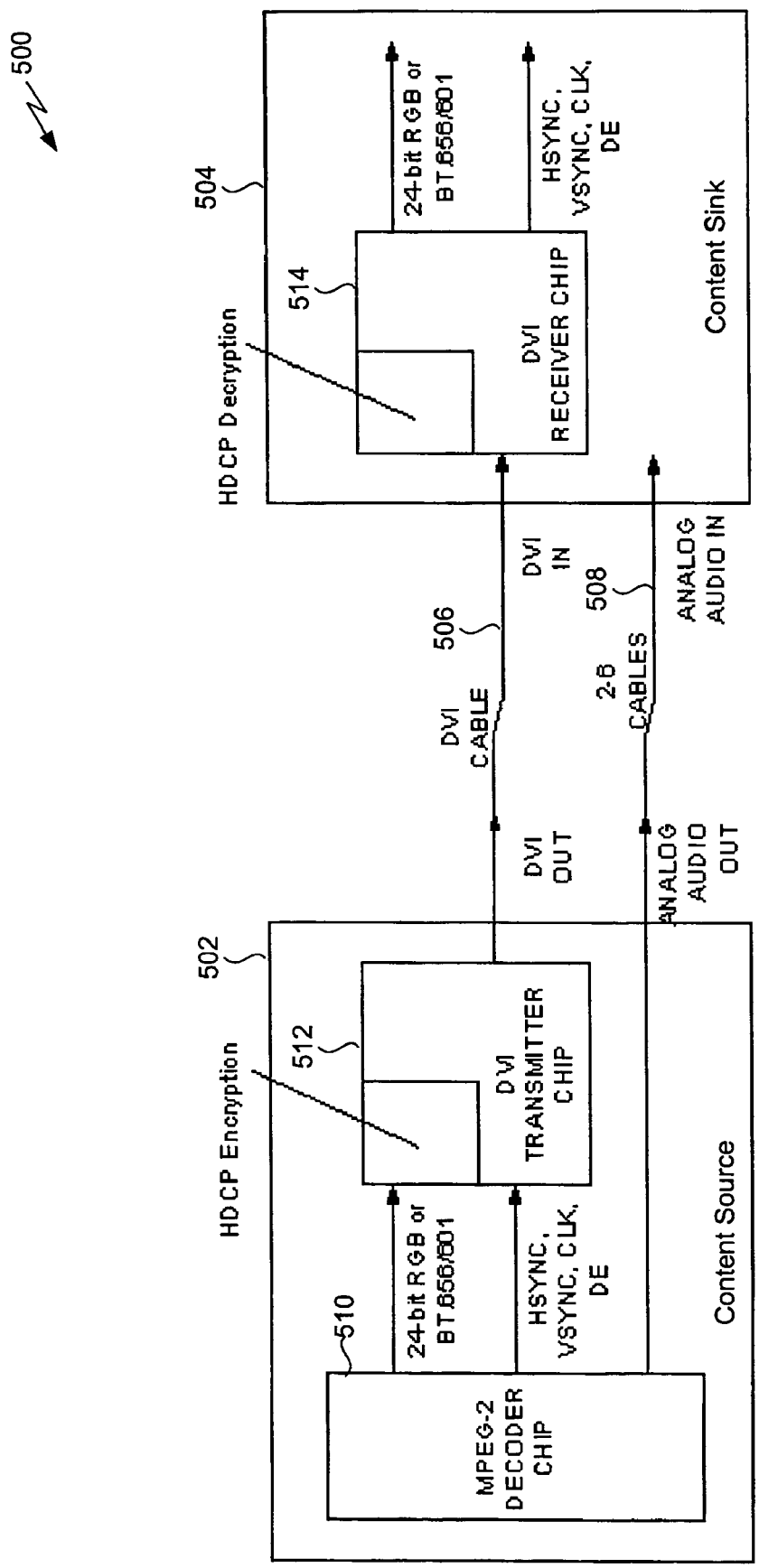
FIG. 5 depicts a prior art system in which DVI signals and analog audio signals are conveyed between a content source and a content sink using a DVI cable and a plurality of audio cables, respectively.

As shown in FIG. 5, content source 502 includes an MPEG-2 decoder chip 510 and a DVI transmitter chip 512. MPEG-2 decoder chip 510 produces a 24-bit RGB or BT.656/601 encoded video signal, the standard DVI HSYNC, VSYNC, CLK and DE signals, and an audio output signal designated ANALOG AUDIO OUT. DVI transmitter chip 512 processes the encoded video signal (including performing HDCP encryption on the video signal) and the HSYNC, VSYNC, CLK and DE signals to generate a DVI OUT signal for transmission via DVI cable 506. ANALOG AUDIO OUT is transmitted via analog cables 508. Content sink 504 includes a DVI receiver chip 514 that receives the DVI OUT signal, now denoted DVI IN, via DVI cable 506 and processes it to recover the 24-bit RGB or BT.656/601 encoded video signal and the HSYNC, VSYNC, CLK and DE signals. The transmitted ANALOG AUDIO OUT signal, now denoted ANALOG AUDIO IN, is received by content sink 504 over audio cables 508.

Figure 6:
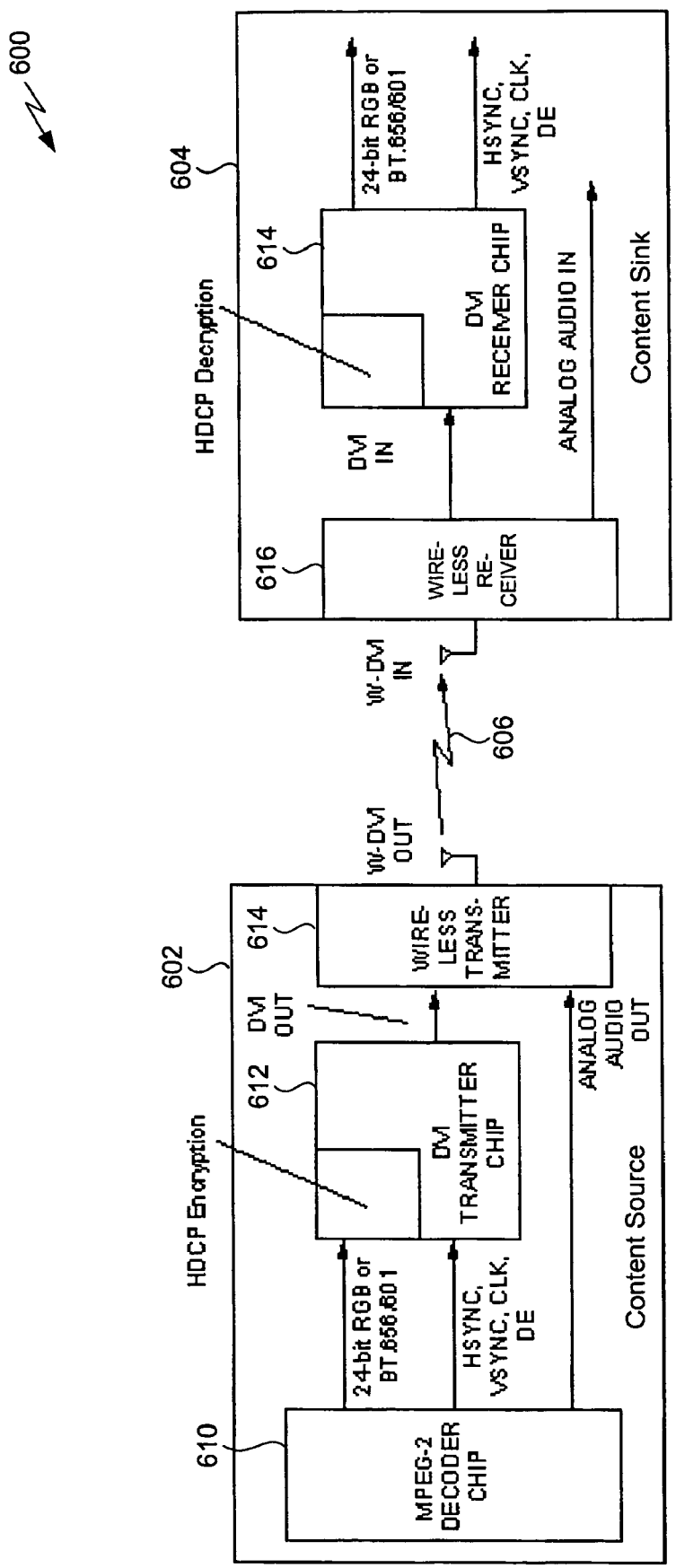
FIG. 6 illustrates a system in accordance with an embodiment of the present invention that provides for the wireless transmission of DVI and analog audio signals from a content source to a content sink.

In contrast, FIG. 6 illustrates a system 600 in accordance with an embodiment of the present invention that provides for the wireless transmission of DVI and analog audio signals. As shown in FIG. 6, system 600 includes a content source 602 and a content sink 604. Like content source 502 of FIG. 5, content source 602 includes an MPEG-2 decoder chip 610 that operates, along with a DVI transmitter chip 612, to produce a DVI OUT signal and that also operates to produce an ANALOG AUDIO OUT signal. These signals, however, are received by a wireless transmitter 614 that converts them into a signal 606 for wireless transmission (denoted W-DVI OUT) and wirelessly transmits it over the air. A wireless receiver 616 within content sink 604 receives the wireless DVI signal (now denoted W-DVI IN) and converts the received signal into a signal having a format expected by DVI receiver chip 614 given wired transmission, denoted DVI IN, as well as into a recovered analog audio signal denoted ANALOG AUDIO IN. DVI receiver chip 614 processes DVI IN to recover the 24-bit RGB or BT.656/601 encoded video signal and the HSYNC, VSYN, CLK and DE signals in a like manner to DVI receiver chip 514 of FIG. 5.

Note that the present invention is not limited to the foregoing exemplary embodiments, and encompasses the transmission of other types of content traditionally transferred from a source to a sink over a wired medium. Additionally, as will be described in more detail herein, an embodiment of the present can advantageously be implemented to enable wireless communication between multiple content sources and multiple content sinks.

For example, as will be described in more detail herein, the present invention broadly encompasses a system consisting of N media transmitters, wherein a media transmitter includes at least one content/media source and a transmit (TX) wireless media adapter, and 1 media receiver, wherein a media receiver includes at least one content/media sink and a receive (RX) wireless media adapter. The media transmitters communicate to the media receiver over one radio channel for the purposes of sending video, audio, and control information and the media transmitter and media receiver exchange signal quality information, capability information, security information and other control information using a separate radio channel.

The present invention also broadly encompasses a system consisting of 1 media transmitter and N media receivers in which the media transmitter communicates to the media receivers over one radio channel for the purposes of sending video, audio, and control information and in which the media transmitter and media receivers convey signal quality information, capability information, security information and other control information using a separate radio channel. The invention also encompasses a system as above wherein the N media receivers share the backchannel by transmitting information and waiting for a response.

B. Transmission of Uncompressed or Losslessly Compressed Content in Accordance with an Embodiment of the Present Invention In accordance with an embodiment of the present invention, uncompressed or losslessly compressed high-definition content, such as video or Surround Sound, is transmitted wirelessly between one or more high-definition content sources and one or more high-definition content sinks. Thus, for example, with continued reference to system 100 of FIG. 1, content source 102 may be configured in accordance with an embodiment of the present invention to wirelessly transmit uncompressed or losslessly compressed high-definition content to content sink 104.

Compression, which is also known as "packing," refers to the creation of a smaller file from a larger file or group of files. Compression may also be defined as storing data in a format that requires less space than a standard storage format associated with that data. "Lossless compression" refers to a compression process in which no data is lost in a technical sense. Therefore, the compression process is reversible. In contrast, "lossy compression" is compression during which some data is lost. This process is irreversible.

One common lossless compression technique is "run length encoding," in which long runs of the same data value are compressed by transmitting a prearranged code for "string of ones" or "string of zeros" followed by a number for the length of the string. Another lossless scheme is similar to Morse Code, wherein the most frequently occurring letters have the shortest codes. Huffman or entropy coding computes the probability that certain data values will occur and then assigns short codes to those with the highest probability and longer codes to the ones that don't show up very often. Everyday examples of programs that use lossless compression include the Stuffit™ program for Macintosh computers, developed and published by Allume Systems, Inc. of Watsonville, Calif., and the WinZip® program for Windows-based computers, developed and published by WinZip Computing, Inc. of Mansfield, Conn.

Lossy video compression systems use lossless techniques when necessary or feasible, but also derive substantial savings by discarding selected data. To achieve this, an image is processed or "transformed" into two groups of data. One group contains what is deemed essential information while the other group contains what is deemed unessential information. Only the group of essential information needs to be kept and transmitted. Examples of lossy video compression include MPEG-2 and MPEG-4.

Figure 7:
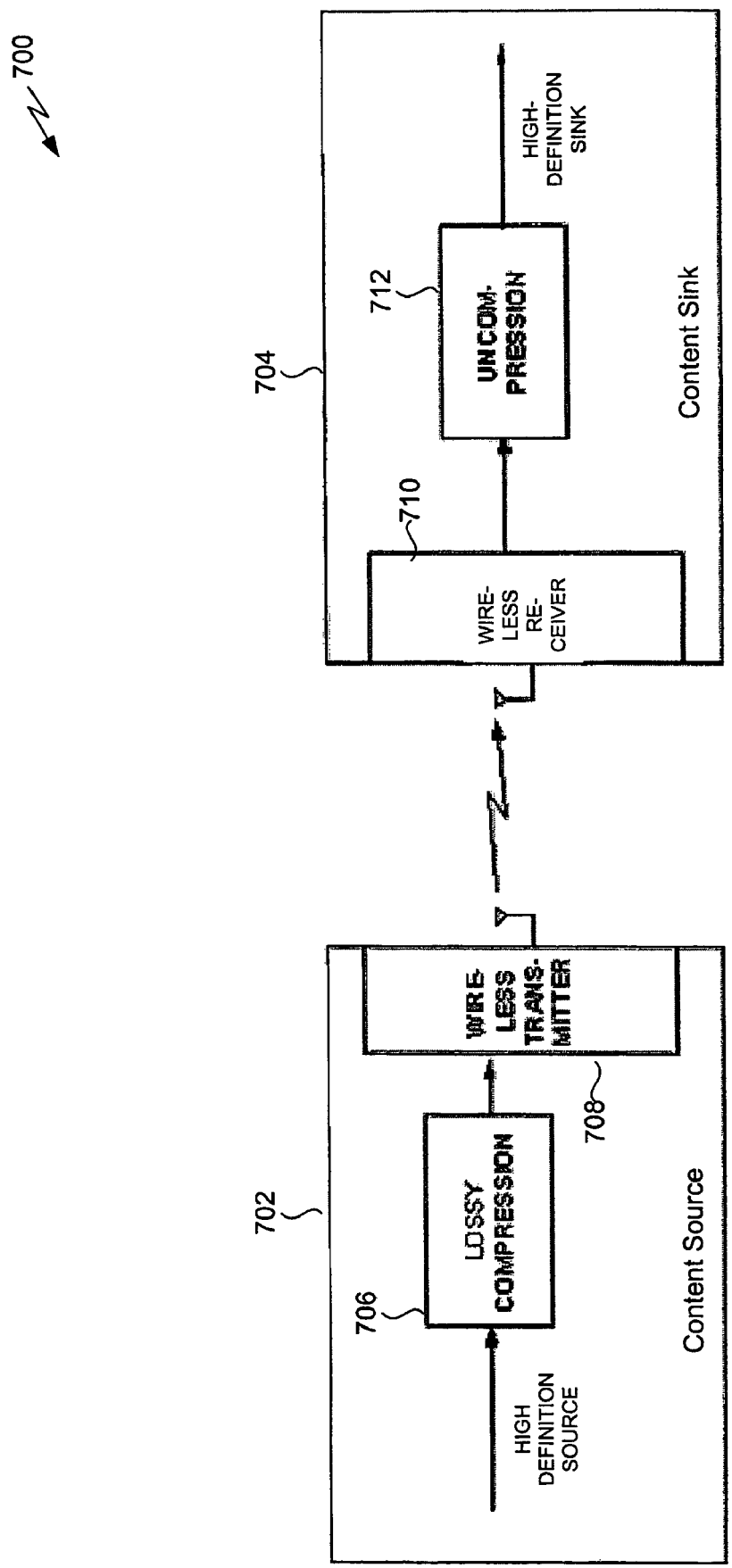
FIG. 7 illustrates a prior art system in which lossy compressed high-definition content is transferred wirelessly from a content source to a content sink.

By way of illustration, FIG. 7 illustrates a prior art system 700 in which lossy compressed high-definition content is transferred wirelessly from a content source 702 to a content sink 704. As shown in FIG. 7, content source 702 includes lossy compression logic 706, which receives high-definition content and compresses it in accordance with a lossy compression technique, and a wireless transmitter 708 that transmits the compressed content in the form of a wireless signal to content sink 704. Content sink 704 includes a wireless receiver 710, which receives the wireless signal and recovers the compressed content therefrom, and uncompression logic 712, which uncompresses the compressed content. The prior art also encompassed the passing of uncompressed content over a wired connection.

Figure 8:
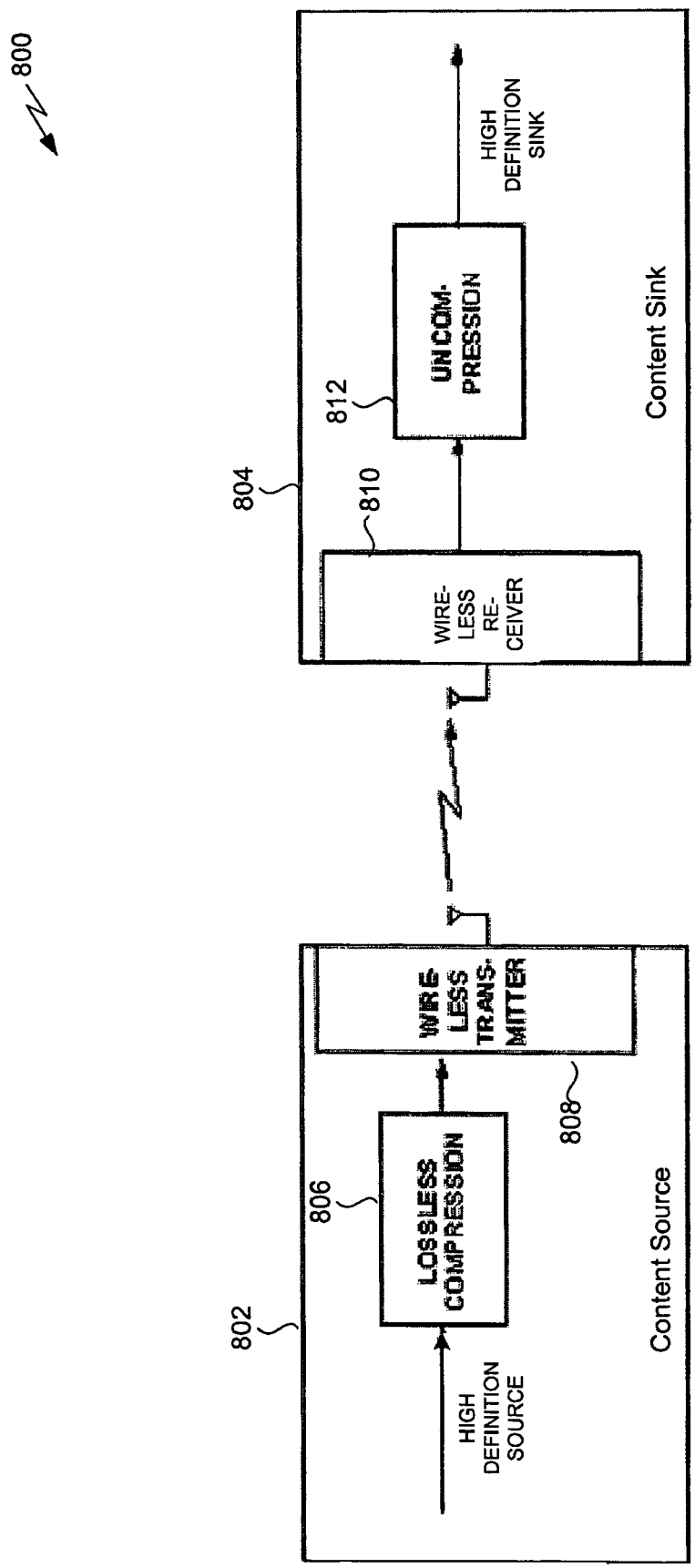
FIG. 8 depicts a system that employs lossless compression combined with a sophisticated wireless interface for the transfer of high-definition content from a content source to a content sink in accordance with an embodiment of the present invention.

In contrast, rather than employing lossy compression to allow transmission over simple wireless systems, an embodiment of the present invention shown in FIG. 8 employs lossless compression combined with a more sophisticated wireless system that will be described in more detail herein. In particular, FIG. 8 depicts a system 800 that includes a content source 802 and a content sink 804. As shown in FIG. 8, content source 802 includes lossless compression logic 806, which receives high-definition content and compresses it in accordance with a lossless compression technique, and a wireless transmitter 808 that transmits the compressed content in the form of a wireless signal to content sink 804. Content sink 804 includes a wireless receiver 810, which receives the wireless signal and recovers the compressed content therefrom, and uncompression logic 812, which uncompresses the compressed content.

Figure 9:
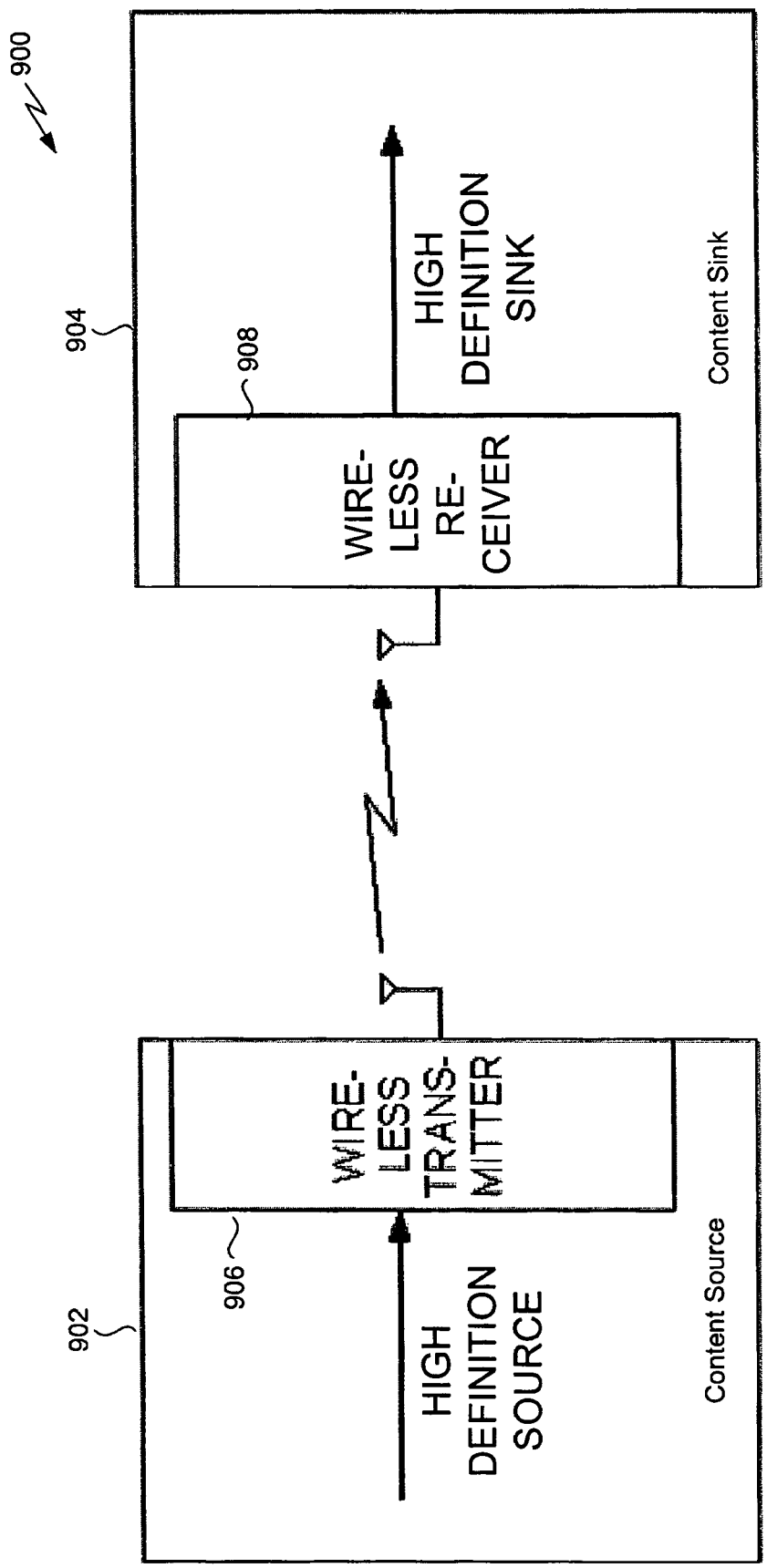
FIG. 9 depicts a system that employs no compression and a sophisticated wireless interface for the transfer of high-definition content from a content source to a content sink in accordance with an embodiment of the present invention.

In further contrast to the prior art system depicted in FIG. 7, an embodiment of the present invention shown in FIG. 9 employs no compression and a more sophisticated wireless system that will be described in more detail herein. In particular, FIG. 9 depicts a system 900 that includes a content source 902 and a content sink 904. As shown in FIG. 9, content source 902 includes a wireless transmitter 906 that transmits uncompressed high-definition content in the form of a wireless signal to content sink 904. Content sink 904 includes a wireless receiver 908 that receives the wireless signal and recovers the uncompressed content therefrom.

The embodiments illustrated in FIGS. 8 and 9 are advantageous because a very noisy wireless channel will result in severe performance degradation for lossy compressed content, whereas uncompressed and losslessly compressed content will allow for much higher quality reproduction at the content sink with given wireless channel characteristics (e.g., bit error rate, signal dropout rate, energy-to-noise ratio per bit). Furthermore, compression adds latency and offsets between video and audio, each degrading the perceived quality at the video content sink. Finally, compression requires expensive processing devices that can be eliminated in an embodiment of the present invention that does not use compression or whose complexity can be greatly reduced in an embodiment of the present invention that uses lossless compression.

C. Use of Wired Security Protocols Over Wireless Channels in Accordance with an Embodiment of the Present Invention In accordance with an embodiment of the present invention, security protocols designed for content transfer over a wired medium, such as High-bandwidth Digital Content Protection (HDCP) or Data Transmission Content Protection (DTCP), are used for operation over wireless channels. Thus, for example, with continued reference to system 100 of FIG. 1, content source 102 and content sink 104 may be configured in accordance with an embodiment of the present invention to perform HDCP or DTCP security protocols for wireless content transfer.

Figure 10:
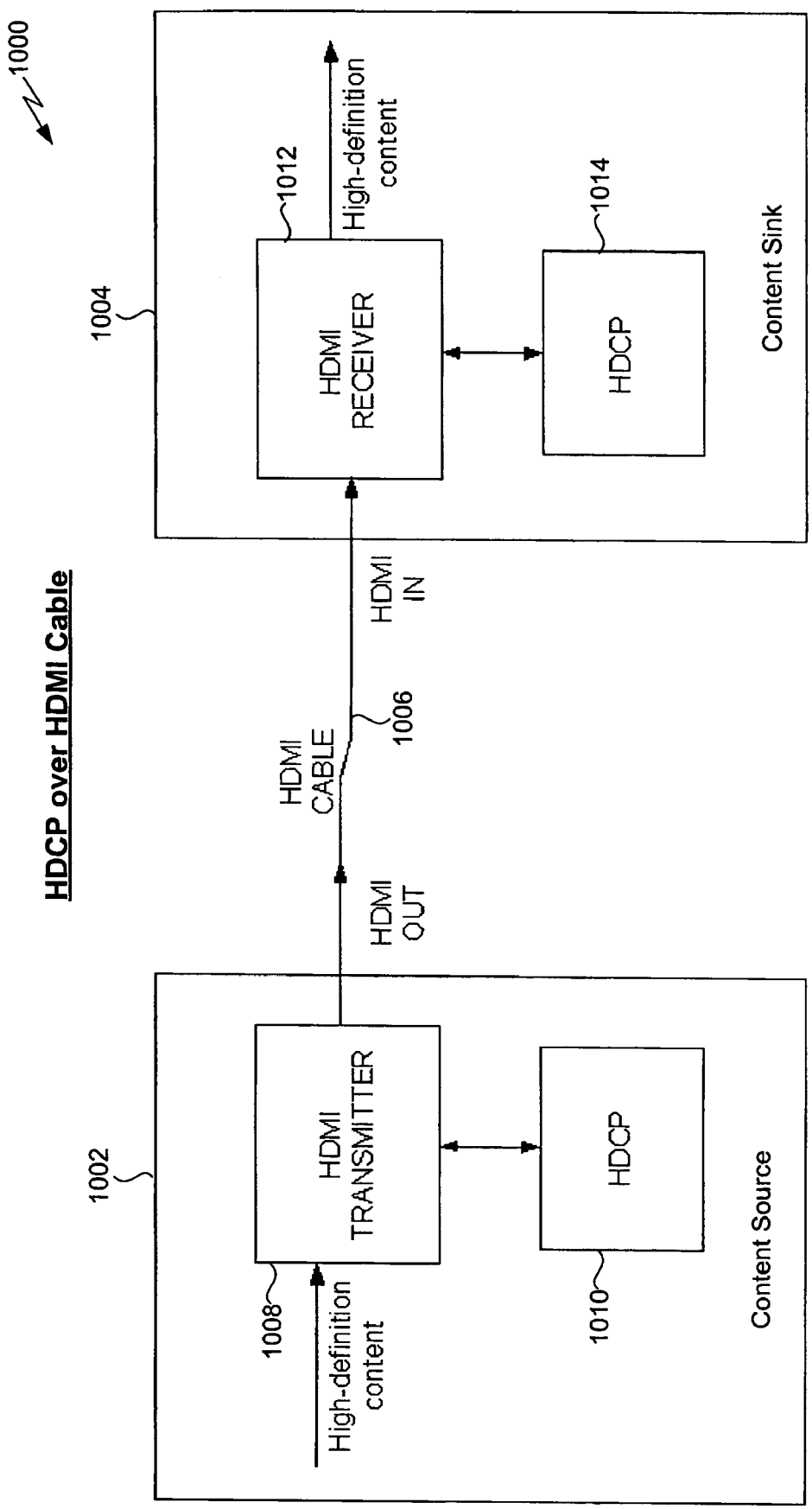
FIG. 10 illustrates a conventional system in which HDCP protocol is performed on data transmitted over standard HDMI cable from a content source to a content sink.

By way of illustration, FIG. 10 illustrates a conventional system 1000 in which HDCP protocol is performed on data transmitted over standard HDMI cable. As shown in FIG. 10, system 1000 includes a content source 1002 and a content sink 1004. Content source includes an HDMI transmitter 1008 that receives high-definition content and processes it to generate an HDMI OUT signal for transmission via HDMI cable 1006. Content sink 1004 includes an HDMI receiver 1012 that receives the transmitted signal (now denoted HDMI IN) via HDMI cable 1006 and processes it to recover the high-definition content. Content source 1002 also includes HDCP logic 1010 that is configured to perform an HDCP authentication process and/or encryption of high-definition content in accordance with the HDCP standard. Likewise, content sink 1004 also includes HDCP logic 1014 that is configured to perform an HDCP authentication process and/or decryption of high-definition content in accordance with the HDCP standard. Any HDCP signals or parameters that must be exchanged between content source 1002 and content sink 1004 are transferred over HDMI cable 1006.

In contrast, an embodiment of the present invention performs HDCP protocol over a wireless link. This may involve performing an HDCP authentication process over the wireless link. In a particular embodiment, a first wireless channel is used to pass high-definition content from the content source to the content sink while a separate frequency band (i.e., backchannel) is used to exchange HDCP parameters in a bi-directional manner between the content source and content sink.

Figure 11:
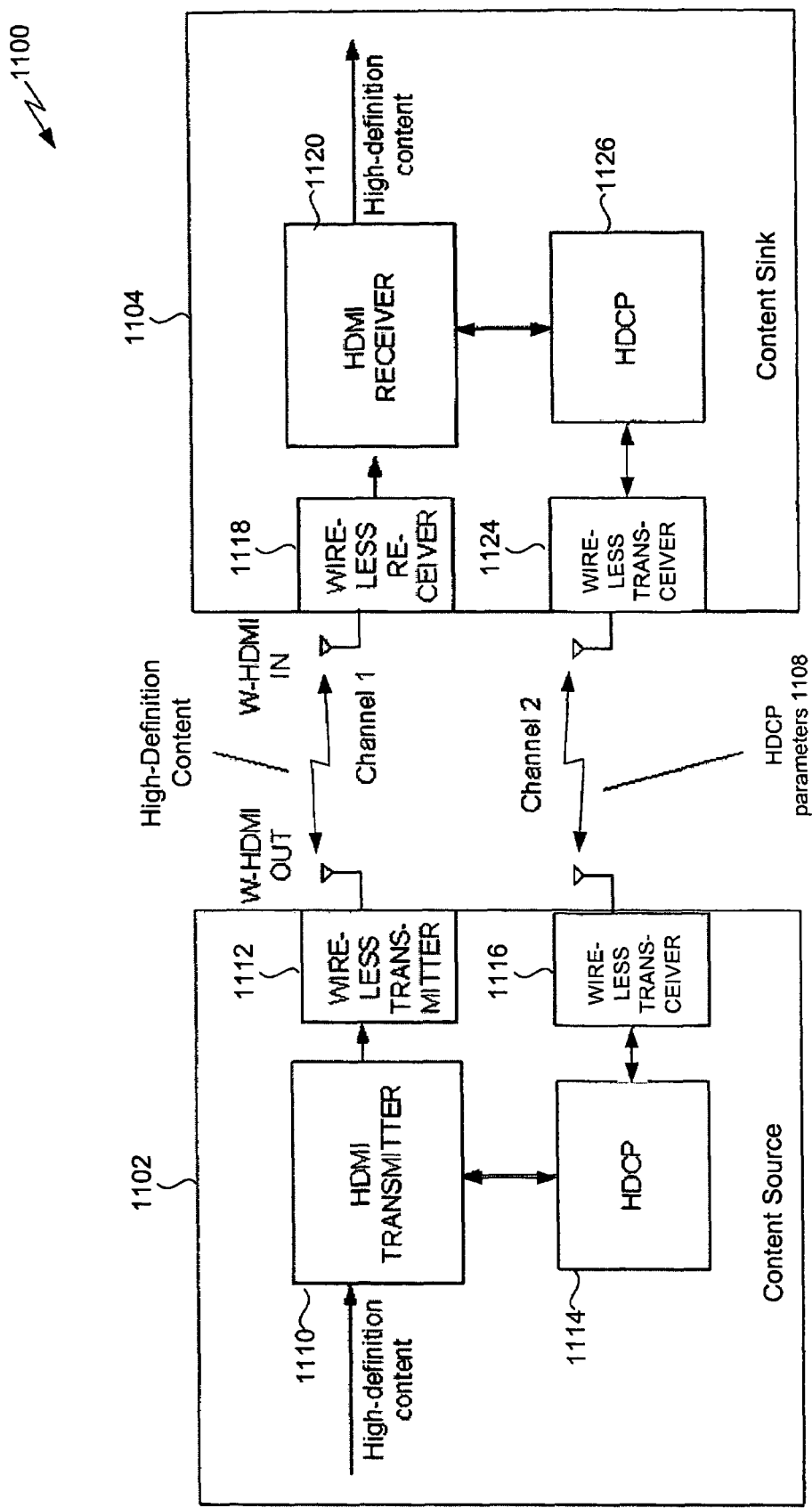
FIG. 11 depicts a system that performs HDCP protocol over a wireless link between a content source and a content sink in accordance with an embodiment of the present invention.

FIG. 11 illustrates such a system. As shown in FIG. 11, system 1100 includes a content source 1102 and a content sink 1104. Content source 1102 includes an HDMI transmitter 1110, HDCP logic 1114, a wireless transmitter 1112, and a wireless transceiver 1116. Content sink 1104 includes a wireless receiver 118, an HDMI receiver 1120, HDCP logic 1126, and a wireless transceiver 1124.

HDMI transmitter 1110 within content source 1102 receives high-definition content and processes it to generate a signal for wired transfer. This signal is received by wireless transmitter 1112 which converts it into a signal for wireless transmission, denoted W-HDMI OUT, and wirelessly transmits it over the air via a first wireless channel, denoted channel 1. Wireless receiver 1118 within content sink 1104 receives the wireless signal, now denoted W-HDMI IN, and converts the received signal into a format expected by HDMI receiver 1120 given wired transmission. HDMI receiver 1120 receives the converted signal and operates to recover high-definition content therefrom.

Within content source 1102, HDCP logic 1114 operates to perform an HDCP authentication process and encryption of high-definition content in accordance with the HDCP standard. Likewise, within content sink 1104, HDCP logic 1126 operates to perform an HDCP authentication process and decryption of high-definition content in accordance with the HDCP standard. Any HDCP signals or parameters 1108 that must be exchanged between content source 1102 and content sink 1104 are wirelessly passed between wireless transceiver 1116 and wireless transceiver 1124 in a bi-directional manner over a second wireless channel (i.e., the backchannel), denoted channel 2 in FIG. 11.

In an alternative embodiment, HDCP parameters that must be communicated from content source 1102 to content sink 1104 are transmitted on channel 1 along with high-definition content, while HDCP parameters that must be communicated from content sink 1104 to content source 1102 are all passed exclusively over the backchannel. In accordance with such an embodiment, wireless transceiver 1116 in content source 1102 might be replaced by a wireless receiver and wireless transceiver 1124 in content sink 1104 might be replaced by a wireless transmitter as only uni-directional transfer of these signals would be required over the backchannel.

Historically speaking, security protocols created for wired connections have not been applied to wireless channels. Instead, entirely new security protocols have been developed. These alternative protocols often require the stripping off of content protection, thereby potentially exposing unencrypted content. Furthermore, these new security protocols typically require a long and difficult approval process to be performed. In addition, new hardware and software must be developed to support the new security protocols. An embodiment of the present invention such as that described immediately above advantageously utilizes security protocols already approved for wired transmissions by content providers (e.g., MPAA). By extending these protocols to wireless transmissions, an embodiment of the present invention greatly simplifies the approval process by content providers. Furthermore this approach allows the use of existing source and sink processors, extended with a wireless connection, for secure content transfer.

D. Use of Two Wireless Channels for Communication Between a Content Source/Sink Pair in Accordance with an Embodiment of the Present Invention In accordance with an embodiment of the present invention, a first wireless frequency band, or channel, is dedicated to the passing of high-definition content between a single, adaptively chosen, content source/sink pair and a second frequency band, or channel, different from that used for the passing of high-definition content, is used to bi-directionally pass media access control (MAC) information and multimedia signaling information between the pair. Such multimedia signaling information may include Display Data Channel (DDC) and Consumer Electronics Control (CEC) channel information. The first channel may also be referred to herein as "the downstream link" while the second channel may also be referred to herein as "the backchannel".

This approach is particularly useful when a source/sink pair is in an area adequately RF-isolated from other source/sink pairs. For example, the source/sink pairs may be sufficiently separated spatially so that pairs do not interfere with one another, may be isolated from one another due to RF propagation obstacles such as walls, or may be isolated from one another due to directional RF propagation achieved using antennas with directionality (i.e., antennas that are not omni-directional).

Figure 12:
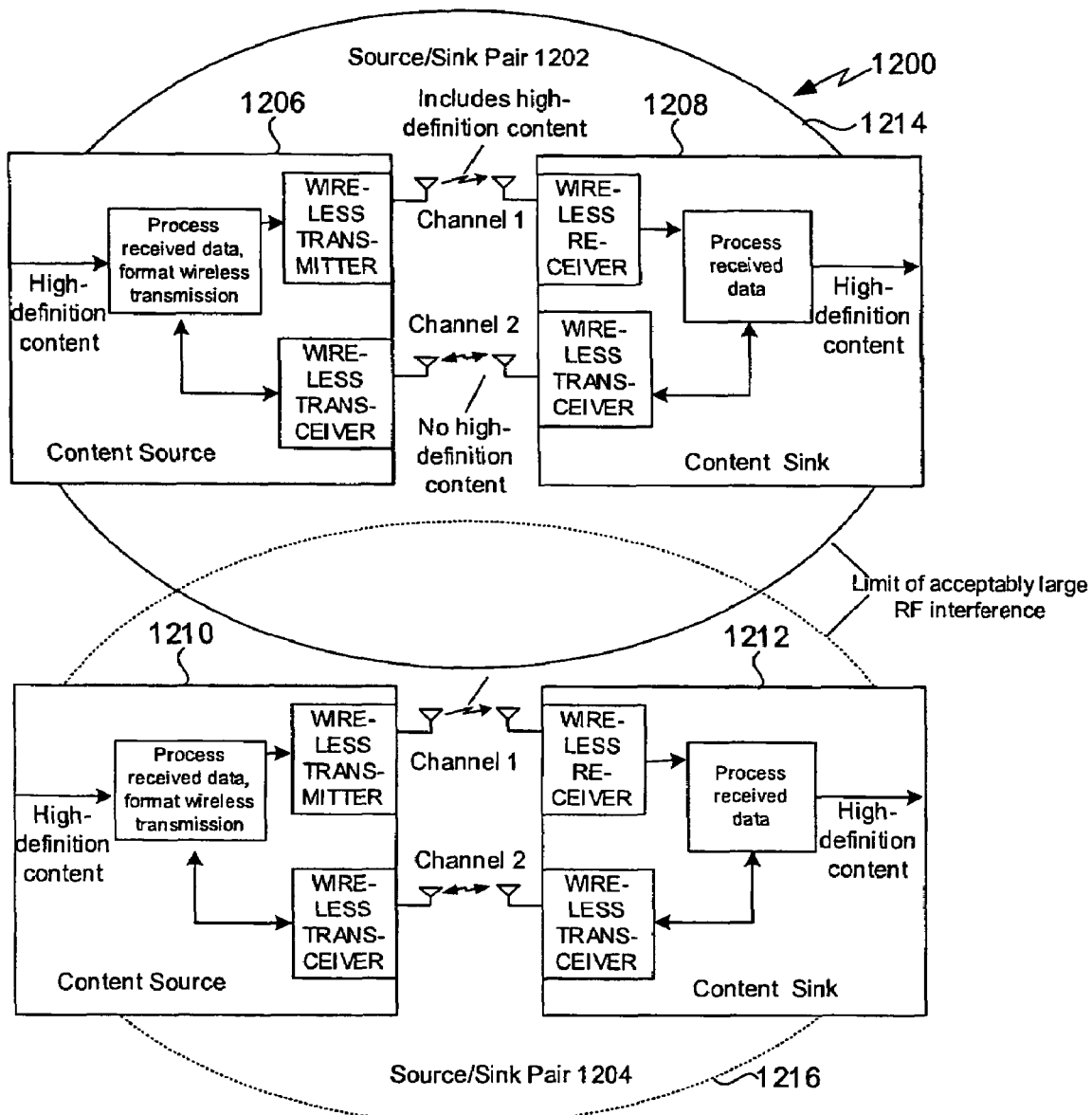
FIG. 12 illustrates an embodiment of the present invention in which two source/sink pairs each utilize a first wireless channel for the transmission of high-definition content and a second wireless channel for MAC and multimedia signaling.

FIG. 12 illustrates an embodiment of the present invention in which two source/sink pairs each utilize a first wireless channel for the transmission of high-definition content and a second wireless channel for the bi-directional transfer of MAC information and multimedia signaling as described above.

In particular, as shown in FIG. 12, a system 1200 in accordance with an embodiment of the present invention includes a first adaptively-chosen content source/sink pair 1202 and a second adaptively-chosen content source/sink pair 1204. For each pair, there is an area beyond which large RF interference will not significantly impact performance. For source/sink pair 1202, the outside limit of this area is indicated by reference numeral 1214, while for source/sink pair 1204, the outside limit is indicated by reference numeral 1216.

Content source/sink pair 1202 includes a content source 1206 and a content sink 1208. Content source/sink pair 1204 includes a content source 1210 and a content sink 1212. Each of content sources 1206 and 1210 receive and process high-definition content, format it for wireless transmission, and transmit it over a first channel ("channel 1") using a wireless transmitter. Each of content sinks 1208 and 1212 receives and processes the data transmitted over channel 1, recovering the high-definition content therefrom.

Furthermore, each of content sources 1206 and 1210 and content sinks 1208 and 1212 include a wireless transceiver for the bi-directional transfer of media access control (MAC) information and multimedia signaling between the pair over a second channel ("channel 2"). As noted above, such multimedia signaling may include Display Data Channel (DDC) and Consumer Electronics Control (CEC) channel information.

In contrast to the above embodiment, conventional wireless systems that are used or proposed for the passing of high-definition content (such as 802.11 and UWB systems) employ a complex in-band MAC layer to arbitrate channel usage between one or more content sources and one or more content sinks. This MAC layer adds overhead, thereby reducing throughput. In addition, MAC layer signaling requires a much lower data rate than that needed for high-definition content transfer and therefore, during intervals over which MAC layer signaling is passed, the channel usage is small relative to what could actually be passed. The same conventional proposals also perform multimedia signaling, such as DDC or CEC signaling, in-band. Again, passing this information requires a relatively low data rate and thus inefficiently uses spectral resources.

An approach in accordance with an embodiment of the present invention allows significant throughput improvements between a source/sink pair since a wide frequency band is dedicated for the transfer of high-definition content from the source to the sink whereas a small frequency band is used for MAC and multimedia signaling.

Figure 13:
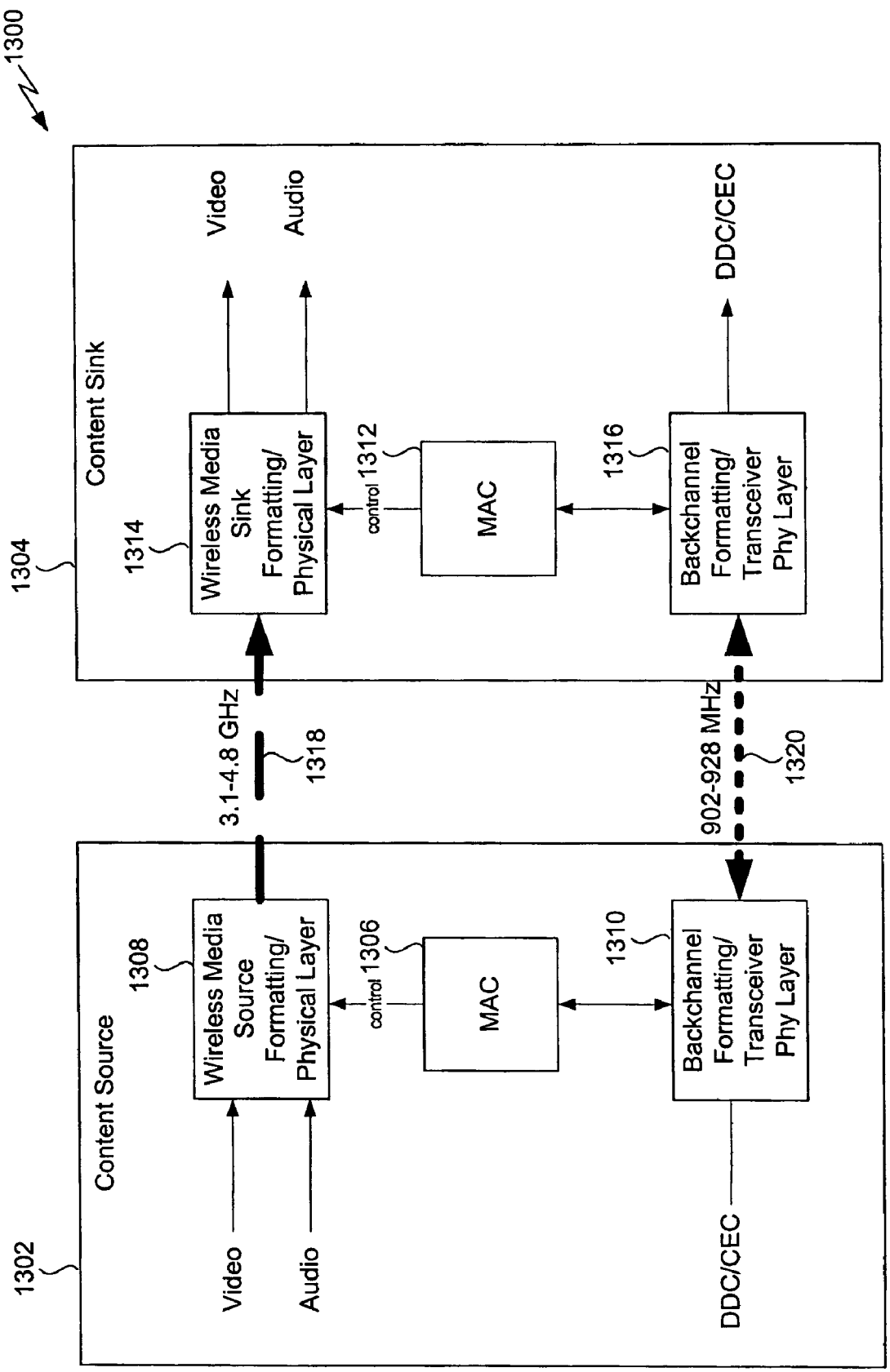
FIG. 13 illustrates in more detail a system in accordance with an embodiment of the present invention that utilizes a first wireless channel for passing high-definition content and a second wireless channel for MAC and multimedia signaling.

FIG. 13 illustrates in more detail a system 1300 in accordance with an embodiment of the present invention that utilizes a first wireless channel for passing high-definition content and a second wireless channel for MAC and multimedia signaling. As shown in FIG. 13, system 1300 includes a content source 1302 and a content sink 1304. Content source 1302 includes a MAC 1306, logic 1308, and logic 1310. Logic 1308 performs source formatting and physical layer functions for transmitting video and audio content over a wireless media channel 1318 under the control of MAC 1306. Logic 1310 performs backchannel formatting and transceiver physical layer functions for communicating MAC information and multimedia signaling (such as DDC/CEC signaling) over a backchannel 1310. Information relevant to backchannel protocols is communicated between MAC 1306 and logic 1310.

As further shown in FIG. 13, content sink 1304 includes a MAC 1312, logic 1314 and logic 1316. Logic 1314 performs sink formatting and physical layer functions for receiving video and audio content over wireless media channel 1318 under the control of MAC 1312. Logic 1316 performs backchannel formatting and transceiver physical layer functions for communicating MAC information and multimedia signaling (such as DDC/CEC signaling) over backchannel 1310. Information relevant to backchannel protocols is communicated between MAC 1312 and logic 1316.

In one embodiment of the present invention, wireless media channel 1318 occupies a bandwidth approximately in the range of 3.1 GHz to 4.8 GHz, while backchannel 1320 occupies a bandwidth approximately in the range of 902-928 MHz. This bandwidth allocation is graphically depicted in FIG. 14.

As will be discussed in more detail herein, a wireless interface in accordance with an embodiment of the present invention utilizes orthogonal frequency division multiplexing (OFDM) for transmitting signals between a content source and a content sink. In one such implementation, OFDM null tones and/or windowing may be used to ensure that the use of a wireless protocol in accordance with an embodiment of the present invention does not interfere with wireless systems such as 802.11j that operate at or near 4.9 GHz.

In an alternate embodiment, a bandwidth approximately in the range of 6-10.6 GHz is used for wireless transmission of high-definition content. This is advantageous in that it avoids interference from users with communications systems designed for operation in other bands. No high-volume systems have currently been proposed for operation in this band. In an embodiment of the present invention that utilizes frequency hopping (as will be described herein), this allows an increase in peak power by more than a factor of two while still meeting FCC transmit power requirements.

In another embodiment of the present invention, a wireless media delivery system that uses OFDM for transmitting signals between a wireless transmitter media adapter and a wireless receiver media adapter can provide streaming audio information to multiple audio speakers simultaneously. In accordance with this embodiment, a media sink includes one or more audio speakers. To continuously provide audio signals to each speaker, the media delivery system can assign a range of OFDM tones to each speaker. Audio information directed to a specific speaker is transported over the assigned range of frequencies. In this way, an embodiment of the present invention can provide streaming analog audio information from a media source to a media sink having multiple audio speakers to implement a surround sound audio scheme.

E. Auto-Detection and Auto-Connection between a Content Source and Content Sink in Accordance with an Embodiment of the Present Invention In accordance with an embodiment of the present invention, an auto-detect and auto-pairing/auto-connect process is carried out over a separate RF channel from that used for wireless content transmission. The process determines from a set of possible content sources and content sinks a pair for which the channel should be dedicated for a particular time interval. In contrast, prior art systems utilize separate wired connections between each transmitter and receiver or use a complicated MAC for wireless channel contention. An embodiment of the present invention advantageously eliminates the overhead of such a complex MAC, eliminates cables, and eliminates manual user connection of wireless sources/sinks.

Figure 15:
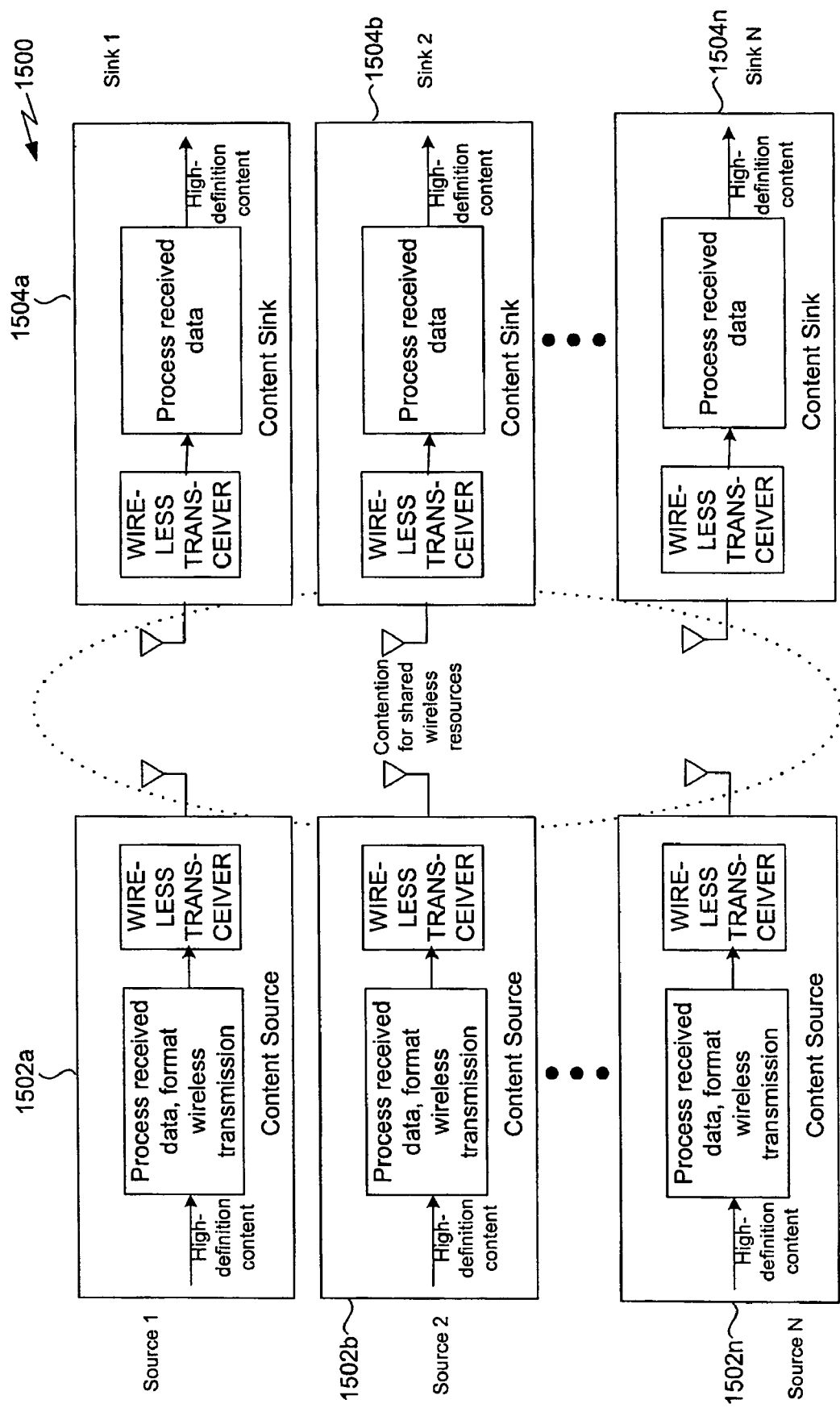
FIG. 15 depicts a plurality of content sources and a plurality of content sinks in contention for shared wireless resources in accordance with an embodiment of the present invention.

FIG. 15 depicts a system 1500 in accordance with an embodiment of the present invention that includes a plurality of content sources 1502a-1502n and a plurality of content sinks 1504a-1504n in contention for shared wireless resources. As will be described in more detail herein, each of the content sources 1502a-1502n and contents sinks 1504a-1504n is configured to perform an auto-detect and auto-connect process that enables sharing of the wireless resources.

Figure 16:
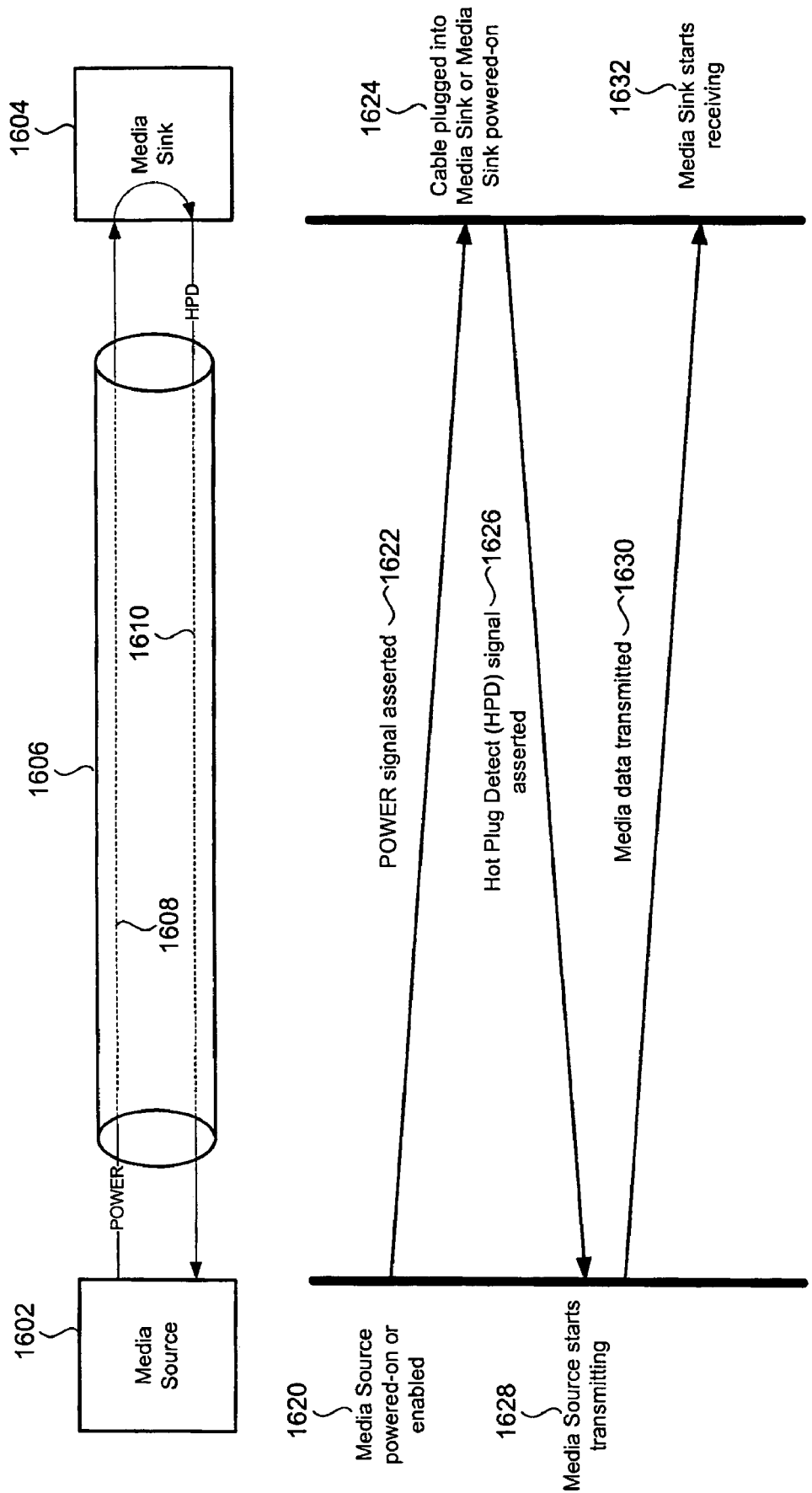
FIG. 16 is a diagram that illustrates a conventional process for initiating high-definition content transfer between a media source and a media sink over a wired connection.

To facilitate explanation of the inventive process, a prior art method for performing the transfer of high-definition content will first be described. Prior art HDMI and DVI systems with wired connections employ what is known as a hot plug detect (HPD) signal to initiate high-definition content transfer. This process will be described in detail with reference to FIG. 16, which is a diagram that illustrates the communication of signals between a prior art media source 1602 and a prior art media sink 1604 over a wired connection or cable 1606.

In this process, after media source 1602 is powered-on or enabled as shown at step 1620, it asserts a power signal 1608 across wired connection 1606 as shown at step 1622. Power signal 1608 typically has a certain predefined voltage level, such as 5V. After cable 1606 is plugged into media sink 1604 and media sink 1604 is powered on as shown at step 1624, media sink 1604 enters a state in which it is ready for content reception. For example, media sink 1604 enters a state in which its Enhanced Extended Display Identification Data (E-EDID) is ready for reading. Once it has entered such a state and detects power signal 1608 asserted by media source 1602, media sink 1604 asserts a hot plug detect (HPD) signal 1610 across wired connection 1606 as shown at step 1626. Upon receiving HPD signal 1610, media source 1602 then begins transmitting high-definition content as shown at step 1628. The high-definition content is transmitted over wired connection 1606 as shown at step 1630 and received by media sink 1604 as shown at step 1632.

For an embodiment of the present invention as shown in FIG. 15, implementing this process is somewhat more complicated. This is because there are several content sources and content sinks that need to share or "contend" for a common set of wireless resources and because a particular content sink needs to decide from which content source it wants to receive high-definition content.

This issue is addressed by the proposed auto-detect and auto-connect process. An example implementation of this process will be described with reference to the diagram of FIG. 17, in which a media transmitter is modeled as a media source 1702 and a transmitter (TX) wireless media adapter 1704 and a media receiver is modeled as a media sink 1708 and a receiver (RX) wireless media adapter 1706. TX wireless media adapter 1704 performs all physical (PHY) and MAC layer wireless functionality involved with the transfer of the high-definition content from media source 1702 and may be internal or external to media source 1702 depending upon the implementation. Similarly, RX wireless media adapter 1706 performs all PHY layer and MAC layer wireless functionality involved with the transfer of the high-definition content to media sink 1708 and may be internal or external to media sink 1708 depending upon the implementation. The auto-detect and auto-connect process logic may be considered part of the MAC layer of the wireless media adapter, while the necessary wireless transmissions for carrying out the protocols are handled by the PHY layer.

Figure 14:
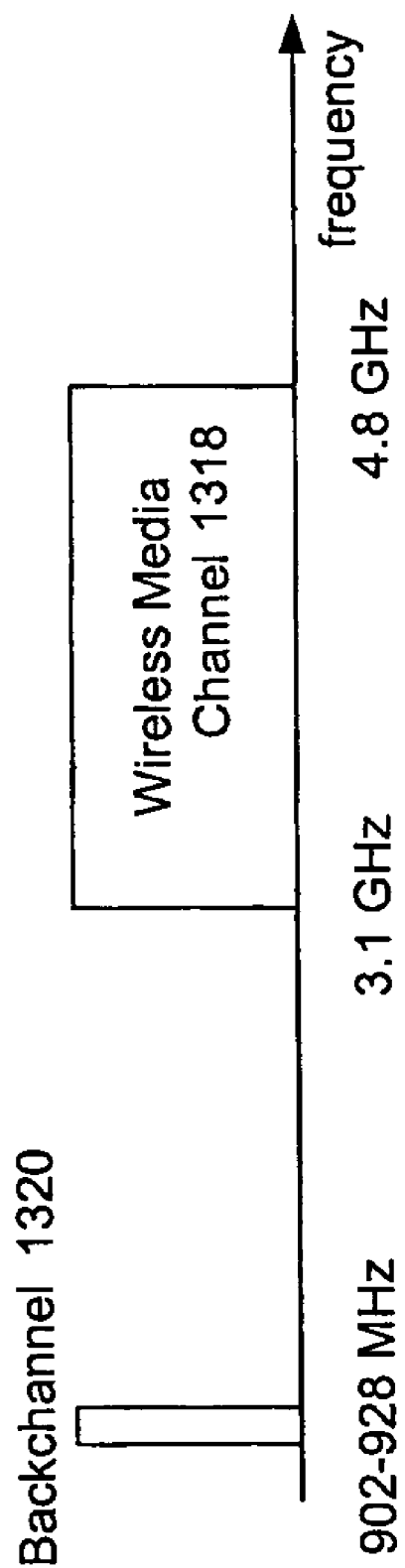
FIG. 14 is a graphical depiction of the bandwidth allocation for first and second wireless channels used for communicating between a content source and a content sink in accordance with an embodiment of the present invention.

For the purposes of this example, it is assumed that a first RF channel, or wireless media channel, is used for transferring high-definition content while a second RF channel, or backchannel, is used for transferring MAC information and multimedia signaling, as described more fully above with reference to FIGS. 13 and 14.

Figure 17:
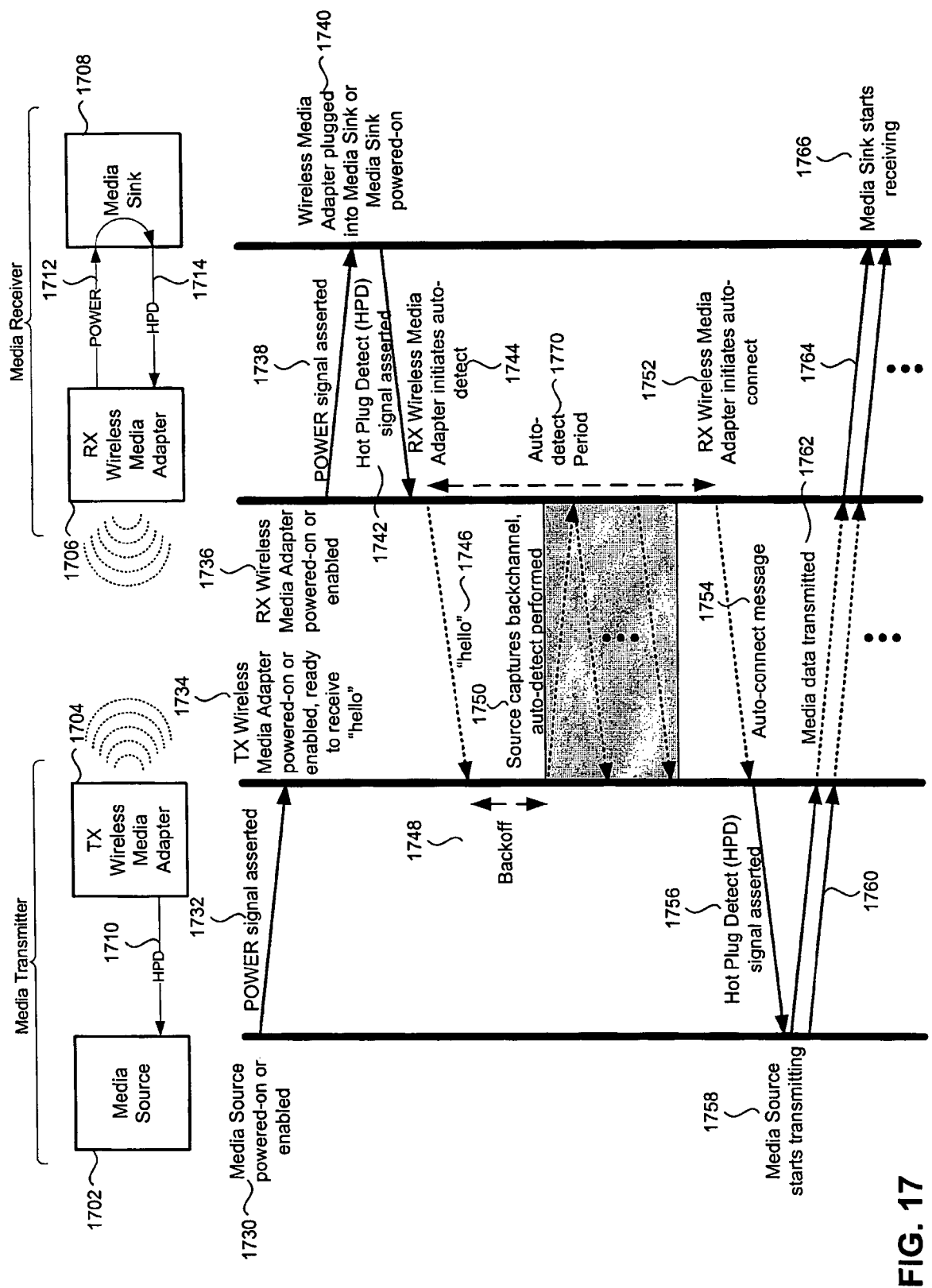
FIG. 17 is a diagram that illustrates an auto-detect and auto-connect process in accordance with an embodiment of the present invention.

In accordance with this embodiment, a TX wireless media adapter will only be capable of responding to an RX wireless media adapter if it is provided with a power signal from the media source signaling that the source is ready and able to transmit content. For example, as shown in FIG. 17, after media source 1702 is powered-on or otherwise enabled at step 1730, it asserts a power signal as shown at step 1732. Only when TX wireless media adapter 1704 is powered-on or otherwise enabled and has detected the power signal is it ready to receive a "hello" signal as shown at step 1734.

Similarly, once a particular media sink is powered up, the RX wireless media adapter replicates the source-asserted power signal. Upon receipt of this power signal, the HPD signal is asserted by the media sink and MAC processes denoted "auto-detect" and "auto-connect" are initiated and carried over the backchannel. For example, as shown in FIG. 17, after RX wireless media adapter 1706 is powered-on or otherwise enabled at step 1736, it asserts a replicated power signal 1712 as shown at step 1738. When RX wireless media adapter is plugged into media sink 1708 and media sink 1708 is powered-on or otherwise enabled as shown at step 1740, media sink 1708 receives power signal 1712 and asserts HPD signal 1714 in response thereto as shown at step 1742. Upon detection of the asserted HPD signal 1714, RX wireless media adapter 1706 initiates the auto-detect process as shown at step 1744.

One objective of the auto-detect process is for the RX wireless media adapter to determine the available media sources and to associate an address with each source. Auto-detect is also used for the TX wireless media adapter and the RX wireless media adapter to exchange capability information, such as a supported frame format. Auto-connect is then the process by which the RX wireless media adapter chooses one of the media sources from which it will receive content.

As shown in FIG. 17, the initial step in the auto-detect process is for RX wireless media adapter 1706 to broadcast a "hello" frame in step 1746. This broadcast for example could be performed using the CEC frame format with destination logical address field set to 0b1111, as described in Version 1.1 of the HDMI Specification at pages CEC-10, the entirety of which is incorporated by reference as if fully set forth herein. After the broadcast of the hello frame, each TX wireless media adapter, enabled by an associated media source with an appropriate power level assertion, will begin a contention process for the backchannel. In an embodiment, each of the TX wireless media adapters is initialized with a random number used to determine how long it will wait before attempting to respond to the "hello" frame. The random number may, for example, be set by the manufacturer. This calculated time period may be referred to as "the backoff period", and is indicated in FIG. 17 by the reference numeral 1748.

If a particular TX wireless media adapter successfully responds to the hello frame, this will trigger a set of transmissions between the RX and TX wireless media adapters allowing for address and capability information to be exchanged. During the time over which this set of frames is sent, the successful TX wireless media adapter is said to have "captured" the backchannel. Only the TX wireless media adapter that captures the backchannel can transmit over the channel until it "frees" the channel. These events are generally indicated at step 1750 of FIG. 17.

If one TX wireless media adapter captures the backchannel before a second has the opportunity, the second TX wireless media adapter will wait until the backchannel becomes free at which time the second TX wireless media adapter will generate a new random number and use this to determine a transmission time relative to the end of the first set of transmissions. This process is repeated until either (1) each TX wireless media adapter has the opportunity to capture the backchannel and all address and capability information is exchanged or (2) a certain time, denoted the "auto-detect period," (denoted in FIG. 17 by reference numeral 1770) expires relative to the time when the hello message was sent. For example, in an embodiment, after a 1 second auto-detect period, auto-connect will begin even if some of the TX wireless media adapters haven't successfully captured the channel.

In an embodiment, each transmitted backchannel frame requires acknowledgement and, if a particular frame is not acknowledged, the transmitter will retry after a set number of frames. This may be implemented, for example, using a CEC-specified acknowledgement procedure. If a fixed number of retries are each unsuccessful, the TX wireless media adapter will assume that its attempt to capture the channel has failed and it will restart the contention process to attempt to capture the channel until the auto-detect period has expired.

Once the auto-detect period is complete, the RX wireless media adapter uses a deterministic process to choose one of the identified media sources to auto-connect with. The media source may be selected based on the address associated with each media source and/or upon capability information received from each media source. For instance, the chosen media source might be the one with the lowest address. Once the source is chosen, the RX wireless media adapter sends that source an auto-connect control message. This is illustrated at step 1754 of FIG. 17, in which RX wireless media adapter 1706 sends an auto-connect message to TX wireless media adapter 1704.

Once the media source TX wireless media adapter receives this message, it can assert the HPD signal allowing the media source to begin to transmit content via the TX and RX wireless media adapters. This is shown in FIG. 17 at step 1756, in which TX wireless media adapter 1704 asserts the HPD signal, and at step 1758 in which media source 1702 begins transmitting content. The content is then transmitted from media source 1702 to TX wireless media adapter 1704 as shown at step 1760, wirelessly transmitted from TX wireless media adapter 1704 to RX wireless media adapter 1706 as shown at step 1762, and transmitted from RX wireless media adapter 1706 to media sink 1708 as shown at step 1764. Media sink 1708 first starts receiving the content at step 1766.

If however, the media sink fails to receive any source responses or fails to find any unpaired/unconnected sources, the RX wireless media adapter periodically re-broadcasts the auto-detect data at a rate low enough not to interfere with other similar/companion content sources/sinks within its transmission range. In case there are no source devices, the RX wireless media adapter will send out a periodic "hello" message allowing the auto-connect process to occur periodically until a connection is made.

In accordance with a further embodiment of the present invention, a paired (auto-connected) connection will last until broken by the media transmitter or media receiver. For example, in an embodiment, the media receiver has a button that a consumer can use to switch media transmitters. Each time the button is pressed, the media receiver will disconnect with the currently-paired media transmitter, reinitiate the auto-detect process, and auto-connect with a new media transmitter. If a media transmitter is disconnected, the media receiver will detect the lack of signal from that media transmitter and initiate the auto-connect process.

In an alternative embodiment, the RX wireless media adapter may snoop the backchannel (e.g., the CEC channel) and change the connection based on information transmitted across the channel. In a still further embodiment, the RX wireless media adapter can change the connection based on information or commands received on an alternate wired or wireless channel, including but not limited to an infrared (IR), 802.11 or Zensys communication channel.

In an embodiment, the connection between a media transmitter and a media receiver is also broken when the source and/or sink loses power. As will be appreciated by persons skilled in the art, various mechanisms can be employed by the TX wireless media adapter and/or RX wireless media adapter to detect this event. For example, in an embodiment, the RX wireless media adapter monitors the received power to detect the loss of a media transmitter wireless transmission. Alternately, the backchannel can be used to carry periodic beacons from the media transmitter and media receiver that when absent will signal that either the source or sink has lost power. In an embodiment, when a media receiver discovers that a media transmitter to which it was auto-connected has lost power or become inoperable, it reinitiates the auto-detect process. If an auto-connected media transmitter discovers that a media receiver to which it was auto-connected has lost power or become inoperable, it will cease wireless media transmissions until it again hears a "hello" message from a media receiver.

An embodiment of the present invention implements the foregoing automatic pairing/connecting mechanisms using a semiconductor circuit without a software programmable processor. In accordance with this embodiment, both the media transmitter and the media receiver use a fixed state machine (processor) which reads control data vectors from memory and uses the pre-defined fields of the control vectors (i.e., bit fields) to directly drive the control signals in the semiconductor circuit needed to implement the above automatic pairing/connecting mechanisms.

In an alternative embodiment of the present invention, a manual rather than automatic mechanism is used to wirelessly pair/connect a content source and a content sink. In accordance with this alternative embodiment, external control data is received at the media receiver indicating the logical and physical identifiers of the media transmitter with which to pair/connect. If the specified media transmitter is already paired/connected, the media receiver breaks the pairing/connection by wirelessly sending un-pairing/disconnecting control data with the specified logical/physical identifiers to the selected media transmitter. The media receiver pairs/connects to the selected media transmitter by wirelessly sending pairing/connecting control data with the specified logical/physical identifiers to the selected media transmitter.

F. Not Allowing Retransmissions of High-Definition Content from a Content Source to a Content Sink in Accordance with an Embodiment of the Present Invention In accordance with an embodiment of the present invention, retransmission of high-definition content from a content source to a content sink is not permitted. Thus, for example, with continued reference to system 100 of FIG. 1, content source 102 and content sink 104 are configured in accordance with an embodiment of the present invention such that content source 102 does not perform retransmissions of high-definition content already transmitted to content sink 104.

Existing and known proposed wireless methods for the transfer of high-definition content include the ability to perform retransmissions. Examples of such methods include 802.11 and the proposed 802.15.3a standard. Not allowing retransmissions in accordance with an embodiment of the present invention is advantageous since additional significant complexity would be required in the content source and content sink to support retransmissions, such as buffers and processing logic. Furthermore, retransmissions also add latency which degrades perceived content quality at the content sink. Additionally, retransmissions reduce throughput due to the need for acknowledgement/negative acknowledgements and the need to send some packets of data more than once. In streaming systems with latency restrictions, retransmitted data may not be usable by receiver.

G. Use of Fixed Block Sizes and Fixed Computational Parameters in Accordance with an Embodiment of the Present Invention In a wireless communication system designed for high-definition content transfer in accordance with an embodiment of the present invention, fixed block sizes and fixed computational parameters are used on all transmit and receive processing blocks. Thus, for example, with continued reference to system 100 of FIG. 1, content source 102 and content sink 104 are configured in accordance with an embodiment of the present invention such that fixed block sizes and fixed computational parameters are used on all transmit and receive processing blocks transmitted between content source 102 and content sink 104. Prior art systems include blocks of variable size and with variable parameters. The inventive approach allows processing implementation complexity reduction.

H. Error Control Coding in Accordance with an Embodiment of the Present Invention An embodiment of the present invention uses an error control code for wireless communication between a content source and a content sink that performs within 1 dB of the best possible code at error rates required for processing uncompressed or losslessly compressed high-definition content (e.g., $10^{-9}$ pixel error rate for HDMI). This improves security by restricting the area over which a transmitted signal can be detected and/or exploited by a non-authorized user. This also improves the density of transmitter/receiver pairs that can use a dedicated wireless channel (i.e., to maximize frequency reuse).

For example, a low-density parity check (LDPC) code may be used as the error control code to achieve the benefits described above. In a particular embodiment, an LDPC code having a length L=4096 and a rate R=0.8 is used. This code performs 5 dB better, assuming a required $10^{-9}$ bit error rate, as compared with a convolutional code having a constraint length K=7 with Viterbi decoding and assuming R=0.75 as proposed for supporting the highest data rate, 480 Mbps, in 802.15.3a. Assuming systems with everything the same except for the code and transmit power level, the R=0.8, L=4096 code will allow operation with power 5.2 dB smaller than a system with a R=0.75, K=7, convolutional code and designed using the maximum FCC allowed transmit power in the 3.1-4.8 GHz band. This is illustrated in the link budget analysis set forth in Table 1 below. A link budget analysis is a common tool employed by engineers to assess performance.

TABLE 1

Link Budget Analysis

| Parameter | 802.15.3a Value | Unit | Similar system but with LDPC Value | Unit |
| --- | --- | --- | --- | --- |
| Throughput (Rb) | 480 | Mbps | 480 | Mbps |
| Average Transmit Power | −10.3 | dBm | −15.5 | dBm |
| Tx antenna gain (Gt) | 0.0 | dB | 0.0 | dB |
| Geometric center frequency Fc | 3.9 | GHz | 3.9 | GHz |
| Path loss at 1 meter (L1 = 20Log(4PI*Fc/c)) | 44.2 | dB | 44.2 | dB |
| Path loss at 5 meters | 14.0 | | 14.0 | |
| Rx antenna gain (Gr) | 0.0 | dBi | 0.0 | dBi |
| Rx power at 5 m (Pr = Pt + Gt + Gr − L1 − L2) | −68.5 | dBm | −73.7 | dBm |
| Average noise power per bit (N = −174 + 10*log(Rb)) | −87.2 | dBm | −87.2 | dBm |
| Rx Noise Figure Referred to the Antenna Terminal (Nf) | 6.6 | dB | 6.6 | dB |
| Average eff. noise power per bit (Pn = N + Nf) | −80.6 | dBm | −80.6 | dBm |
| Implementation Loss(I) | 3.4 | dB | 3.4 | dB |
| No of Bands | 3 | | 3 | |
| 3 dB Bandwidth per band | 0.41 | GHz | 0.41 | GHz |
| $E_B/N_0$ at 5 m | 8.67 | dB | 3.48 | dB |
| BER at 5 m | 1.00E−09 | | 1.00E−09 | |

I. Use of Frequency Hopping in Accordance with an Embodiment of the Present Invention In accordance with an embodiment of the present invention, frequency hopping is employed for wireless communication between a content source and a content sink over FCC channels on which power restrictions apply (e.g., ultrawideband: 3.1-10.6 GHz). This thereby allows an increase in peak transmitter power over FCC specified average power by an amount proportional to the inverse of the hopping rate.

Frequency hopping refers to dynamically switching frequencies in a pattern known or adaptively determined by the content source and content sink. For example, the pattern may comprise an orthogonal Latin square sequence, sweeping across all possible center frequencies, choosing frequencies according to a pseudo-noise pattern known to both transmitter and receiver, having the transmitter choose a frequency and having the receiver determine this frequency, or having the receiver use the backchannel to identify frequencies. Employing frequency hopping in accordance with this embodiment also provides diversity gains.

In a further embodiment, the above-described approaches are extended using multiple antennas at the content source and/or at the content sink to allow simultaneous carrying of several point to point links. For example, in an embodiment, the content source and/or content sink includes a Multiple-Input Multiple-Output (MIMO) antenna system to allow simultaneous carrying of several point to point links.

Figure 18:
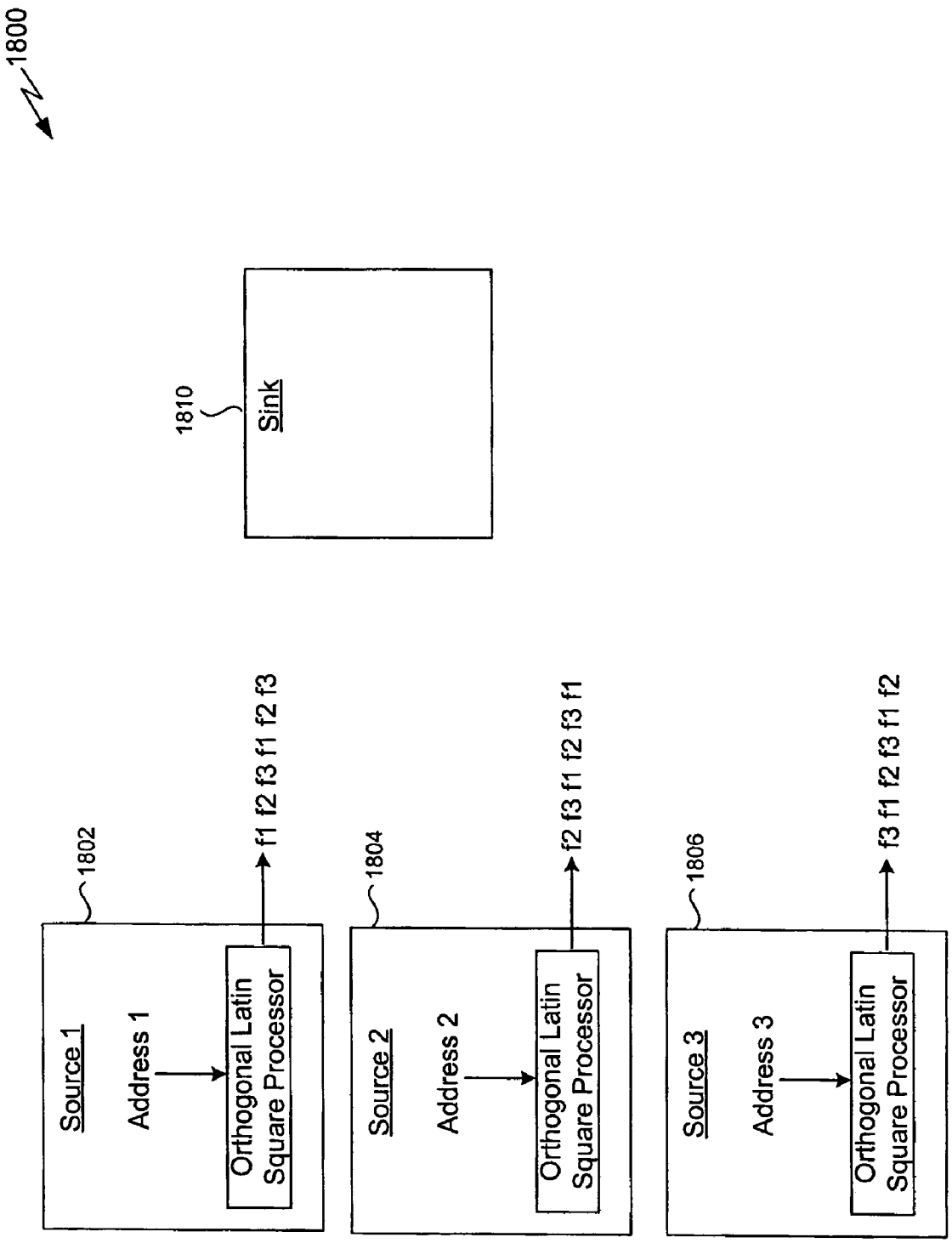
FIG. 18 illustrates a system that supports frequency hopping by multiple users over a set of frequencies not simultaneously occupied by other users in accordance with an embodiment of the present invention.

In a still further embodiment, the above-described approaches are extended using multiple orthogonal frequency hopping systems to allow several point-to-point links to operate simultaneously over band. For example, FIG. 18 depicts a system 1800 that employs multiple orthogonal frequency hopping in accordance with an embodiment of the present invention. As shown in FIG. 18, system 1800 includes three content sources 1802, 1804 and 1806 that share a frequency band for communicating with a content sink 1810. In an embodiment, these sources each frequency hop across three channels within the band denoted $f_1$, $f_2$, and $f_3$, respectively, in accordance with a deterministic pattern, while not simultaneously radiating on the same frequency. In an embodiment, the deterministic pattern is based on an address associated with each content source and on synchronization provided from content sink 1810. A well-known approach for implementing such a system is to use the source address to uniquely identify a row of an orthogonal Latin square, which is then read out to determine the frequency that should be used during a particular time interval.

In yet another embodiment, the above-described approaches are extended by employing receive and/or transmit diversity, such as time diversity, spatial diversity, polarization diversity, or frequency diversity, for RF communication between the content source and the content sink. For example, a commonly used transmit diversity approach given spatial diversity with two transmit antennas is Alamouti encoding, in which pairs of complex data symbols, $[s_0,s_1]$, are processed to yield $[s_0,-s_1^*]$ to be transmitted by one antenna and $[s_1,s_0^*]$ to be transmitted by the second antenna, wherein * denotes the conjugation operation. Given spatial diversity with two or more receive antennas, the Alamouti-encoded transmitted signals are processed jointly to generate estimates of $[s_0,s_1]$. There are many algorithms the receiver can employ to calculate these estimates. For example, maximum likelihood (ML) decoding may be employed.

Figure 19:
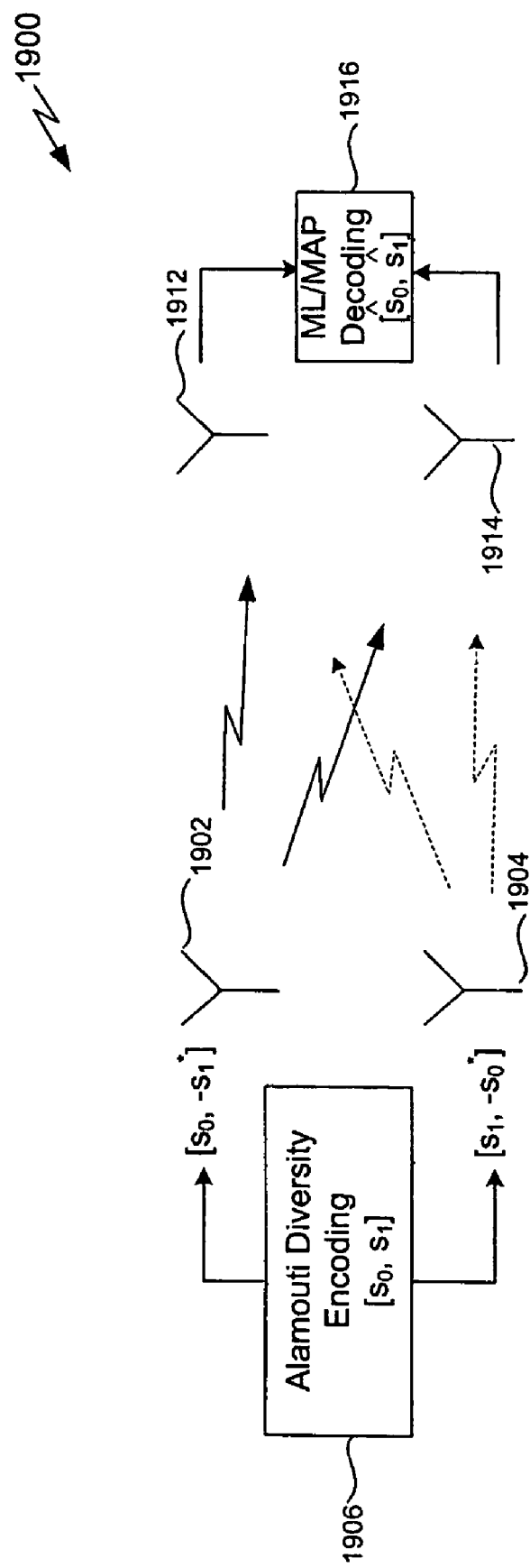
FIG. 19 depicts an example embodiment of the present invention in which transmit and receive diversity is used for RF communication between a content source and a content sink.

FIG. 19 depicts an example embodiment of the present invention in which transmit and receive diversity is used for RF communication between a content source and a content sink. As shown in FIG. 19, a content source includes logic 1906 for performing Alamouti diversity encoding on complex data symbols $[s_0,s_1]$ to yield $[s_0,-s_1^*]$, which is transmitted by a first antenna 1902, and $[s_1,s_0^*]$, which is transmitted by a second antenna 1904. A content sink includes two antennas 1912 and 1914 for receiving the transmitted signals and ML/MAP decoding logic 1916 that processes the received signals to generate estimates of $[s_0, s_1]$, denoted $[\hat{s}_0, \hat{s}_1]$.

J. Adaptive Adjustment of Communication Parameters in Accordance with an Embodiment of the Present Invention As described above in reference to at least FIGS. 13 and 14, an embodiment of the present utilizes a backchannel, which operates over a frequency range separate from that used to carry high-definition content, for communicating MAC information and multimedia signaling between a content source and a content sink. In accordance with a further embodiment of the present invention, the backchannel also carries information that is used by the content source and/or content sink to adaptively adjust communications parameters used to make high-definition content transfer more reliable and/or more efficient.

For example, in an embodiment of the present invention, a content sink monitors received signal quality and transmits data conveying this quality over the backchannel. The received signal quality may be measured, for example, in terms of a signal-to-noise ratio (SNR). Based on the signal quality data, the transmitter portion of the content source determines the modulation and coding parameters. For instance, in an embodiment that implements orthogonal frequency division multiplexing (OFDM) for communication between the content source and the content sink, if a particular OFDM sub-carrier has a large SNR, then a higher-order modulation format such as 16-QAM or 64-QAM can reliably be used on this sub-carrier. A sub-carrier with higher-order modulation conveys more information than that conveyed by a sub-carrier modulated with BPSK or QPSK. Thus, introducing higher-order modulation allows throughput improvement.

K. Transmission of Hot Plug Detect (HPD) Signal Information in Accordance with an Embodiment of the Present Invention In accordance with an embodiment of the present invention, information pertaining to a Hot Plug Detect (HPD) signal generated by a content sink is wirelessly transmitted to a content source. The content source may use this information, for example, to determine whether or not it is feasible to establish a connection with the content sink, or, if a connection has already been established between the source and the sink, whether they should be disconnected.

In accordance with one such embodiment, an RX wireless media adapter associated within a content sink periodically samples an HPD signal generated by the content sink and a current state (on/off) is detected therefrom. Control data indicating the state of the HPD signal is then generated and wirelessly transmitted to a connected TX wireless media adapter associated with a content source. The TX wireless media adapter decodes the control information and the HPD signal is recreated according to whether the current state is on or off.

In an alternate embodiment, an RX wireless media adapter associated with a content sink periodically samples an HPD signal generated by the content sink and a determination is made as to whether the current state (on/off) has changed. Only if the state of the HPD signal has changed, then control data indicating the that the state has changed is generated and wirelessly transmitted to a connected TX wireless media adapter associated with a content source. The TX wireless media adapter decodes the control information and the HPD signal is recreated according to whether the current state is on or off.

L. Performance of Transition Minimized Differential Signaling (TMDS) Decoding and Encoding in Accordance with an Embodiment of the Present Invention An embodiment of the present invention performs Transition Minimized Differential Signaling (TMDS) decoding and encoding operations in order to implement a wireless HDMI interface between a content source and content sink. For example, a TX wireless media adapter in accordance with this implementation accepts a TMDS encoded signal, performs TMDS decoding to extract media transport streams including video data periods, data island periods, and control periods, reformats the data and extracts clock data, and then wirelessly transfers the reformatted data and information conveying clock speed and other control information. An RX wireless media adapter in accordance with this implementation receives the reformatted data and clock speed information, processes the clock information to generate a source clock, reconstitutes the data and separates it into video data period, data island period, and control information, and then performs TMDS encoding using the clock and recovered data.

Figure 20:
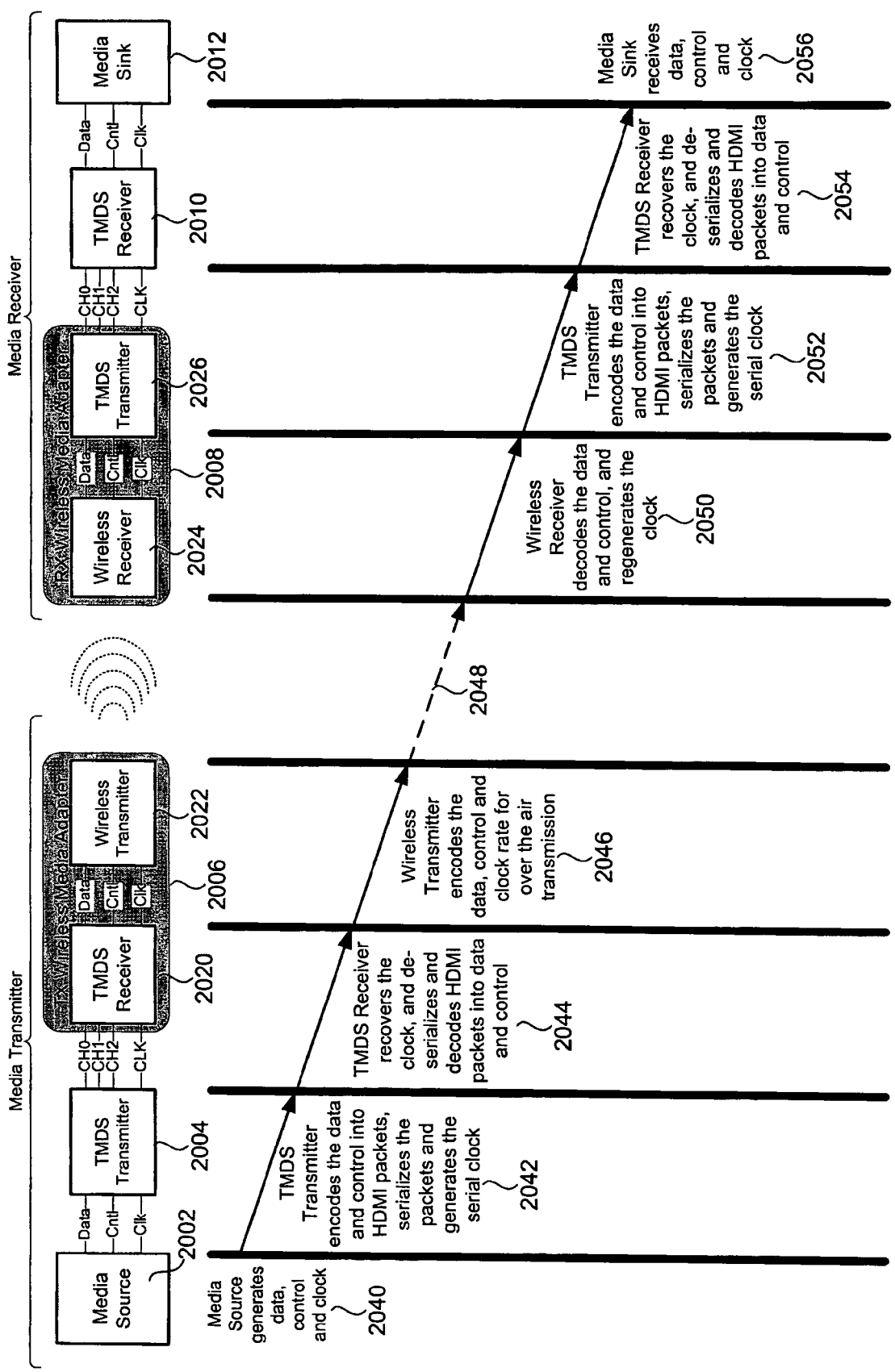
FIG. 20 is a diagram that shows the performance of Transition Minimized Differential Signaling (TMDS) decoding and encoding operations in a wireless HDMI interface between a content source and content sink.

This process will now be described in more detail with reference to the diagram of FIG. 20. In FIG. 20, a media transmitter is modeled as a media source 2002, a TMDS transmitter 2004, and a TX wireless media adapter 2006, wherein TX wireless media adapter 2006 includes a TMDS receiver 2020 and a wireless transmitter 2022. Similarly, a media receiver is modeled as a media sink 2012, a TMDS receiver 2010, and an RX wireless media adapter 2008, wherein RX wireless media adapter 2008 includes a wireless receiver 2024 and a TMDS transmitter 2026.

As shown in FIG. 20, the process begins at step 2040, in which media source 2002 generates data, control signals and a clock. At step 2042, TMDS transmitter 2004 encodes the data and control signals into HDMI packets, serializes the packets and generates a serial clock. At step 2044, TMDS receiver 2020 within TX wireless media adapter 2006 recovers the clock and decodes the HDMI packets back into data and control signals. At step 2046, wireless transmitter 2022 encodes the data and control signals as well as information relating to the clock rate for transmission over the air. At step 2048, the encoded information is transmitted over the air.

At step 2050, wireless receiver 2024 within RX wireless media adapter 2008 receives the transmitted information and decodes it into the data and control signals and regenerates the clock therefrom. At step 2052, TMDS transmitter 2026 encodes the data and control signals back into HDMI packets, serializes the packets and generates a serial clock. At step 2054, TMDS receiver 2010 recovers the clock, and de-serializes and decodes the HDMI packets into data and control signals. At step 2056, media sink 2012 receives the data, control signals and clock from TMDS receiver 2010.

As will be appreciated by persons skilled in the relevant art, although the foregoing process is described in terms of a media source/TMDS transmitter that generates HDMI packets and a TMDS receiver/media sink that receives HDMI packets, the process is also generally applicable to a media source/TMDS transmitter than generates DVI packets and a TMDS receiver/media sink that receives DVI packets.

M. Performance of I²C Decoding and Encoding Operations in Accordance with an Embodiment of the Present Invention An embodiment of the present invention performs Inter-Integrated Circuit (I²C) decoding and encoding operations in order to implement a wireless HDMI interface between a content source and content sink. The I²C decoding and encoding operations are performed as necessary to support the reception, decoding and transmission of the Display Data Channel (DDC) channel. For example, a TX wireless media adapter in accordance with this implementation accepts an I²C encoded signal, decodes the I²C encoded signal to data, reformats the data, and wirelessly transfers the reformatted data. An RX wireless media adapter in accordance with this implementation receives the wirelessly transferred reformatted data, reconstitutes the data, and performs I²C encoding using the recovered data.

Figure 21:
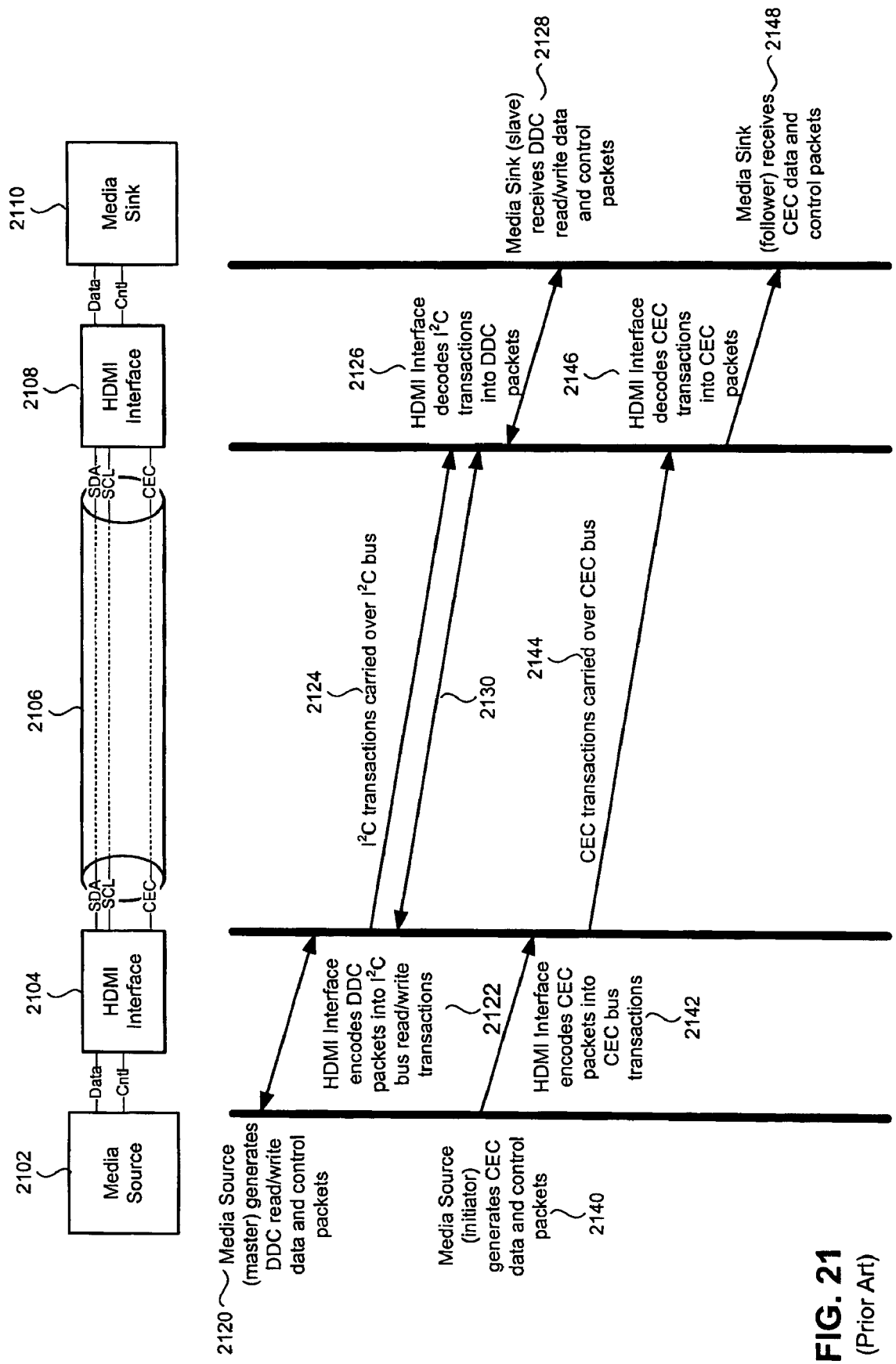
FIG. 21 is a diagram that shows processes by which a prior art system implements a DDC and CEC channel between a media source and a media sink connected via a cable.

By way of illustration, FIG. 21 shows the process by which a prior art system implements a DDC channel between a media source 2102 and a media sink 2110 connected via a cable 2106. As shown in FIG. 21, media source 2102 is connected to cable 2106 via a first HDMI interface 2104 and media sink 2110 is connected to cable 2106 via a second HDMI interface 2108.

The process begins at step 2120, in which media source 2102 generates DDC read/write data and control packets. For the purposes of this process, media source 2102 is acting as the master of the DDC channel and media sink 2110 is acting as a slave. At step 2122, HDMI interface 2104 encodes the DDC packets into I²C bus read/write transactions. At step 2124, the I²C transactions are carried over the I²C bus. At step 2126, HDMI interface 2108 receives and decodes the I²C transactions into DDC packets. At step 2128, media sink 2110 receives the DDC read/write data and control packets. At this point, media sink 2110 may return responsive information over the DDC channel that will initiate additional transactions over the I²C bus as indicated by bi-directional arrow 2130.

Figure 22:
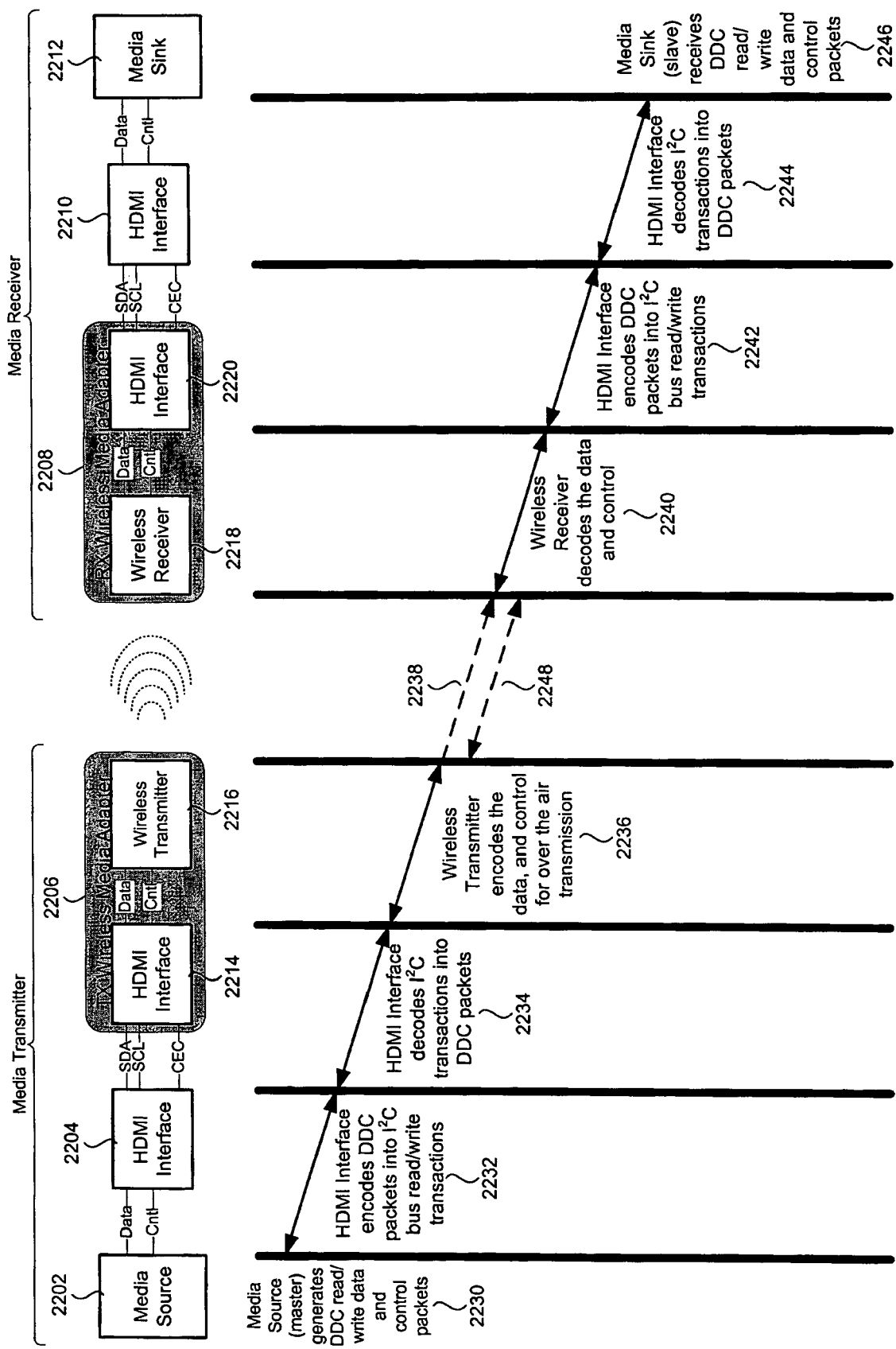
FIG. 22 is a diagram that shows a process by which a DDC channel is implemented between a content source and a content sink connected via a wireless HDMI interface in accordance with an embodiment of the present invention.

In contrast, FIG. 22 shows a process by which a DDC channel is implemented between a content source and a content sink connected via a wireless HDMI interface in accordance with an embodiment of the present invention. In FIG. 22, a media transmitter is modeled as a media source 2202 connected to a TX wireless media adapter 2206 by an HDMI interface 2204, wherein TX wireless media adapter 2206 includes an HDMI interface 2214 and a wireless transmitter 2216. Similarly, a media receiver is modeled as a media sink 2212 connected to an RX wireless media adapter 2208 by an HDMI interface 2210, wherein RX wireless media adapter 2208 includes a wireless receiver 2218 and an HDMI interface 2220.

The process of FIG. 22 begins at step 2230 in which media source 2202 generates DDC read/write data and control packets. For the purposes of this process, media source 2202 is acting as the master of the DDC channel and media sink 2212 is acting as a slave. At step 2232, HDMI interface 2204 encodes the DDC packets into I²C bus read/write transactions. At step 2234, HDMI interface 2214 within TX wireless media adapter 2206 decodes the I²C transactions back into DDC packets. At step 2236, wireless transmitter 2216 within TX wireless media adapter 2206 encodes the data and control packets for over the air transmission. At step 2238, the encoded data and control packets are transmitted over the air.

At step 2240, wireless receiver 2218 within RX wireless media adapter 2208 receives and decodes the encoded data and control packets. At step 2242, HDMI interface 2220 within RX wireless media adapter 2208 encodes the DDC packets into I²C bus read/write transactions. At step 2244, HDMI interface 2210 decodes the I²C transactions into DDC packets. At step 2246, media sink 2212 receives the DDC read/write data and control packets. At this point, media sink 2212 may return responsive information over the DDC channel that will initiate additional transmissions over the air as indicated by bi-directional arrow 2248.

As will be appreciated by persons skilled in the relevant art, although the foregoing process is described in terms of a media source and a media sink having an HDMI interface, the foregoing process is also generally applicable to media sources and media sinks having a DVI interface as well.

N. Performance of CEC Decoding and Encoding Operations in Accordance with an Embodiment of the Present Invention An embodiment of the present invention performs Consumer Electronics Control (CEC) decoding and encoding operations in order to implement a wireless HDMI interface between a content source and content sink. For example, a TX wireless media adapter in accordance with this implementation accepts a CEC encoded signal, decodes the CEC encoded signal to data, reformats the data, and wirelessly transfers the reformatted data. An RX wireless media adapter in accordance with this implementation receives the wirelessly transferred reformatted data, reconstitutes the data, and performs CEC encoding using the recovered data.

By way of illustration, FIG. 21 shows the process by which a prior art system implements a CEC channel between a media source 2102 and a media sink 2110 connected via a cable 2106. As shown in FIG. 21, media source 2102 is connected to cable 2106 via a first HDMI interface 2104 and media sink 2110 is connected to cable 2106 via a second HDMI interface 2108.

The process begins at step 2140, in which media source 2102 generates CEC data and control packets. For the purposes of this process, media source 2102 is acting as the initiator on the CEC channel and media sink 2110 is acting as a follower. At step 2142, HDMI interface 2104 encodes the CEC packets into CEC bus transactions. At step 2144, the CEC transactions are carried over the CEC bus. At step 2146, HDMI interface 2108 receives and decodes the CEC transactions into CEC packets. At step 2148, media sink 2110 receives the CEC data and control packets.

Figure 23:
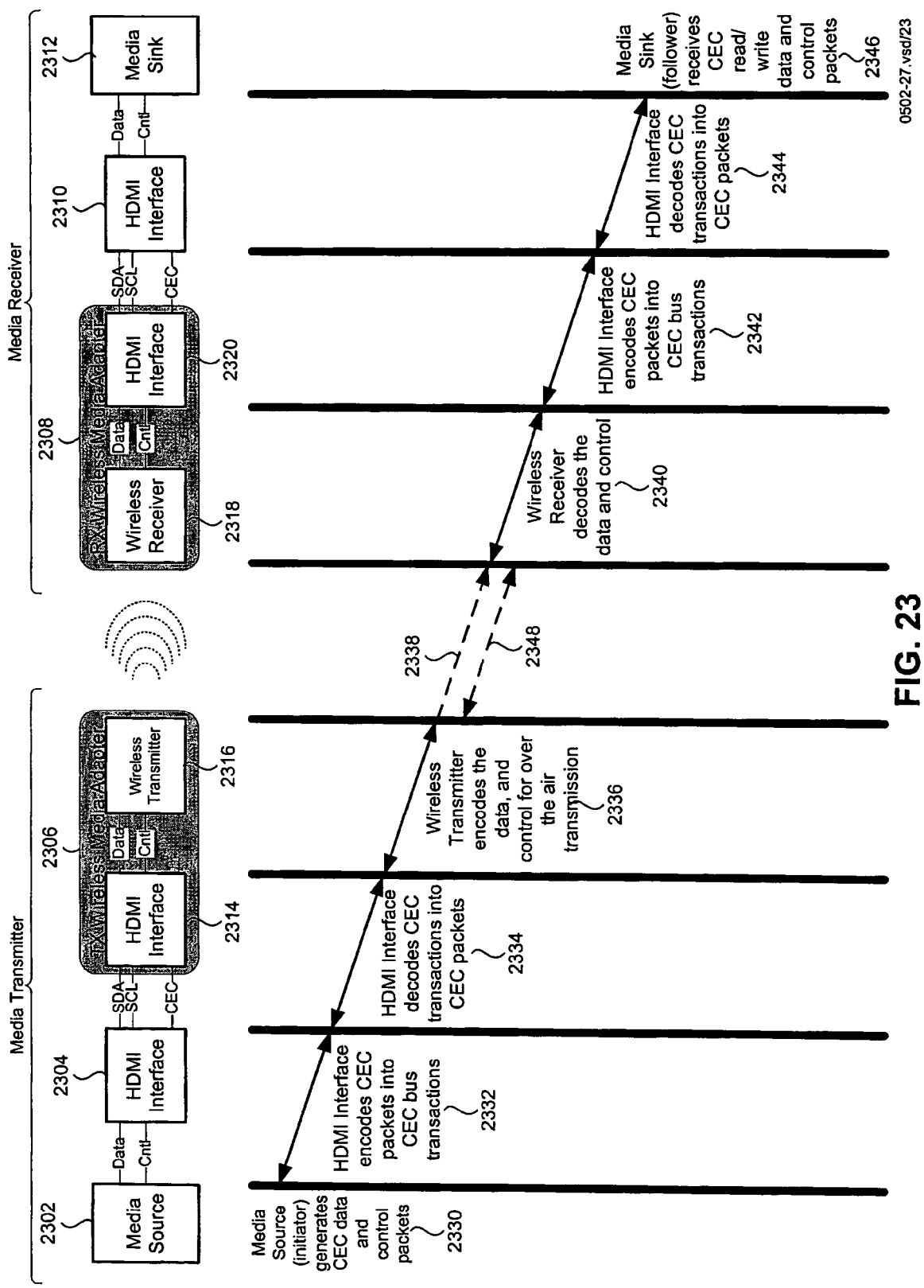
FIG. 23 is a diagram that shows a process by which a CEC channel is implemented between a content source and a content sink connected via a wireless HDMI interface in accordance with an embodiment of the present invention.

In contrast, FIG. 23 shows a process by which a CEC channel is implemented between a content source and a content sink connected via a wireless HDMI interface in accordance with an embodiment of the present invention. In FIG. 23, a media transmitter is modeled as a media source 2302 connected to a TX wireless media adapter 2306 by an HDMI interface 2304, wherein TX wireless media adapter 2306 includes an HDMI interface 2314 and a wireless transmitter 2316. Similarly, a media receiver is modeled as a media sink 2312 connected to an RX wireless media adapter 2308 by an HDMI interface 2310, wherein RX wireless media adapter 2308 includes a wireless receiver 2318 and an HDMI interface 2320.

The process of FIG. 23 begins at step 2330 in which media source 2302 generates CEC data and control packets. For the purposes of this process, media source 2302 is acting as the initiator on the CEC channel and media sink 2312 is acting as a follower. At step 2332, HDMI interface 2304 encodes the CEC packets into CEC bus transactions. At step 2334, HDMI interface 2314 within TX wireless media adapter 2306 decodes the CEC transactions back into CEC packets. At step 2336, wireless transmitter 2316 within TX wireless media adapter 2306 encodes the data and control packets for over the air transmission. At step 2338, the encoded data and control packets are transmitted over the air.

At step 2340, wireless receiver 2318 within RX wireless media adapter 2308 receives and decodes the encoded data and control packets. At step 2342, HDMI interface 2320 within RX wireless media adapter 2308 encodes the CEC packets into CEC bus transactions. At step 2344, HDMI interface 2310 decodes the CEC transactions into CEC packets. At step 2346, media sink 2312 receives the CEC read/write data and control packets. At this point, media sink 2312 may return responsive information over the CEC channel that will initiate additional transmissions over the air as indicated by bi-directional arrow 2348.

O. Wireless Transfer of Clock Information in Accordance with an Embodiment of the Present Invention An embodiment of the present invention wirelessly transfers clock information in order to implement a wireless HDMI interface between a content source and content sink. For example, in accordance with such an embodiment, a TX wireless media adapter periodically samples a clock signal generated by a media source and the frequency of the clock is thereby determined. The TX wireless media adapter then periodically sends control data indicating the clock frequency over a wireless link to a RX wireless media adapter. The RX wireless media adapter receives the control data and extracts the clock information. The RX wireless media adapter then uses the clock frequency as specified by the control data to recreate the clock and provide it to a media sink.

Figure 24A:
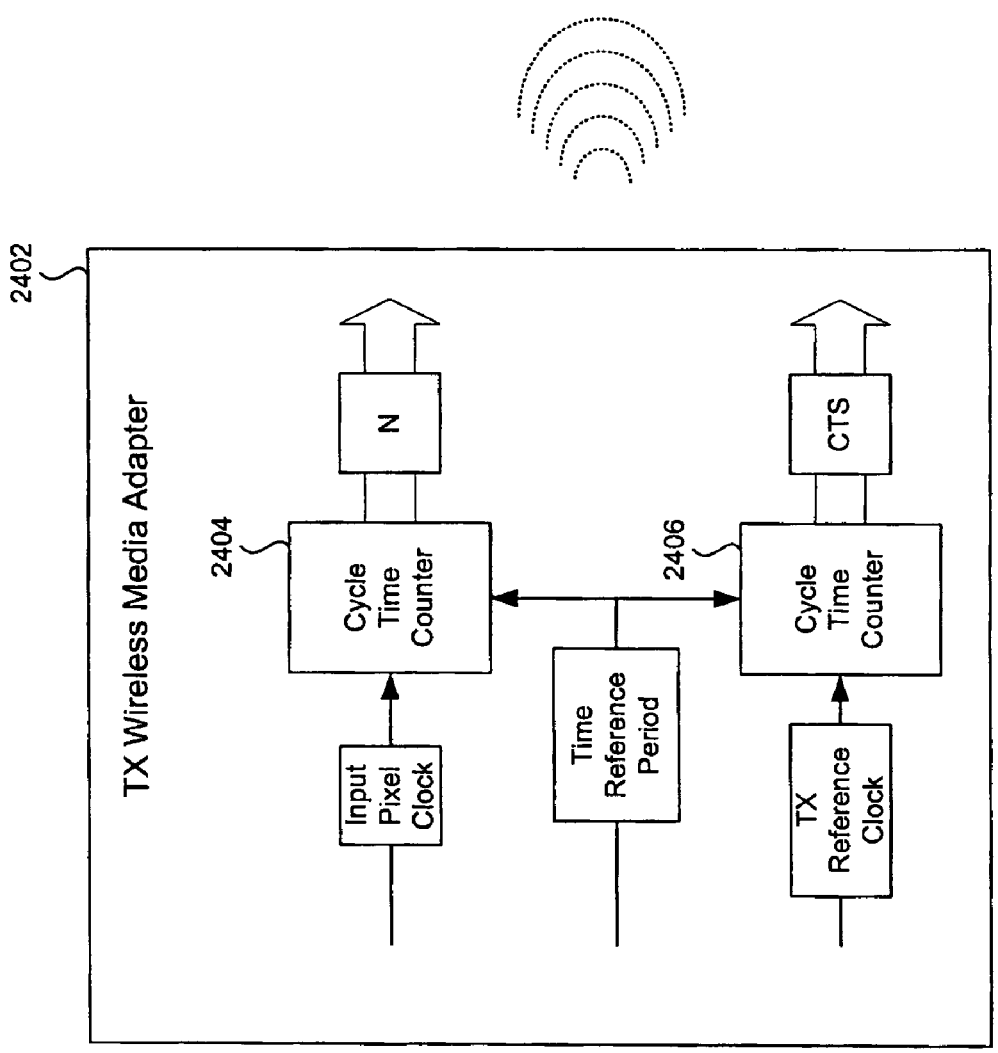
FIG. 24A shows a transmit (TX) wireless media adapter that wirelessly transmits clock information in accordance with an embodiment of the present invention.

FIG. 24A depicts a TX wireless media adapter 2402 in accordance with such an embodiment. As shown in FIG. 24A, TX wireless media adapter 2402 includes a first cycle time counter 2404 and a second cycle time counter 2406. First cycle time counter 2404 receives as input an input pixel clock and a time reference period. The input pixel clock is provided from a media source or is otherwise derived from information provided from the media source, and the time reference period is chosen to be an integer number of pixel clocks. For example, in an embodiment, the time reference period is equal to a Horizontal Blanking Interval (HBI), a horizontal line period, or the like. Based on the input pixel clock and the time reference period, cycle time counter 2404 derives and outputs a value N which is defined as the number of pixel clocks per time reference period. Using a time reference period that is an integer number of pixel clocks ensures that N is a constant integer for any video format.

Second cycle time counter 2406 receives as input the time reference period discussed above and a transmitter (TX) reference clock for TX wireless media adapter 2402. Based on the time reference period and the TX reference clock, second cycle time counter 2406 derives and outputs a value CTS which is defined as the number of TX reference clocks per time reference period. The values of N and CTS are updated at the end of every time reference period and transmitted by TX wireless media adapter over the air to an RX wireless media adapter in the form of video clock regeneration packets.

Figure 24B:
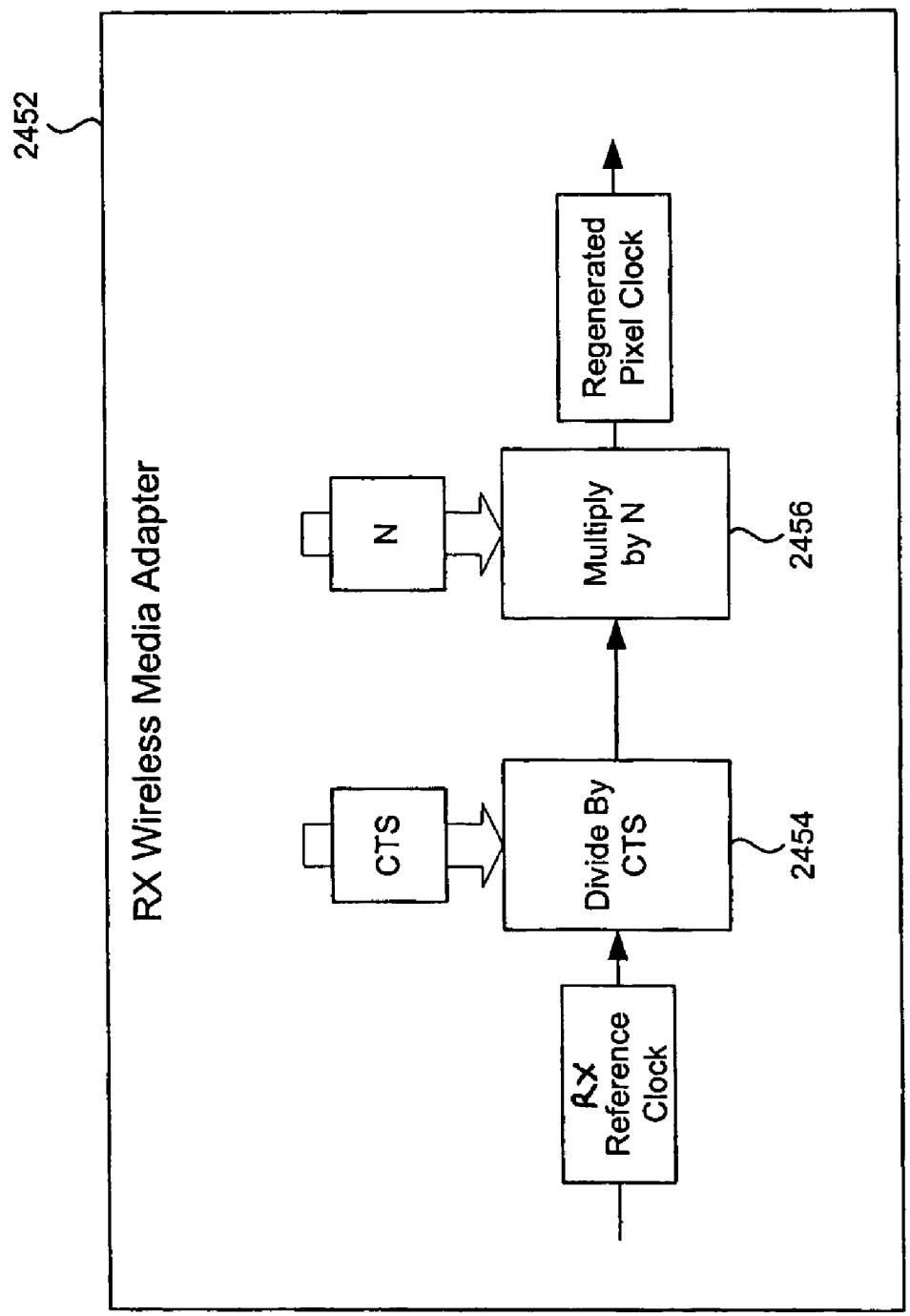
FIG. 24B shows a receive (RX) wireless media adapter that wirelessly receives clock information in accordance with an embodiment of the present invention.

FIG. 24B illustrates an RX wireless media adapter 2452 in further accordance with this embodiment. As shown in FIG. 24B, RX wireless media adapter 2452 includes "divide by CTS" logic 2454 and "multiply by N" logic 2456. RX wireless media adapter 2452 wirelessly receives video clock regeneration packets from TX wireless media adapter 2402 and recovers the N and CTS values therefrom. "Divide by CTS" logic 2454 receives as input a receiver (RX) reference clock for RX wireless media adapter 2452 and the CTS value. The frequency of the RX reference clock is ideally the same as that of the TX reference clock for TX wireless media adapter 2402, although in practice it may vary from the RX reference clock by a few parts per million (ppm).

Based on the RX reference clock and the CTS value, "divide by CTS" logic 2454 outputs a value which is determined by dividing the RX reference clock by CTS. This output is then multiplied by N in logic 2456 to provide a regenerated pixel clock which is provided to a media sink. In accordance with this embodiment, the shorter the time reference period, the better the tracking between actual pixel clock frequency and the regenerated pixel clock frequency.

P. Example PHY Layer Implementation in Accordance with an Embodiment of the Present Invention In accordance with an embodiment of the present invention, a 1.5 Gbps wireless link providing BER=$10^{-9}$ is daunting but achievable if unnecessary communications elements such as the complicated and inefficient 802.15.3a MAC are eliminated and more powerful physical layer techniques such as low-density parity check (LDPC) codes are employed.

Figure 25:
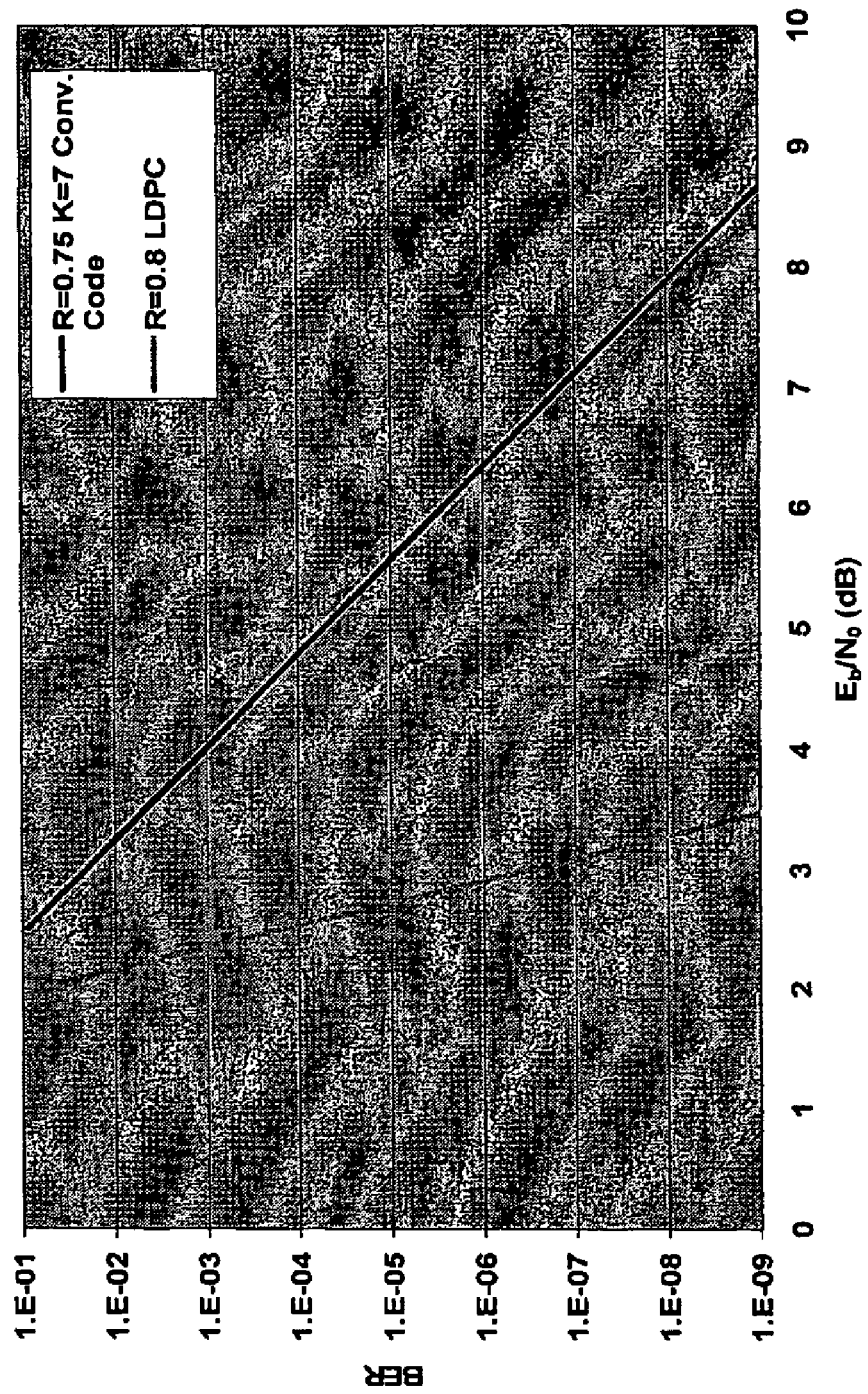
FIG. 25 is a graph illustrating the performance difference between a forward error correction (FEC) technique based on a convolutional code and an FEC technique based on a low-density parity check (LDPC) code.

The 802.15.3a standards body settled for an extremely weak forward error correction (FEC) code, a convolutional code with constraint length, K=7, rejecting other more powerful approaches such as that used by LDPC that would allow much better performance. Consider for example, a high-rate K=7 convolutional code versus a high-rate length 4096 LDPC. Specifically assume R=0.75 for the convolutional code and R=0.8 for the LDPC. FIG. 25 shows that while the performance difference at 802.15.3a targeted error rates is only about a dB, at the low BERs needed for uncompressed video, LDPCs provide more than a 5 dB performance gain. Note that in FIG. 25, $E_b/N_0$ denotes the energy per bit to spectral noise density, which is the signal to noise ratio for a digital communication system.

In addition, since an embodiment of the present invention provides a point-to-point link that uses a wide bandwidth for only the forward video channel, no MAC overhead is needed. This approach provides an additional benefit as compared to 802.15.3a in that radio frequency (RF) receiver components required by 802.15.3a, such as a transmit/receive switch, can be eliminated to minimize the receiver sensitivity (i.e., noise figure). For instance, while an 802.15.3a system noise figure (NF) around 6.6 dB is expected, an embodiment of the present invention reduces the NF by more than a dB by including only those RF components needed to implement the wireless protocol.

To meet FCC regulations while simultaneously best utilizing state-of-the-art RF and mixed-signal components, an embodiment of the present invention employs a PHY layer solution including Orthogonal Frequency Division Multiplexing (OFDM) techniques and that alternates between 2 channels, each with a bandwidth of roughly 0.875 GHz, and located between approximately 3.06-3.93 GHz and 3.94-4.82 GHz, respectively. Table 2 shows details of one example approach—for instance, 256 OFDM tones will be transmitted on each channel, 192 will carry data while the remaining will adaptively be used for functions like frequency offset and sampling time tracking or simply left blank (i.e., nulled) to optimize performance and/or relax radio frequency (RF) processing requirements.

TABLE 2

Exemplary PHY implementation in Accordance with an Embodiment of the Present Invention

| | |
|---|---|
| Information Data Rate | 1.5 Gbps |
| Forward Error Correction | Low Density Parity Check |
| Code Rate | 0.8 |
| Channel Symbol Rate | 1.875 Gbps |
| Modulation/Constellation | OFDM with QPSK (16QAM optional) |
| FFT Size | 256 |
| Tone Spacing | 3.4 MHz |
| Data Tones | 192 |
| Cyclic Prefix | 53 ns |
| Symbol Length | 330 ns |

A common tool employed by communications engineers to assess performance is a link budget analysis. Table 3 shows a link budget assuming 802.15.3a and a wireless HDMI solution in accordance with an embodiment of the present invention. The link budget calculates the maximum FCC allowed average transmit power. In addition, it assumes omni-directional transmit and receive antennas yielding 0 dBi antenna gains. Performance is characterized at 5 m assuming 3 dB of RF propagation loss due to obstructions such as cabinets and walls. Also included is some interference—this could be from UWB systems or RF sources such as microwave ovens, Wi-Fi® systems operating at 2.4 or 5 GHz, or cell phones. The results can be used to relate BER and $E_b/N_0$. For example, with negligible interference (in this case, an interference-to-noise ratio of 0.001 or −100 dB), the 802.15.3a BER is $10^{-6}$ whereas even at a data rate 3 times that of 802.15.3a, an embodiment of the present invention achieves better than a $10^{-9}$ BER.

TABLE 3

Link Budget for 802.15.3a vs. Wireless HDMI Embodiment of the Present Invention

| Parameter | 802.15.3a | | Wireless HDMI Embodiment | |
|---|---|---|---|---|
| | Value | Unit | Value | Unit |
| Maximum Throughput (Rb) | 480 | Mbps | 1500 | Mbps |
| Actual Throughput | 200 | Mbps | 1500 | Mbps |
| Average Transmit Power (Pt) | −10.3 | dBm | −9.1 | dBm |
| Tx antenna gain (Gt) | 0.0 | dBi | 0.0 | dBi |
| Geometric center frequency (Fc) | 3.9 | GHz | 4.0 | GHz |
| Path loss at 5 meters (L) | 58.2 | dB | 58.4 | dB |
| Rx antenna gain (Gr) | 0.0 | dBi | 0.0 | dBi |
| Rx power at 5 m (Pr = Pt + Gt + Gr − L) | −68.5 | dBm | −67.5 | dBm |
| Average thermal noise power per bit (N = −174 + 10*log(Rb)) | −87.2 | dBm | −82.2 | dBm |
| Interference to noise ratio | −100.0 | dB | | |
| Average interference power per bit (I) | −187.2 | dBm | −192.0 | dBm |
| Average effective Noise ($N_e$) | −87.2 | dBm | −82.2 | dBm |
| Rx Noise Figure Referred to the Antenna Terminal (Nf) | 6.6 | dB | 5.5 | dB |
| Average eff. noise power per bit (Pn = $N_e$ + Nf) | −80.6 | dBm | −76.7 | dBm |
| Implementation Loss(I) | 2.7 | dB | 2.7 | dB |
| No of Bands | 3 | | 2 | |
| 3 dB Bandwidth per band | 0.4 | GHz | 0.8 | GHz |
| Additional loss due to RF obstacles | 3.0 | dB | 3.0 | dB |
| $E_b/N_0$ | 6.33 | dB | 3.51 | dB |
| Bit Error Rate at 5 m | 1.02E−06 | | 6.96E−10 | |

Figure 26:
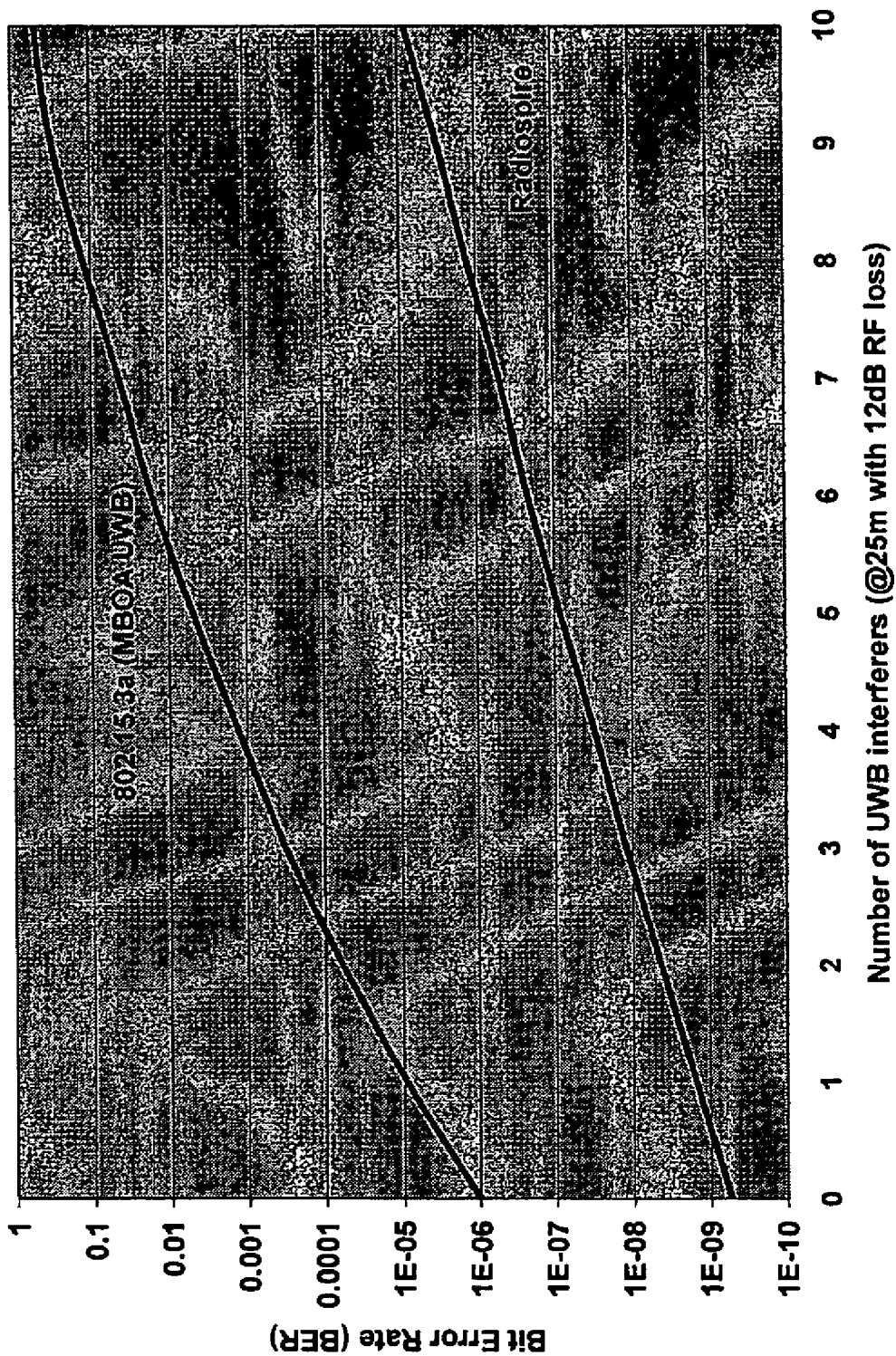
FIG. 26 is a graph comparing BER as a function of the number of interferers for a prior art 802.15.3a ultra wide band (UWB) system versus a wireless HDMI system in accordance with an embodiment of the present invention.

The link budget also can be used to evaluate the performance as a function of interference. For instance, if we assume that there are 802.15.3a interferers at a distance of 25 m from the receiver (with path to receiver including 12 dB of RF loss), FIG. 26 shows the link budget calculated BER as a function of the number of interferers. The link budget shows that a single interferer results in severe 802.15.3a performance degradation beyond the quality needed to support MPEG-2, whereas even with 10 interferers, bit errors are imperceptible with a wireless HDMI solution in accordance with an embodiment of the present invention.

Figure 27:
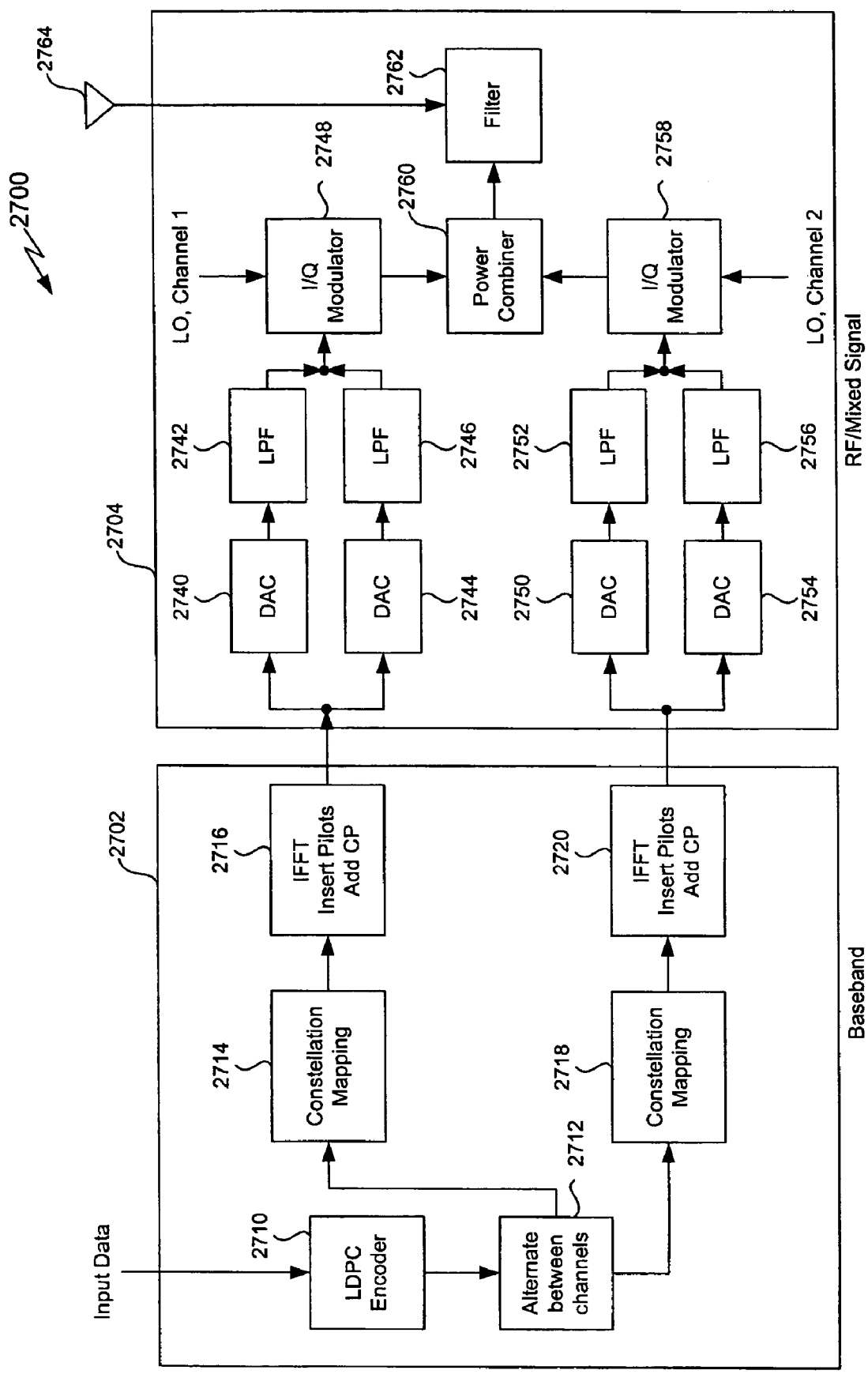
FIG. 27 is a block diagram of a wireless HDMI transmitter in accordance with an embodiment of the present invention.
Figure 28:
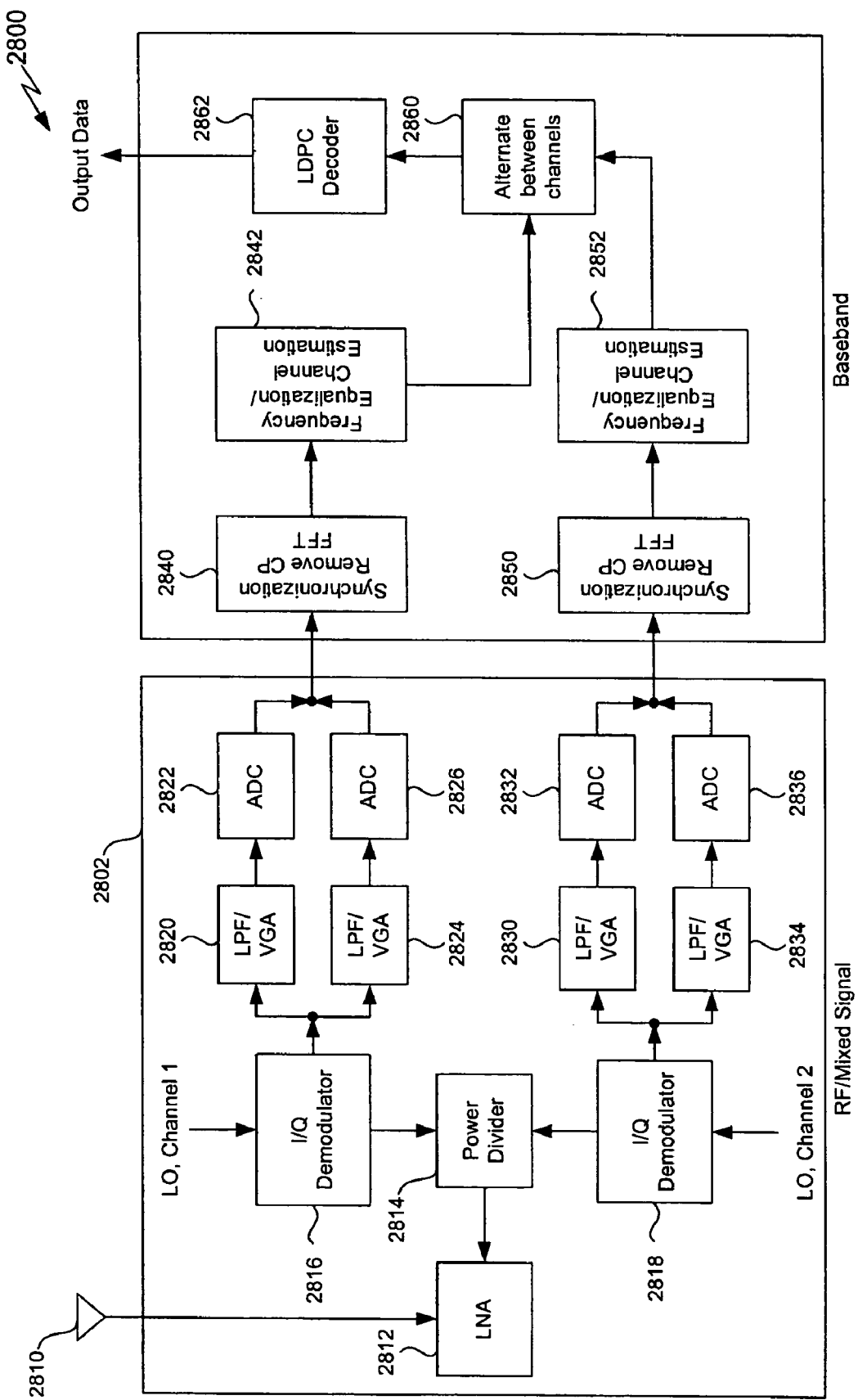
FIG. 28 is a block diagram of a wireless HDMI receiver in accordance with an embodiment of the present invention.

FIGS. 27 and 28 show block diagrams of a wireless HDMI transmitter 2700 and receiver 2800, respectively, in accordance with an embodiment of the present invention. Each of the transmitter 2700 and receiver 2800 employs direct conversion to minimize cost and maximize performance.

As shown in FIG. 27, transmitter 2700 includes baseband processing logic 2702 and RF/mixed-signal logic 2704. Baseband processing logic 2702 includes an LDPC encoder 2710 that encodes input data in accordance with an LDPC encoding technique and logic 2712 that alternately sends the encoded data along one of two signal processing paths for transmission over two different RF channels. Each transmit path includes a constellation mapper 2714, 2718 that receives the LDPC encoded data and forms either QPSK or 16QAM symbols therefrom, and OFDM processing logic 2716, 2720 that includes an inverse fast Fourier transform (IFFT) and generates complex IFFT output.

The complex IFFT output from OFDM processing logic 2716 is fed to parallel digital-to-analog converters (DACs) 2740 and 2744 within RF/mixed-signal logic 2604. The DAC output is then filtered by low pass filters (LPFs) 2742 and 2746 respectively to suppress distortion introduced by the DAC and fed to an I/Q modulator 2748, which modulates the signals in accordance with a first local oscillator (LO) for transmission over a first RF channel, denoted channel 1. In a like manner, the complex IFFT output from OFDM processing logic 2720 is fed to parallel DACs 2750 and 2754, the output of which is then filtered by LPFs 2752 and 2756 respectively and fed to an I/Q modulator 2758, which modulates the signals in accordance with a second LO for transmission over a second RF channel, denoted channel 2. The DACs 2740, 2744, 2750 and 2754 operate at roughly 875 Msps with roughly 6 bits/sample.

The output from I/Q modulators 2748 and 2758 are combined by a power combiner 2760 and then filtered by a filter 2762 to reduce unwanted harmonics and noise from the up-conversion process. The resulting RF signal is transmitted via antenna 2764. Note that a power amplifier (PA) may not be required due to the low FCC transmit power requirements and the use of a small amount of clipping at the DAC. Further, to reduce the transmitter complexity, an embodiment of the present invention uses structured LDPC codes enabling efficient encoding.

As shown in FIG. 28, receiver 2800 consists of RF/mixed-signal logic 2802 and baseband processing logic 2804. RF/mixed-signal logic 2802 includes an antenna 2810 that receives a transmitted RF signal, a low noise amplifier (LNA) 2812 that amplifies the received signal, and a power divider 2814 that splits the amplified signal for transmission down two different signal processing paths. Each signal processing path consists of an I/Q demodulator 2816, 2818 that extracts in-phase (I) and quadrature (Q) components of the amplified signal for processing along two subsequent parallel signal chains. I/Q demodulator 2816 is driven by a first LO to extract signals transmitted over RF channel 1 while I/Q demodulator is driven by a second LO to extract signals transmitted over RF channel 2.

Each signal chain for processing I components includes a low-pass filter (LPF) and variable gain amplifier (VGA) 2820, 2830 that filter and amplify the I data, respectively, followed by an analog-to-digital converter (ADC) 2822, 2832 that converts the analog I signal to a digital signal. Likewise, each signal chain for processing Q components includes an LPF/VGA 2824, 2834 for filtering and amplifying the Q data, respectively, followed by an ADC 2826, 2836 that converts the analog Q signal to a digital signal. Each of ADC 2822, 2826, 2832 and 2836 operate at roughly 875 Gsps and providing a resolution of roughly 6 effective bits.

The I and Q data for channel 1 is then sent to an OFDM processor 2840, 2842 within baseband processing logic 2804, which performs operations such as synchronization, equalization, and channel estimation. Likewise, the I and Q data for channel 2 is then sent to an OFDM processor 2850, 2852 within baseband processing logic 2804 that performs like operations. Logic 2860 alternately feeds the resultant demodulated symbols from OFDM processor 2840, 2842 and OFDM processor 2850, 2852 to an LDPC decoder 2862 that decodes the data to generate the output stream. In an embodiment, the LDPC decoder complexity is reduced by exploiting a fixed wireless HDMI block size and code rate.

In accordance with an embodiment of the present invention, for both the transmitter and receiver, baseband functions including OFDM and LDPC operations will be implemented on one device whereas RF/mixed signal operations will be included on an RF/mixed-signal chip. Note, a separate back-channel carrying HDMI information is also employed.

Q. Placement of Training Information in Accordance with an Embodiment of the Present Invention As will be discussed in more detail below, an embodiment of the present invention performs dynamic and opportunistic placement of training information to allow effective impairment estimation and power level setting for wireless high-definition content transfer.

As discussed elsewhere herein, a successful source-to-sink transfer of uncompressed or lossless compressed high-definition content requires a BER of $10^{-9}$ or lower coupled with Gbps and higher data rates. Achieving such low BERs requires accurate estimation of wireless channel and radio-frequency(RF)/mixed-signal impairments and compensation for their effect. Channel impairments include frequency selective fading and attenuation due to RF obstacles whereas RF impairments include transmitter and receiver local oscillator frequency offsets and I/Q imbalances. Mixed-signal impairments include sampling clock errors and timing offsets.

In the large bandwidths required to support Gbps and higher data rates, practical RF and mixed-signal components have a relatively small dynamic range. To effectively operate in this limited dynamic range, transmitter and receiver signal power levels must be carefully monitored and controlled. For instance, a receiver analog gain control (AGC) loop employing a receive signal strength indicator (RSSI) and variable gain amplifier (VGA) is needed to ensure that the signal power level entering the analog-to-digital converter (ADC) is within the dynamic range defined by the ADC effective number of bits and associated spurious free dynamic range (SFDR). In addition, the transmit power must be estimated and dynamically adjusted since transmitters that operate in the unlicensed ultrawideband frequency range between 3.1-10.6 GHz must have transmit power less than a specified FCC defined mask. In some cases, it may be desirable to transmit as close as possible to this mask to maximize the reliably supported range between the transmitter and receiver. In other cases, it may be preferable to transmit only as much power as is necessary to meet BER requirements at a given transmitter-to-receiver range. This case might arise in scenarios where it is required to minimize the interference a wireless HDMI system in accordance with an embodiment of the present invention causes to other systems sharing the UWB band or operating in close spectral proximity (e.g., the ISM band at 2.4 GHz).

One common and effective method to achieve the impairment estimation tasks discussed above is for the transmitter to send training data known to both the transmitter and receiver. Methods to partially compensate for RF and mixed-signal impairments and support channel estimation using training data are well known. Generally, the fidelity of estimation methods using training data improves with the length of the training sequence. The power levels associated with the training data can also be measured to maintain a desired transmit power level and set internal transmitter and receiver power levels to best utilize available dynamic range.

The challenge for achieving a wireless system for delivering high definition content is to find opportunities to insert training to allow effective impairment estimation and compensation. An embodiment of the present invention inserts training during horizontal and vertical blanking intervals during which the transferred information rate is greatly reduced. In video systems, the HBI and VBI are normally exploited for several purposes. For instance, the VBI is used in cathode ray tube (CRT) displays to allow the CRT electron beam to be shut down after it has painted the last line of an image and then restarted at the top left corner to draw the next screen. It takes time for the beam to be refocused and redirected from the bottom right corner (its end point after completing a field of video data) to the top left corner (its starting point for the next field). The HBI is used for the electron beam in a CRT device to move from the end of one horizontal line down and to the left of the screen to begin drawing the next line. During this time, the electron beam is shut off so that no other lines are accidentally created as the beam scans down and left. The VBI and HBI are also sometimes used for the transfer of audio and control data as well as other information such as closed-caption text.

Recognizing the critical importance of training, an embodiment of the present invention dynamically and opportunistically introduces training in the blanking intervals to allow estimation and power level setting updates every HDMI line. Long training lengths are achieved by reformatting the information contained in the blanking intervals.

A further embodiment of the present invention also uses a continuous, streaming, approach for wireless transfer of high-definition content to avoid the overhead introduced by packet-based approaches such as those based on carrier sense multiple access/collision avoidance (CSMA/CA) (e.g., 802.11, 802.15.3a) and to permit the insertion of an extended training interval before the transfer of content giving an initial high-fidelity impairment estimation and power level setting. Such an extended training interval is not available in standard CSMA/CA systems. In such packet based systems, preambles are typically statically inserted at the beginning of every packet to support training. Data follows the preambles and generally some pilot signals are transmitted along with the data to allow some additional training after the preambles. In such systems, all impairment estimation needs to be performed using the training information contained in a single packet. However, the length of such training is constrained since it introduces overhead reducing system throughput. In addition, such systems do not allow dynamic placement of training sequences, for instance to exploit the reduced information rates during blanking intervals for training purposes.

To improve the BER performance of a TX wireless media adapter, an embodiment of the present invention introduces training data or sequences into an HDMI-formatted signal, which may for example be received from a media source. Specifically, the PHY layer logic of a TX wireless media adapter receives an HDMI-formatted signal and generates a re-formatted HDMI output signal containing training data. The introduced training data are bit sequences known to both the TX wireless media adapter and a corresponding remote RX wireless media adapter.

The HDMI signaling format includes three "period" types. A video data period contains video reproduction information. A data island period can contain audio reproduction information and/or control information. A control period contains only control information. The information rate of a video data period is greater than the information rate of a data island period and the information rate of a control period. Specifically, the information rate of a video data period is approximately twice the information rate of a data island period and approximately four times the information rate of a control period.

The training data introduced by the TX wireless media adapter is used to compensate for channel impairments such as, for example, frequency selective fading and attenuation due to RF obstacles. The training data is also used to compensate for RF impairments including, for example, transmitter and receiver Local Oscillator (LO) frequency offsets and in-phase (I) channel/quadrature-phase (Q) channel imbalances. Further, the training data is used to compensate for mixed-signal impairments such as, for example, sampling clock errors and timing offsets. The power levels associated with the training data can also be measured to maintain a desired transmit power level. These power levels can also be used to set internal transmitter and receiver power levels to fully exploit the available dynamic range of the transmitter and/or receiver.

The TX wireless media adapter introduces training data during the Horizontal Blanking Intervals (HBI) and Vertical Blanking Intervals (VBI) of the HDMI-formatted signal. Typically, the information rate of the HDMI-formatted signal is greatly reduced during VBI and HBI since video information is not transmitted. Long training sequences are introduced by the TX wireless media adapter by reformatting the information transmitted during the VBI and the HBI.

Figure 29:
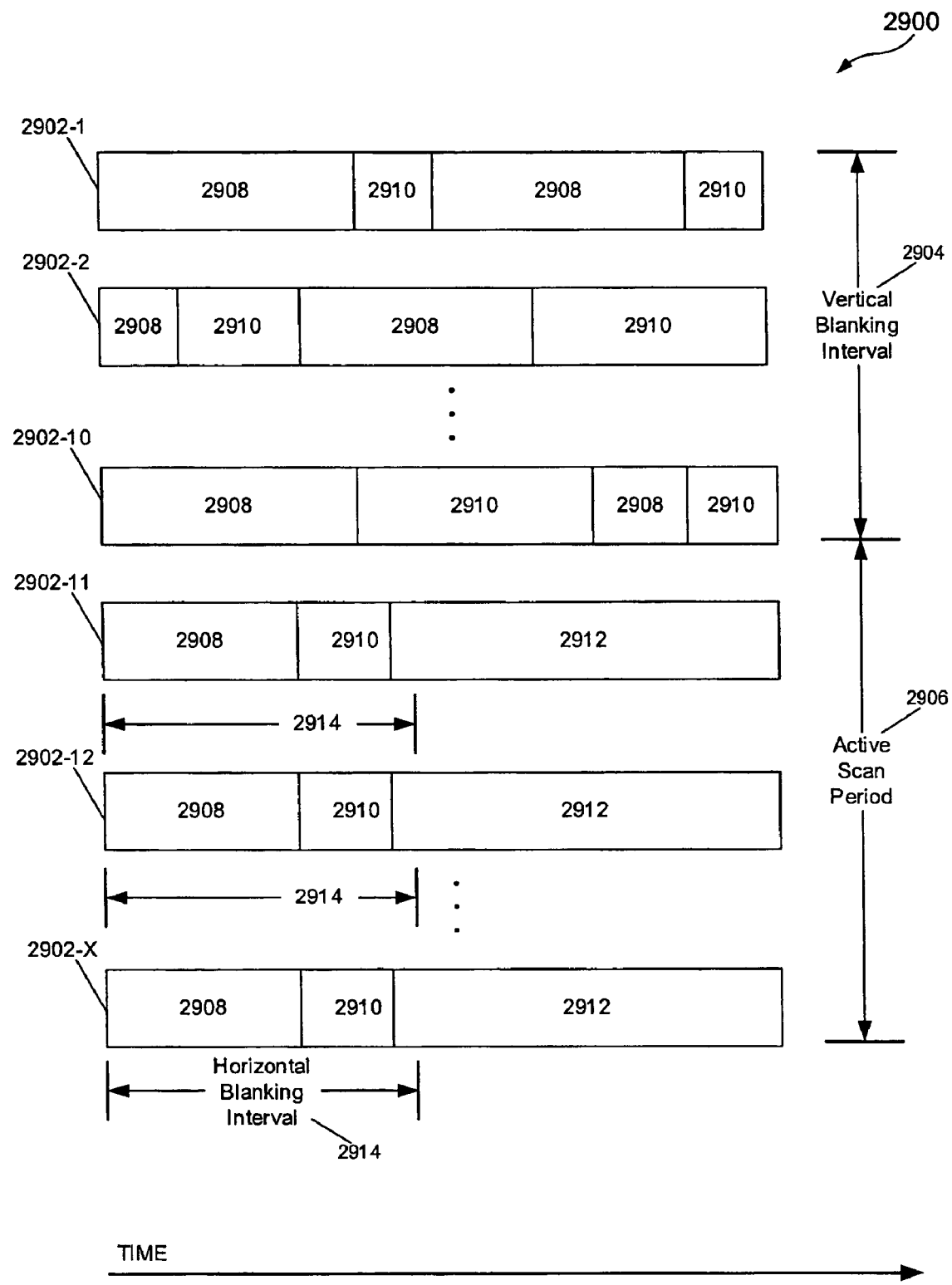
FIG. 29 illustrates the location of video, data island, and control periods within a portion of an HDMI frame in accordance with a conventional system.

FIG. 29 illustrates the insertion of training sequences within a portion of an HDMI frame 2900 according to the present invention. As shown in FIG. 29, the HDMI frame 2900 includes a number of lines 2902-1 through 2902-X. The lines 2902-1 through 2902-X are transmitted sequentially. The lines 2902-1 through 2902-10 are transmitted during a vertical blanking interval 2904. The lines 2902-11 through 2902-X are transmitted during an active scan period 2906. Lines transmitted during the active scan period 2906 can contain control periods 2908, data island periods 2910, and video data periods 2912. These lines contain active video information within the video data periods 2912. Lines transmitted during the vertical blanking interval 2904 do not contain video data periods 2912. Horizontal blanking intervals 2914 begin each active scan line during the active scan period 2906. Video data periods 2912 are not transmitted during the horizontal blanking intervals 2914.

As previously mentioned, the transmission information rate of the data island periods 2910 is approximately one-half the transmission information rate of the video data periods 2912. Further, the transmission information rate of the control periods 2908 is approximately one-fourth the transmission information rate of the video data periods 2912. To introduce training data with minimal system complexity, PHY logic within a TX wireless media adapter reformats the HDMI frame 2900 and transmits the control periods 2908 and the data island periods 2910 at the transmission information rate of the video data periods 2912. Specifically, the TX wireless media adapter speeds up the transmission information rate of the control periods 2908 such that the control periods 2908 are transmitted in approximately one-quarter of the time typically required to transmit a control period 2908. Similarly, the TX wireless media adapter speeds up the transmission information rate of the data island periods 2910 such that the data island periods 2910 are transmitted in approximately one-half of the time typically required to transmit a data island period 2910. This ability of the TX wireless media adapter to transmit the control periods 2908 and the data island periods 2910 at a faster information rate "frees up" time or bit intervals for the insertion of training data.

To insert training data, the TX wireless media adapter reformats a line or a portion of a line such that the original information is packed into a reformatted data block. That is, the information contained within the control periods 2908, data island periods 2910 or video data periods 2912 of a line or portion of a line are repacked and reformatted into reformatted data blocks. The reformatted data blocks can contain overhead information and header information to differentiate the different types of information contained therein. Further, each line can contain multiple reformatted data blocks. Together, the reformatted data blocks of a line contain the same information as the original control periods 2908, data island periods 2910 or video data periods 2912 of a line. The reformatted data blocks, however, convey this information in less time. The freed up time of each line or portion of a line can therefore accommodate training data.

Figure 30:
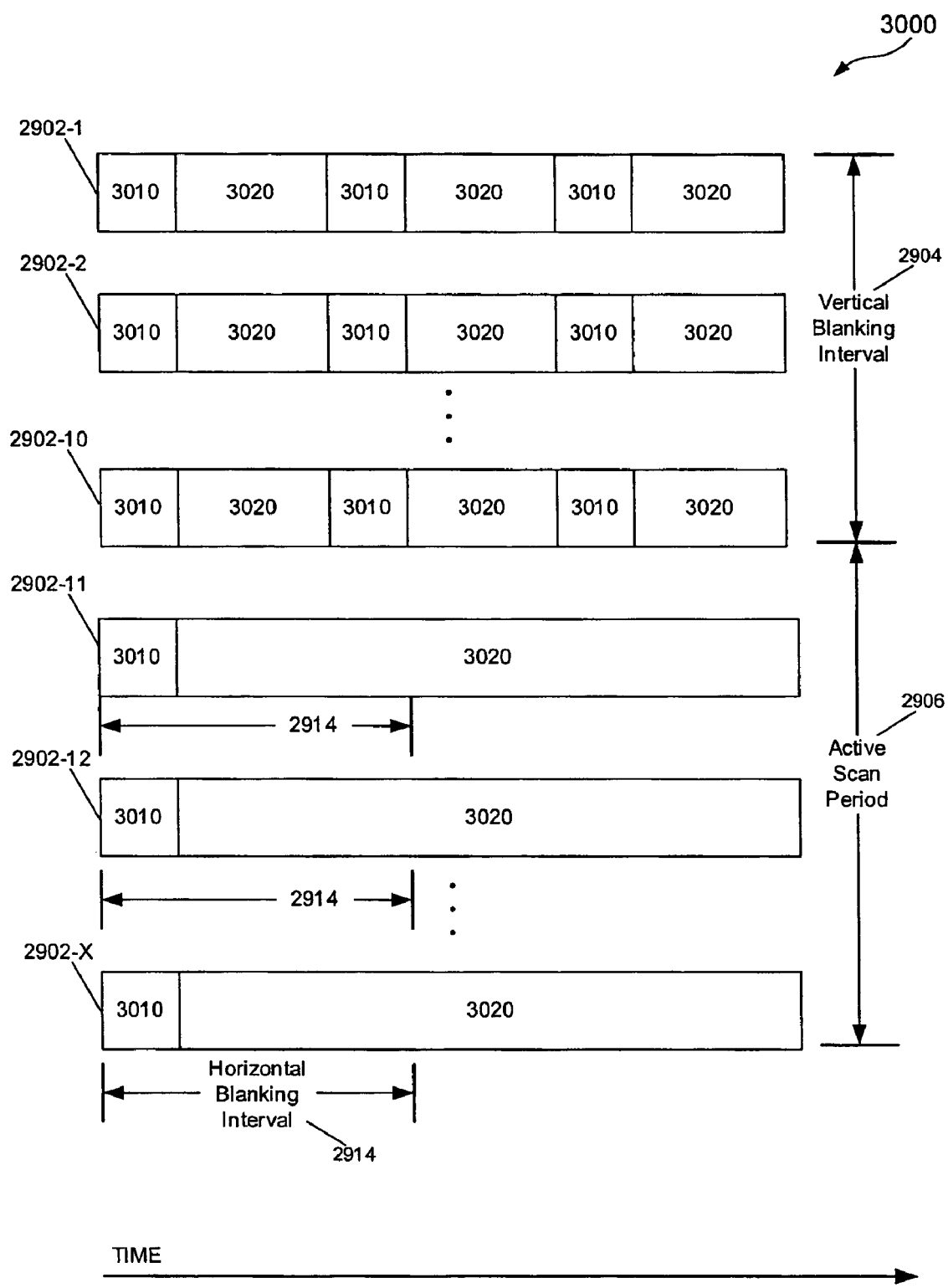
FIG. 30 illustrates the placement of training sequences within a portion of a reformatted HDMI frame in accordance with the present invention.

FIG. 30 illustrates the placement of training sequences within a portion of a reformatted HDMI frame 3000 according to the present invention. The reformatted HDMI frame 3000 is based on the HDMI frame 2900 depicted in FIG. 29. As shown in FIG. 30, reformatted data blocks 3020 contain information from control periods 2908, data island periods 2910 or video data periods 2912. The reformatted data blocks 3020 contain overhead and header information to distinguish the type of information contained therein. The reformatted data blocks 3020 within the vertical blanking interval 2904 can contain one or more whole or partial control periods 2908 or data island periods 2910. Training blocks 3010 contain training data inserted by the TX wireless media adapter into available bit intervals of each line.

In one embodiment of the present invention, the TX wireless media adapter inserts the training blocks 3010 at fixed locations within each line. For example, the TX wireless media adapter can place training blocks 3010 at the same fixed locations within lines 2902-1 through 2902-10. The TX wireless media adapter can also place training blocks 3010 at the same fixed location within the lines 2902-11 through 2902-X. Placing the training blocks 3010 at fixed locations determines the location or placement of reformatted data blocks 3020. Consequently, a level of predictability within the reformatted HDMI frame 3000 can be conveyed. This enables a receiver to more easily locate the training blocks 3010 contained within the reformatted HDMI frame 3000 and guarantees certain performance measures.

FIG. 30 shows that long training sequences can be introduced by the training data insertion method of the present invention. Specifically, after accounting for overhead needed to distinguish between period types and training data, the insertion method of the present invention enables approximately one-half of the VBI and HBI to be used for the transmission of training sequences. In this way, the insertion method of the present invention provides a dynamic introduction of both channel estimation and power level setting updates on a line-by-line basis without reducing throughput.

In another aspect of the present invention, the PHY logic of a TX wireless media adapter provides insertion of an extended training sequence when the TX wireless media adapter first establishes a wireless link with a corresponding remote RX wireless media adapter. The use of an extended training sequence before the transfer of media content provides an initial high-fidelity impairment estimation and power level setting. Such an extended training interval is not available in standard Carrier Sense Multiple-Access/Collision Avoidance (CSMA/CA) schemes such as, for example, IEEE 802.11 or IEEE 802.15.3a.

Figure 31:
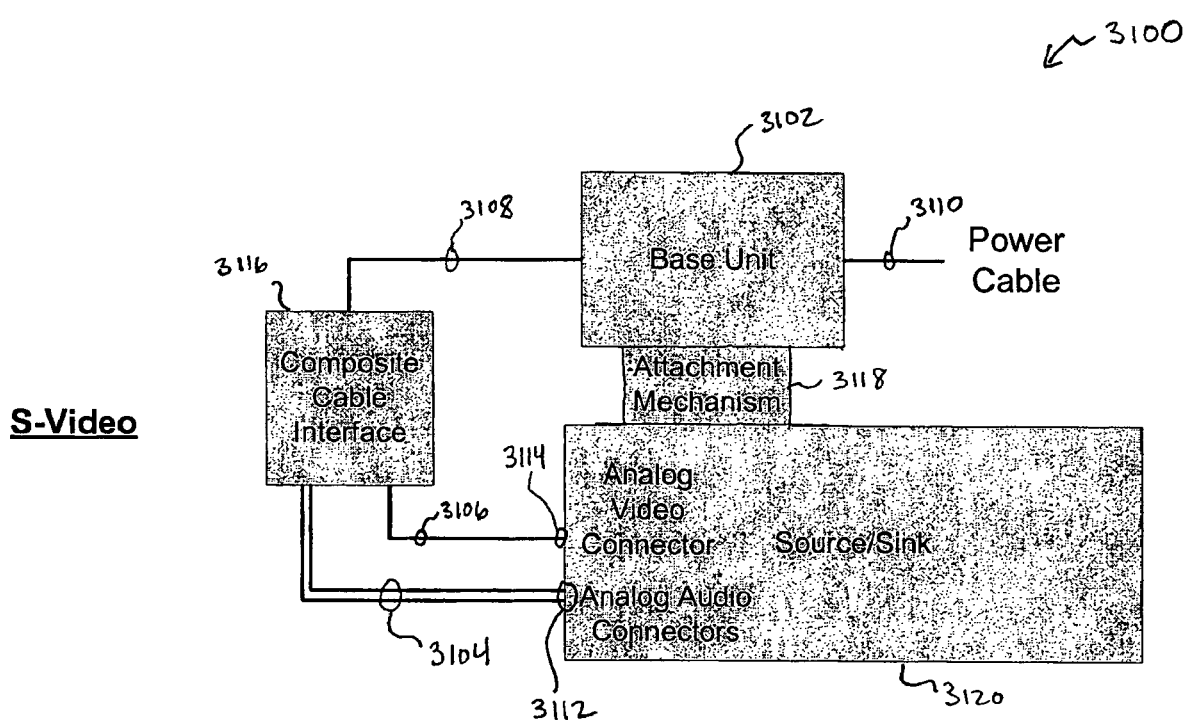
FIG. 31 illustrates a system in which a transmit (or receive) wireless media adapter of the present invention is implemented as a dongle for the wireless delivery of S-Video content.

R. Dongle-Based Implementations in Accordance with Embodiments of the Present Invention FIG. 31 illustrates a system 3100 in which a transmit (or receive) wireless media adapter of the present invention is implemented as a dongle for the wireless delivery of S-Video content. As shown in FIG. 31, the dongle includes a base unit 3102, an analog video cable 3106 with a corresponding analog video connector 3114, analog audio cables 3104 with corresponding analog audio connectors 3112, and a power cable 3110. A composite cable interface 3116 combines the analog audio cables 3104 and the analog video cable 3106 onto a composite cable 3108. The composite cable 3108 is structured to accommodate the analog audio cables 3104 and the analog video cable 3106 within a single cable.

The composite cable 3108 and the power cable 3110 are coupled to the base unit 3102. The composite cable 3108 and the power cable 3110 can be either permanently attached to the base unit 3102 or can be connected via detachable plugs or jacks. The power cable 3110 supplies power to the base unit 3102. The power cable 3110 can draw power from a wall outlet or, alternatively, can draw power from an existing connection on a media source or media sink. For example, the power cable 3110 can be structured to draw power from the Universal Serial Bus (USB) port provided by a media source or a media sink.

The base unit 3102 contains a media adapter interface to convert analog audio and analog video signals from respective native formats to a composite transmission format (or to convert analog audio and analog video signals from a composite transmission format back to respective native formats if an RX wireless media adapter). The base unit 3102 further includes a wireless transmitter for processing and transmitting a wireless signal containing the reformatted analog audio and analog video signals (or a wireless receiver for receiving and processing a wireless signal containing reformatted analog audio and audio video signals if an RX wireless media adapter). Base unit 3102 may include an LED (not shown) that provides a visual indication of the status of a wireless link between the base unit 3102 and a remote base unit.

The base unit 3102 can include either an internal antenna or an external antenna for transmitting wireless signals (or receiving wireless signals if an RX wireless media adapter). Further, the base unit 3102 can include an attachment mechanism 3118 to enable the base unit 3102 to be attached to a media source/sink 3120.

In an embodiment, the analog video cable 3106 and the corresponding analog video connector 3114 are structured in accordance with the S-Video connectivity interface standard and the analog audio cables 3104 and the corresponding analog audio connectors 3114 are structured according to the RCA line-level connectivity interface standard. However, this description is not intended to be limiting and the analog video cable 3106 and the corresponding analog video connector 3114 can be structured according to a variety of connectivity interface standards including, for example, the YUV, RGB, and CVBS formats. Likewise, the analog audio cable 3104 and the corresponding analog audio connectors 3112 can be structured according to a variety of connectivity interface standards including, for example, the XLR line-level format.

Figure 32:
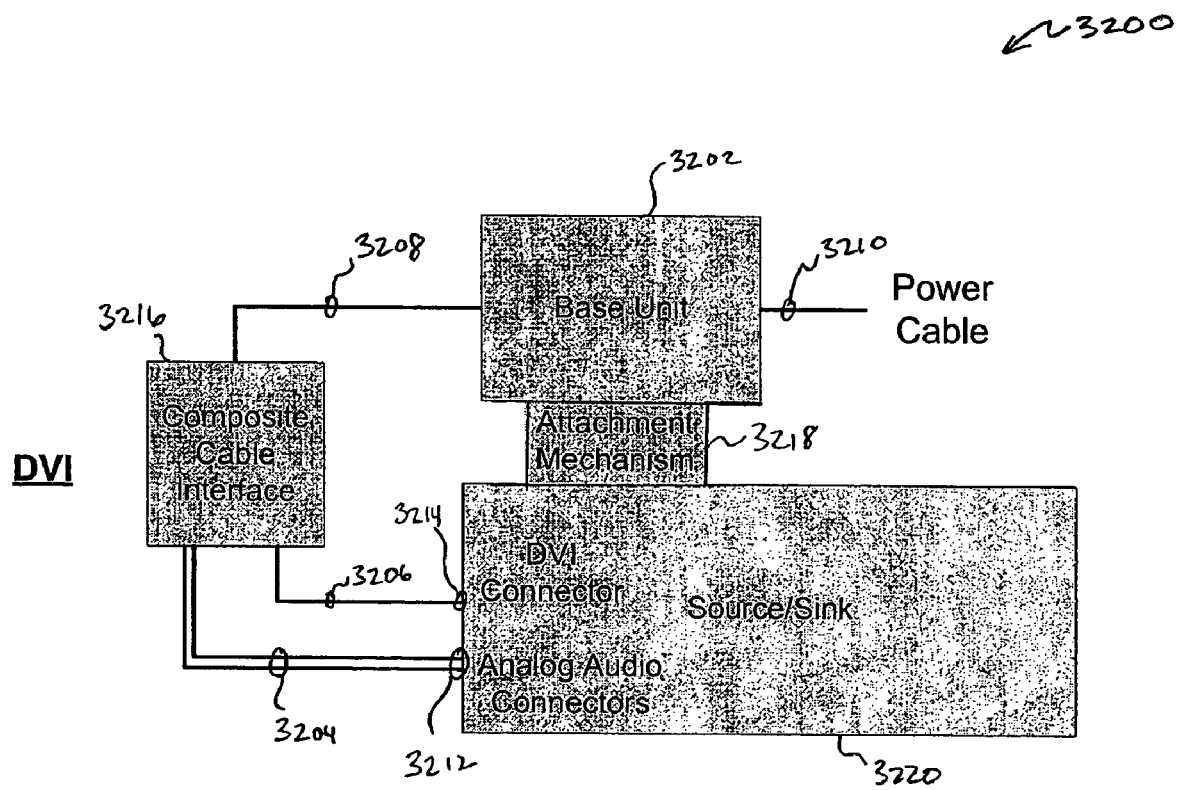
FIG. 32 illustrates a system in which a transmit (or receive) wireless media adapter of the present invention is implemented as a dongle for the wireless delivery of DVI content.

Attachment mechanism 3118 provides a means for attaching base unit 3102 to the media source/sink 3120. In an embodiment, the base unit 3102 is mounted to the media source/sink 3120 by using a pre-existing holder or socket formed on a plastic molding of the media source/sink 3120. Alternatively, the base unit 3102 may include other attachment mechanisms including, for example, tape, Velcro®, or a hook, to attach to media source/sink 3120. Further, the base unit 3102 can include a metal or plastic formation built onto the base unit 3102 that is designed to "mate" with an equivalent connector located on the media source/sink 3120. FIG. 32 illustrates a system 3200 in which a transmit (or receive) wireless media adapter of the present invention is implemented as a dongle for the wireless delivery of DVI content. As shown in FIG. 32, the dongle includes a base unit 3202, a digital video cable 3206 with a corresponding digital video connector 3214, analog audio cables 3204 with corresponding analog audio connectors 3212, and a power cable 3210. A composite cable interface 3216 combines the analog audio cables 3204 and the digital video cable 3206 onto a composite cable 3208. The composite cable 3208 is structured to accommodate the analog audio cables 3204 and the analog video cable 3206 within a single cable.

The composite cable 3208 and the power cable 3210 are coupled to the base unit 3202. The composite cable 3208 and the power cable 3210 can be either permanently attached to the base unit 3202 or can be connected via detachable plugs or jacks. The power cable 3210 supplies power to the base unit 3202. The power cable 3210 can draw power from a wall outlet or, alternatively, can draw power from an existing connection on a media source or media sink. For example, the power cable 3210 can be structured to draw power from the Universal Serial Bus (USB) port provided by a media source or a media sink.

The base unit 3202 contains a media adapter interface to convert analog audio and digital video signals from respective native formats to a composite transmission format (or to convert analog audio and digital video signals from a composite transmission format back to respective native formats if an RX wireless media adapter). The base unit 3202 further includes a wireless transmitter for processing and transmitting a wireless signal containing the reformatted analog audio and digital video signals (or a wireless receiver for receiving and processing a wireless signal containing reformatted analog audio and digital video signals if an RX wireless media adapter). Base unit 3202 may include an LED (not shown) that provides a visual indication of the status of a wireless link between the base unit 3202 and a remote base unit.

The base unit 3202 can include either an internal antenna or an external antenna for transmitting wireless signals (or receiving wireless signals if an RX wireless media adapter). Further, the base unit 3202 can include an attachment mechanism 3218 to enable the base unit 3202 to be attached to a media source/sink 3220.

In an embodiment, the digital video cable 3206 and the corresponding digital video connector 3214 are structured in accordance with the DVI connectivity interface standard. The analog audio cables 3204 and the corresponding analog audio connectors 3214 may be structured according to the RCA line-level connectivity interface standard or a variety of other connectivity interface standards including, for example, the XLR line-level format.

Attachment mechanism 3218 provides a means for attaching base unit 3202 to the media source/sink 3220. In an embodiment, the base unit 3202 is mounted to the media source/sink 3220 by using a pre-existing holder or socket formed on a plastic molding of the media source/sink 3220. Alternatively, the base unit 3202 may include other attachment mechanisms including, for example, tape, Velcro®, or a hook, to attach to media source/sink 3220. Further, the base unit 3202 can include a metal or plastic formation built onto the base unit 3202 that is designed to "mate" with an equivalent connector located on the media source/sink 3220.

Figure 33:
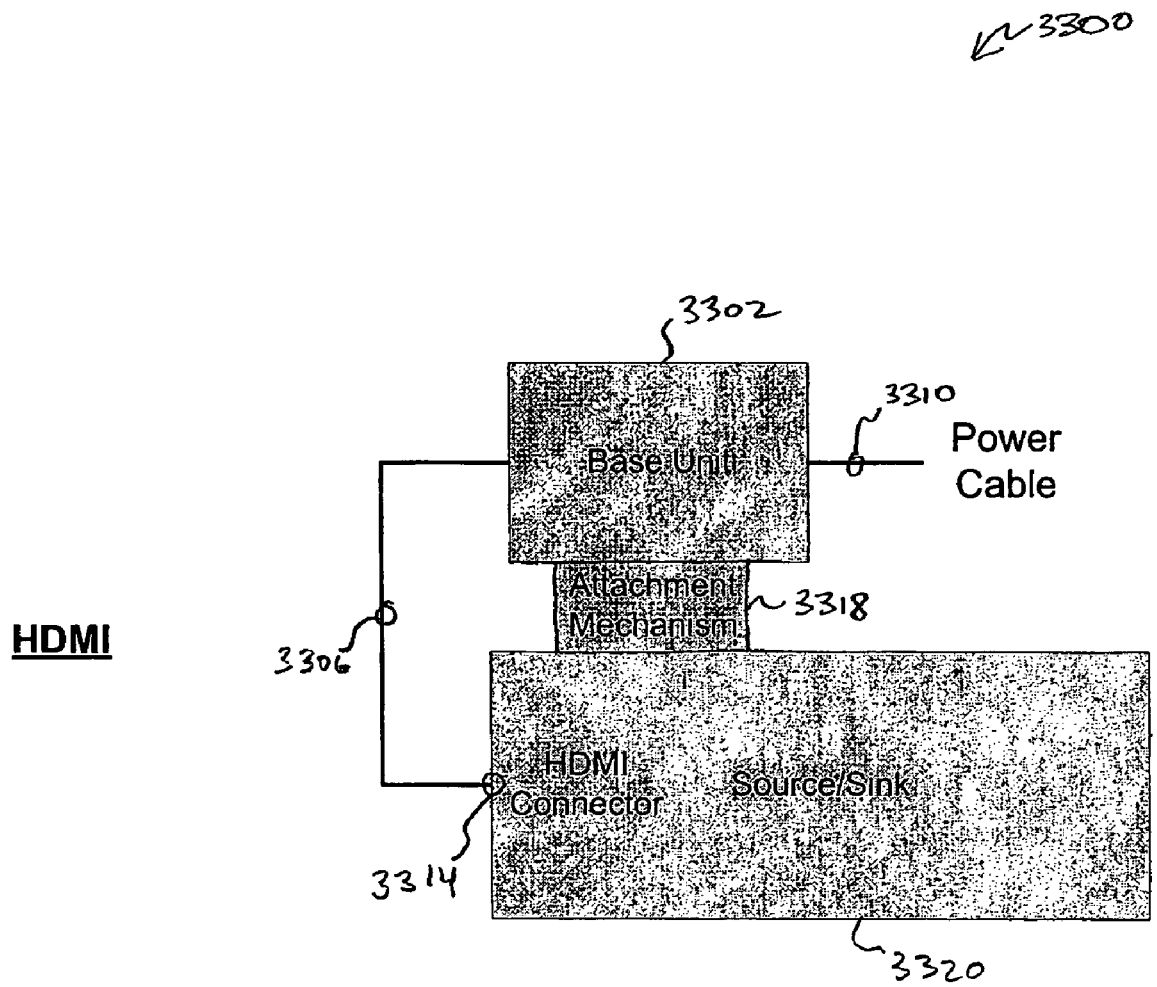
FIG. 33 illustrates a system in which a transmit (or receive) wireless media adapter of the present invention is implemented as a dongle for the wireless delivery of HDMI content.

FIG. 33 illustrates a system 3300 in which a transmit (or receive) wireless media adapter of the present invention is implemented as a dongle for the wireless delivery of HDMI content. As shown in FIG. 33, the dongle includes a base unit 3302, a digital cable 3306 with a corresponding digital connector 3314, and a power cable 3310.

The power cable 3310 is coupled to the base unit 3302. The power cable 3310 can be either permanently attached to the base unit 3302 or can be connected via a detachable plug or jack. The power cable 3310 supplies power to the base unit 3302. The power cable 3310 can draw power from a wall outlet or, alternatively, can draw power from an existing connection on a media source or media sink. For example, the power cable 3310 can be structured to draw power from the Universal Serial Bus (USB) port provided by a media source or a media sink.

The base unit 3302 contains a media adapter interface to convert digital audio/video signals from a native format to a transmission format (or to convert digital audio/video signals from a transmission format back to a native formats if an RX wireless media adapter). The base unit 3302 further includes a wireless transmitter for processing and transmitting a wireless signal containing the reformatted digital audio/video signals (or a wireless receiver for receiving and processing a wireless signal containing reformatted digital audio/video signals if an RX wireless media adapter). Base unit 3302 may include an LED (not shown) that provides a visual indication of the status of a wireless link between the base unit 3302 and a remote base unit.

The base unit 3302 can include either an internal antenna or an external antenna for transmitting wireless signals (or receiving wireless signals if an RX wireless media adapter). Further, the base unit 3302 can include an attachment mechanism 3318 to enable the base unit 3302 to be attached to a media source/sink 3320.

In an embodiment, the digital cable 3306 is structured in accordance with the HDMI connectivity interface standard.

Attachment mechanism 3318 provides a means for attaching base unit 3302 to the media source/sink 3320. In an embodiment, the base unit 3302 is mounted to the media source/sink 3320 by using a pre-existing holder or socket formed on a plastic molding of the media source/sink 3320. Alternatively, the base unit 3302 may include other attachment mechanisms including, for example, tape, Velcro®, or a hook, to attach to media source/sink 3320. Further, the base unit 3302 can include a metal or plastic formation built onto the base unit 3302 that is designed to "mate" with an equivalent connector located on the media source/sink 3320.

S. Conclusion

As the "connected home" becomes a reality, consumers are demanding simpler, less-intrusive installation, more flexibility with placement, and lower overall installation costs. Unfortunately, existing solutions are expensive, bulky, and require consumers to know about connections, cables, and technology protocols. Wireless technologies promise to overcome these limitations, but existing and proposed standards fail to support bandwidth-demanding applications such as the wireless replacement of HDMI cables.

For example, to achieve the high data rates and quality needed for in-home video distribution, a particular embodiment of the present invention tailors a wireless solution to the unique requirements of HDMI. A wireless HDMI solution in accordance with an embodiment of the present invention achieves a BER of $10^{-9}$ at 1.5 Gbps while minimizing latency between the transmitter and receiver. This solution is robust, providing high quality performance even in the presence of a large amount of in-band interference.

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A system for transferring media content from a content source to a content sink, comprising:
    a first wireless media adapter comprising first conversion logic and a transmitter, wherein the first conversion logic receives an output signal representing uncompressed video data and encoded for transmission over a wired communication interface from the content source and converts the output signal to a format suitable for wireless communication wherein the conversion does not include applying lossy compression to the uncompressed video data and wherein the transmitter wirelessly transmits the converted output signal over a first ultrawideband (UWB) radio frequency (RF) channel located in the frequency range of 3.1 gigahertz (GHz) to 10.6 GHz; and
    a second wireless media adapter comprising a receiver and second conversion logic, wherein the receiver wirelessly receives the wirelessly-transmitted signal, and wherein the second conversion logic converts the wirelessly-received signal into an input signal representing the uncompressed video data and encoded for transmission over the wired communication interface and transmits the input signal to the content sink.

2. The system of claim 1, wherein the wired communication interface comprises one of:
    a High-Definition Media Interface (HDMI);
    a Digital Video Interface (DVI);
    a composite video (CVSB) interface;
    an S-video interface
    an RGB video interface; or
    a YUV video interface.

3. The system of claim 1, wherein the first wireless media adapter further comprises a first transceiver and the second wireless media adapter further comprises a second transceiver;
    wherein the transmitter and receiver communicate over the first UWB RF channel to deliver media content from the content source to the content sink; and
    wherein the first transceiver and the second transceiver communicate over a second RF channel to exchange media access control (MAC) information and/or perform multimedia signaling.

4. The system of claim 3, wherein the first transceiver and the second transceiver communicate High-Bandwidth Digital Content Protection (HDCP) parameters over the second RF channel.

5. The system of claim 3, wherein the first transceiver and the second transceiver communicate Display Data Channel (DDC) information over the second RF channel.

6. The system of claim 3, wherein the first transceiver and the second transceiver communicate Consumer Electronics Control (CEC) channel information over the second RF channel.

7. The system of claim 3, wherein the first transceiver and the second transceiver communicate information relating to a received signal quality.

8. The system of claim 7, wherein the first wireless media adapter adjusts operating parameters of the transmitter based on the information relating to a received signal quality.

9. The system of claim 1, wherein the first conversion logic performs low-density parity check (LDPC) encoding of the output signal and the second conversion logic performs LDPC decoding of the wirelessly-received signal.

10. The system of claim 1, wherein the first conversion logic performs Transition Minimized Differential Signaling (TMDS) decoding of the output signal and the second conversion logic performs TMDS encoding of the wirelessly-received signal.

11. The system of claim 1, wherein the first conversion logic performs Inter-Integrated Circuit ($I^2C$) decoding of the output signal and the second conversion logic performs $I^2C$ encoding of the wirelessly-received signal.

12. The system of claim 1, wherein the first conversion logic performs Consumer Electronics Control (CEC) decoding of the output signal and the second conversion logic performs CEC encoding of the wirelessly-received signal.

13. The system of claim 1, wherein the first conversion logic generates control information based on a first reference clock and a pixel clock associated with the content source and the transmitter wirelessly transmits the control information, and wherein the receiver wirelessly receives the control information and the second conversion logic regenerates the pixel clock based on the wirelessly-received control information and a second reference clock.

14. The system of claim 1, wherein the first wireless media adapter further comprises third conversion logic that receives an audio output signal encoded for transmission over a wired audio communication interface from the content source and converts the audio output signal to a format suitable for wireless communication and wherein the transmitter wirelessly transmits the converted audio output signal over the first UWB RF channel; and wherein the second wireless media adapter further comprises fourth conversion logic, wherein the receiver wirelessly receives the wirelessly-transmitted converted audio output signal, and wherein the fourth conversion logic converts the wirelessly-received converted audio output signal into an audio input signal encoded for transmission over the wired audio communication interface and transmits the audio input signal to the content sink.

15. The system of claim 14, wherein the wired audio communication interface comprises one of:
an RCA audio interface;
an XLR audio interface;
a 5.1 surround sound audio interface;
a 6.1 surround sound audio interface;
a 7.1 surround sound audio interface; or
a 10.1 surround sound audio interface.

16. A method for transferring media content from a content source to a content sink, comprising:
receiving an output signal representing uncompressed video data and encoded for transmission over a wired communication interface from the content source;
converting the output signal to a format suitable for wireless communication wherein the conversion does not include applying lossy compression to the uncompressed video data;
wirelessly transmitting and receiving the converted output signal over a first ultrawideband (UWB) radio frequency (RF) channel located in the frequency range of 3.1 gigahertz (GHz) to 10.6 GHz;
converting the wirelessly-received signal into an input signal representing the uncompressed video data and encoded for transmission over the wired communication interface; and
transmitting the input signal to the content sink.

17. The method of claim 16, wherein the wired communication interface comprises one of:
a High-Definition Media Interface (HDMI);
a Digital Video Interface (DVI);
a composite video (CVSB) interface;
an S-video interface;
an RGB video interface; or
a YUV video interface.

18. The method of claim 16, wherein wirelessly transmitting and receiving the converted output signal comprises wirelessly transmitting and receiving the converted output signal over the first UWB RF channel to deliver media content from the content source to the content sink, the method further comprising:
wirelessly transmitting and receiving signals over a second RF channel to exchange media access control (MAC) information and/or perform multimedia signaling.

19. The method of claim 18, wherein wirelessly transmitting and receiving signals over a second RF channel comprises communicating High-Bandwidth Digital Content Protection (HDCP) parameters over the second RF channel.

20. The method of claim 18, wherein wirelessly transmitting and receiving signals over a second RF channel comprises communicating Display Data Channel (DDC) information over the second RF channel.

21. The system of claim 18, wherein wirelessly transmitting and receiving signals over a second RF channel comprises communicating Consumer Electronics Control (CEC) channel information over the second RF channel.

22. The system of claim 18, wherein wirelessly transmitting and receiving signals over a second RF channel comprises communicating information relating to a received signal quality.

23. The method of claim 22, further comprising adjusting operating parameters pertaining to the wireless transmitting of the converted output signal based on the information relating to a received signal quality.

24. The method of claim 16, wherein converting the output signal to a format suitable for wireless communication comprises performing low-density parity check (LDPC) encoding of the output signal, and wherein converting the wirelessly-received signal into an input signal encoded for transmission over the wired communication interface comprises performing LDPC decoding of the wirelessly-received signal.

25. The method of claim 16, wherein converting the output signal to a format suitable for wireless communication comprises performing Transition Minimized Differential Signaling (TMDS) decoding of the output signal and wherein converting the wirelessly-received signal into an input signal encoded for transmission over the wired communication interface comprises performing TMDS encoding of the wirelessly-received signal.

26. The method of claim 16, wherein converting the output signal to a format suitable for wireless communication comprises performing Inter-Integrated Circuit (I²C) decoding of the output signal and wherein converting the wirelessly-received signal into an input signal encoded for transmission over the wired communication interface comprises performing I²C encoding of the wirelessly-received signal.

27. The method of claim 16, wherein converting the output signal to a format suitable for wireless communication comprises performing Consumer Electronics Control (CEC) decoding of the output signal and wherein converting the wirelessly-received signal into an input signal encoded for transmission over the wired communication interface comprises performing CEC encoding of the wirelessly-received signal.

28. The method of claim 16, further comprising:
generating control information based on a first reference clock and a pixel clock associated with the content source;
wirelessly transmitting and receiving the control information; and
regenerating the pixel clock based on the wirelessly-received control information and a second reference clock.

29. The method of claim 16, further comprising:
receiving an audio output signal encoded for transmission over a wired audio communication interface from the content source;
converting the audio output signal to a format suitable for wireless communication;
wirelessly transmitting and receiving the converted audio output signal over the first UWB RF channel;
converting the wirelessly-received converted audio output signal into an audio input signal encoded for transmission over the wired audio communication interface; and
transmitting the audio input signal to the content sink.

30. The method of claim 29, wherein the wired audio communication interface comprises one of:
an RCA audio interface;
an XLR audio interface;
a 5.1 surround sound audio interface;
a 6.1 surround sound audio interface;
a 7.1 surround sound audio interface; or
a 10.1 surround sound audio interface.

31. A system comprising:
(a) a content source, wherein the content source comprises
(i) an audio/visual (A/V) source that generates an output signal representing uncompressed video data and formatted for transmission over a wired communication interface, and
(ii) a first wireless media adapter that receives the output signal, converts the output signal to a format suitable for wireless communication wherein the conversion does not include applying lossy compression to the uncompressed video data, and wirelessly transmits the converted output signal over a first ultrawideband (UWB) radio frequency (RF) channel located in the frequency range of 3.1 gigahertz (GHz) to 10.6 GHz; and
(b) a content sink, wherein the content sink comprises
(i) a second wireless media adapter that wirelessly receives the wirelessly-transmitted signal and converts the wirelessly-received signal into an input signal representing the uncompressed video data and formatted for transmission over the wired communication interface, and
(ii) an A/V presentation system that receives the input signal and generates an A/V presentation to a user responsive to the input signal.

32. The system of claim 31, wherein the wired communication interface comprises one of:
a High-Definition Media Interface (HDMI);
a Digital Video Interface (DVI);
a composite video (CVSB) interface;
an S-video interface;
an RGB video interface; or
a YUV video interface.

33. The system of claim 31, wherein the A/V source generates an audio output signal formatted for transmission over a wired audio communication interface,
wherein the first wireless media adapter receives the audio output signal, converts the audio output signal to a format suitable for wireless communication, and wirelessly transmits the converted audio output signal over the first UWB RF channel,
wherein the second wireless media adapter wirelessly receives the wirelessly-transmitted converted audio output signal and converts the wirelessly-received converted audio output signal into an audio input signal formatted for transmission over the wired audio communication interface; and
wherein the A/V presentation system receives the audio input signal and generates an A/V presentation to the user responsive to the audio input signal.

34. The system of claim 33, wherein the wired audio communication interface comprises one of:
an RCA audio interface;
an XLR audio interface;
a 5.1 surround sound audio interface;
a 6.1 surround sound audio interface;
a 7.1 surround sound audio interface; or
a 10.1 surround sound audio interface.

* * * * *